US010564798B2

(12) United States Patent
Fitzmaurice et al.

(10) Patent No.: US 10,564,798 B2
(45) Date of Patent: Feb. 18, 2020

(54) NAVIGATION SYSTEM FOR A 3D VIRTUAL SCENE

(75) Inventors: George Fitzmaurice, Toronto (CA); Justin Matejka, Newmarket (CA); Igor Mordatch, Emeryville, CA (US); Gord Kurtenbach, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 969 days.

(21) Appl. No.: 12/200,440

(22) Filed: Aug. 28, 2008

(65) Prior Publication Data

US 2009/0083673 A1    Mar. 26, 2009

Related U.S. Application Data

(60) Provisional application No. 61/022,640, filed on Jan. 22, 2008, provisional application No. 60/975,366, filed on Sep. 26, 2007.

(51) Int. Cl.
| | | |
|---|---|---|
| G06F 3/0481 | (2013.01) | |
| G06F 16/954 | (2019.01) | |
| G06T 19/00 | (2011.01) | |
| G06F 3/0489 | (2013.01) | |
| H04M 1/725 | (2006.01) | |

(52) U.S. Cl.
CPC ........ G06F 3/04815 (2013.01); G06F 16/954 (2019.01); *G06F 3/0489* (2013.01); *G06F 3/04895* (2013.01); *G06T 19/003* (2013.01); *H04M 1/7258* (2013.01); *H04M 1/72522* (2013.01); *H04M 1/72583* (2013.01)

(58) Field of Classification Search
CPC .................. G06F 3/04815; G06F 17/30873
USPC .......................................... 715/851, 786, 799
See application file for complete search history.

(56) References Cited

U.S. PATENT DOCUMENTS

| | | | |
|---|---|---|---|
| 4,734,690 A | | 3/1988 | Waller |
| 5,075,673 A | | 12/1991 | Yanker |
| 5,293,529 A | | 3/1994 | Yoshimura et al. |
| 5,371,846 A | * | 12/1994 | Bates ........................... 715/786 |
| 5,488,392 A | | 1/1996 | Harris |
| 5,491,781 A | * | 2/1996 | Gasperina ..................... 715/786 |
| 5,511,157 A | | 4/1996 | Wang |
| 5,532,715 A | * | 7/1996 | Bates et al. ................... 345/684 |
| 5,544,300 A | * | 8/1996 | Skarbo et al. ................ 715/759 |

(Continued)

FOREIGN PATENT DOCUMENTS

WO        WO 0171479 A2 *   9/2001   ............... G06F 3/14

OTHER PUBLICATIONS

Lewis et al., Multiple Slider Control Scales, Feb. 1, 1994, IBM Technical Disclosure vol. 37, No. 02B.*

(Continued)

*Primary Examiner* — Cesar B Paula
*Assistant Examiner* — John M Heffington
(74) *Attorney, Agent, or Firm* — Artegis Law Group, LLP

(57) ABSTRACT

A navigation system for navigating a three-dimensional (3D) scene that includes a model or object with which a user can interact. The system accommodates and helps both novice and advanced users. To do this, the system allows a user to move up and down within a scene relative to an up axis of the scene without the user being displaced horizontally. A scale is provided that shows the user the relative position of the current view in the vertical bounding box of the scene.

21 Claims, 52 Drawing Sheets

(56) References Cited

U.S. PATENT DOCUMENTS

| | | | |
|---|---|---|---|
| 5,583,977 A | | 12/1996 | Seidl |
| 5,655,094 A | * | 8/1997 | Cline .................. G06F 3/04855 |
| | | | 345/684 |
| 5,734,805 A | | 3/1998 | Isensee et al. |
| 5,841,440 A | | 11/1998 | Guha |
| 5,875,448 A | * | 2/1999 | Boys ......................... G06F 3/16 |
| | | | 704/201 |
| 5,929,840 A | | 7/1999 | Brewer et al. |
| 5,945,985 A | * | 8/1999 | Babin et al. ................... 715/209 |
| 5,973,663 A | * | 10/1999 | Bates et al. .................... 715/786 |
| 6,014,142 A | | 1/2000 | LaHood |
| 6,049,805 A | * | 4/2000 | Drucker .................. G06F 9/465 |
| 6,067,624 A | * | 5/2000 | Kuno .............................. 726/17 |
| 6,121,966 A | * | 9/2000 | Teodosio et al. ............. 715/838 |
| 6,139,433 A | * | 10/2000 | Miyamoto et al. ............. 463/32 |
| 6,154,723 A | * | 11/2000 | Cox ........................ G06F 3/011 |
| | | | 345/419 |
| 6,155,926 A | * | 12/2000 | Miyamoto et al. ............. 463/32 |
| 6,215,494 B1 | * | 4/2001 | Teo ................................ 345/418 |
| 6,222,541 B1 | * | 4/2001 | Bates et al. .................... 715/786 |
| 6,222,557 B1 | | 4/2001 | Pulley, IV et al. |
| 6,252,594 B1 | * | 6/2001 | Xia et al. ....................... 715/786 |
| 6,300,936 B1 | * | 10/2001 | Braun et al. ................... 345/156 |
| 6,313,849 B1 | | 11/2001 | Takase et al. |
| 6,329,994 B1 | * | 12/2001 | Gever et al. .................... 345/473 |
| 6,426,745 B1 | | 7/2002 | Isaacs et al. |
| 6,480,191 B1 | | 11/2002 | Balabanovic |
| 6,504,535 B1 | * | 1/2003 | Edmark .................. G06T 15/10 |
| | | | 345/419 |
| 6,536,043 B1 | * | 3/2003 | Guedalia ................ H04N 7/147 |
| | | | 348/E7.071 |
| 6,556,206 B1 | | 4/2003 | Benson et al. |
| 6,628,279 B1 | | 9/2003 | Schell et al. |
| 6,640,185 B2 | | 10/2003 | Yokota et al. |
| 6,654,060 B1 | * | 11/2003 | Kurosawa et al. ...... 348/333.02 |
| 6,738,065 B1 | | 5/2004 | Even-Zohar |
| 6,867,790 B1 | | 3/2005 | Brooks |
| 6,928,618 B2 | | 8/2005 | Kohls et al. |
| 6,954,906 B1 | * | 10/2005 | Kamachi et al. .............. 715/799 |
| 6,973,200 B1 | * | 12/2005 | Tanaka et al. ................. 382/103 |
| 6,985,178 B1 | * | 1/2006 | Morita et al. .............. 348/211.3 |
| 7,042,468 B2 | * | 5/2006 | Schwegler et al. ........... 345/629 |
| 7,190,365 B2 | | 3/2007 | Fleury |
| 7,415,676 B2 | * | 8/2008 | Fujita ............................ 715/781 |
| 7,549,127 B2 | * | 6/2009 | Chasen et al. ................. 715/788 |
| 7,746,343 B1 | * | 6/2010 | Charaniya ........... G06F 3/04815 |
| | | | 345/428 |
| 7,805,338 B2 | * | 9/2010 | Kolls ........................... 705/26.1 |
| 7,823,080 B2 | * | 10/2010 | Miyajima et al. ............. 715/792 |
| 8,473,859 B2 | * | 6/2013 | Chaudhri et al. ............. 715/782 |
| 2001/0035876 A1 | * | 11/2001 | Crain ....................... G06F 3/14 |
| | | | 715/744 |
| 2001/0038393 A1 | * | 11/2001 | Crain ....................... G06F 3/14 |
| | | | 715/744 |
| 2002/0012012 A1 | * | 1/2002 | Crain ....................... G06F 3/14 |
| | | | 715/744 |
| 2002/0015024 A1 | | 2/2002 | Westerman et al. |
| 2002/0033845 A1 | | 3/2002 | Elber et al. |
| 2002/0063705 A1 | | 5/2002 | Moriwaki et al. |
| 2002/0103894 A1 | * | 8/2002 | Tanaka ........................... 709/224 |
| 2002/0158905 A1 | * | 10/2002 | Bazzoni ............ G06F 17/30861 |
| | | | 715/760 |
| 2003/0052877 A1 | * | 3/2003 | Schwegler et al. ........... 345/420 |
| 2003/0140107 A1 | * | 7/2003 | Rezvani et al. ............... 709/208 |
| 2003/0193524 A1 | * | 10/2003 | Bates et al. .................... 345/786 |
| 2003/0206150 A1 | | 11/2003 | Hussey et al. |
| 2004/0027460 A1 | * | 2/2004 | Morita ..................... 348/211.99 |
| 2004/0135824 A1 | | 7/2004 | Fitzmaurice |
| 2004/0141010 A1 | | 7/2004 | Fitzmaurice et al. |
| 2004/0189802 A1 | | 9/2004 | Flannery |
| 2004/0233222 A1 | | 11/2004 | Lee et al. |
| 2004/0240709 A1 | | 12/2004 | Shoemaker |
| 2005/0060667 A1 | | 3/2005 | Robbins |
| 2005/0168488 A1 | | 8/2005 | Montague |
| 2005/0187832 A1 | | 8/2005 | Morse et al. |
| 2005/0210380 A1 | | 9/2005 | Kramer et al. |
| 2005/0212756 A1 | | 9/2005 | Marvit et al. |
| 2005/0212823 A1 | * | 9/2005 | Uthe ...................... G06F 3/0481 |
| | | | 345/660 |
| 2006/0004298 A1 | | 1/2006 | Kennedy et al. |
| 2006/0070111 A1 | * | 3/2006 | Kurosawa ...................... 725/105 |
| 2006/0080604 A1 | | 4/2006 | Anderson |
| 2006/0090022 A1 | | 4/2006 | Flynn et al. |
| 2006/0136836 A1 | * | 6/2006 | Clee et al. ..................... 715/781 |
| 2006/0202973 A1 | | 9/2006 | Kobayashi et al. |
| 2006/0253245 A1 | | 11/2006 | Cera et al. |
| 2006/0284839 A1 | | 12/2006 | Breed et al. |
| 2007/0136557 A1 | * | 6/2007 | Okochi et al. ................. 711/209 |
| 2007/0136690 A1 | | 6/2007 | MacLaurin et al. |
| 2007/0162871 A1 | | 7/2007 | Ishii |
| 2007/0179646 A1 | | 8/2007 | Dempski et al. |
| 2007/0192739 A1 | | 8/2007 | Hunleth et al. |
| 2007/0198941 A1 | | 8/2007 | Baar et al. |
| 2007/0206030 A1 | | 9/2007 | Lukis |
| 2007/0255115 A1 | * | 11/2007 | Anglin et al. ................. 600/300 |
| 2007/0285419 A1 | * | 12/2007 | Givon ............................ 345/420 |
| 2007/0300182 A1 | * | 12/2007 | Bilow ........................... 715/799 |
| 2008/0024500 A1 | * | 1/2008 | Bae ............................... 345/442 |
| 2008/0034321 A1 | * | 2/2008 | Griffin .......................... 715/799 |
| 2008/0037829 A1 | * | 2/2008 | Givon ............................ 382/107 |
| 2008/0070684 A1 | * | 3/2008 | Haigh-Hutchinson ......... 463/32 |
| 2008/0070686 A1 | * | 3/2008 | Satsukawa et al. ............. 463/37 |
| 2008/0098333 A1 | * | 4/2008 | Champion et al. ........... 715/849 |
| 2008/0168349 A1 | * | 7/2008 | Lamiraux ............. G06F 3/0482 |
| | | | 715/702 |
| 2009/0019402 A1 | * | 1/2009 | Ke et al. ....................... 715/849 |
| 2009/0055758 A1 | * | 2/2009 | Sim et al. ..................... 715/762 |

OTHER PUBLICATIONS

Robert Zeleznik et al., "UniCam—2D Gestural Camera Controls for 3D Environments" Brown University, Department of Computer Science, 1999 Symposium on Interactive 3D Graphics, Atlanta, GA, pp. 169-173.

Nicolas Villar, et al., "The VoodooIO Gaming Kit: A real-time adaptable gaming controller", Lancaster University, Computing Department, ACE 06, Jun. 14-16, 2006, Hollywood, CA.

Gordon Kurtenbach, et al., "The Limits of Expert Performance Using Hierarchic Marking Menus" Department of Computer Science, University of Toronto, Apr. 24-29, 1993, pp. 482-487.

Don Hopkins, et al., "The Design and Implementation of Pie Menus", Dr. Dobb's Journal, Dec. 1991.

William A. S. Buxton, "A Three-State Model of Graphical Input", Human-Computer Interaction—Interact 1990, pp. 449-456.

Tomer Moscovich, et al., "Multi-finger Cursor Techniques", Department of Computer Science, Brown University, Graphics Interface, 2006, pp. 1-7.

Morton Hertzum, et al., "Input techniques that dynamically change their cursor activation area: A comparison of bubble and cell cursors", International Journal of Human-Computer Studies, vol. 65, No. 10, 2007, pp. 833-851.

Desney S. Tan, et al., "Exploring 3D Navigation: Combining Speed-coupled Flying with Orbiting", Microsoft Research, Letters chi, 2001, vol. 3, Issue 1, pp. 418-425.

Yang Li, et al., "Experimental Analysis of Mode Switching Techniques in Pen-based User Interfaces", Letters CHI 2005, pp. 461-470.

Edwin L. Hutchins, et al., "Direct Manipulation Interfaces", Human-Computer Interaction, 1985, vol. 1, pp. 311-338.

Stuart Pook, et al., "Control Menus: Execution and Control in a Single Interactor", Letters CHI 2000, pp. 263-264.

Michael Gleicher, et al., "Through-the-Lens Camera Control", School of Computer Science, Carnegie Mellon University, Computer Graphics, vol. 26, No. 2, Jul. 1992, pp. 331-340.

International Search Report and the Written Opinion of the International Searching Authority dated Dec. 3, 2008 in corresponding International Patent Application No. PCT/US08/77928.

(56) References Cited

OTHER PUBLICATIONS

International Search Report and the Written Opinion of the International Searching Authority dated Dec. 3, 2008 in corresponding International Patent Application No. PCT/US08/77912.
International Search Report and the Written Opinion of the International Searching Authority dated Dec. 2, 2008 in corresponding International Patent Application No. PCT/US08/77929.
International Search Report and the Written Opinion of the International Searching Authority dated Dec. 2, 2008 in corresponding International Patent Application No. PCT/US08/77915.
International Search Report and the Written Opinion of the International Searching Authority dated Dec. 4, 2008 in corresponding International Patent Application No. PCT/US08/77966.
International Search Report and the Written Opinion of the International Searching Authority dated Dec. 5, 2008 in corresponding International Patent Application No. PCT/US08/77964.
International Search Report and the Written Opinion of the International Searching Authority dated Dec. 2, 2008 in corresponding International Patent Application No. PCT/US08/77963.
International Search Report and the Written Opinion of the International Searching Authority dated Dec. 4, 2008 in corresponding International Patent Application No. PCT/US08/77949.
International Search Report and the Written Opinion of the International Searching Authority dated Dec. 2, 2008 in corresponding International Patent Application No. PCT/US08/77969.
International Search Report and the Written Opinion of the International Searching Authority dated Dec. 2, 2008 in corresponding International Patent Application No. PCT/US08/77958.
International Search Report and the Written Opinion of the International Searching Authority dated Dec. 8, 2008 in corresponding International Patent Application No. PCT/US08/77962.
International Search Report and the Written Opinion of the International Searching Authority dated Dec. 3, 2008 in corresponding International Patent Application No. PCT/US08/77967.
International Search Report and the Written Opinion of the International Searching Authority dated Dec. 8, 2008 in corresponding International Patent Application No. PCT/US08/77931.
International Search Report and the Written Opinion of the International Searching Authority dated Dec. 2, 2008 in corresponding International Patent Application No. PCT/US08/77938.
International Search Report and the Written Opinion of the International Searching Authority dated Jan. 12, 2009 in corresponding International Patent Application No. PCT/US08/77939.
International Preliminary Report on Patentability dated Mar. 30, 2010 in corresponding International Patent Application No. PCT/US08/077928.
International Preliminary Report on Patentability dated Mar. 30, 2010 in corresponding International Patent Application No. PCT/US08/077912.
International Preliminary Report on Patentability dated Mar. 30, 2010 in corresponding International Patent Application No. PCT/US08/077929.
International Preliminary Report on Patentability dated Mar. 30, 2010 in corresponding International Patent Application No. PCT/US08/077915.
International Preliminary Report on Patentability dated Mar. 30, 2010 in corresponding International Patent Application No. PCT/US08/077966.
International Preliminary Report on Patentability dated Mar. 30, 2010 in corresponding International Patent Application No. PCT/US08/077964.
International Preliminary Report on Patentability dated Mar. 30, 2010 in corresponding International Patent Application No. PCT/US08/077963.
International Preliminary Report on Patentability dated Mar. 30, 2010 in corresponding International Patent Application No. PCT/US08/077949.
International Preliminary Report on Patentability dated Mar. 30, 2010 in corresponding International Patent Application No. PCT/US08/077969.
International Preliminary Report on Patentability dated Mar. 30, 2010 in corresponding International Patent Application No. PCT/US08/077958.
International Preliminary Report on Patentability dated Mar. 30, 2010 in corresponding International Patent Application No. PCT/US08/077962.
International Preliminary Report on Patentability dated Mar. 30, 2010 in corresponding International Patent Application No. PCT/US08/077967.
International Preliminary Report on Patentability dated Mar. 30, 2010 in corresponding International Patent Application No. PCT/US08/077931.
International Preliminary Report on Patentability dated Mar. 30, 2010 in corresponding International Patent Application No. PCT/US08/077938.
International Preliminary Report on Patentability dated Mar. 30, 2010 in corresponding International Patent Application No. PCT/US08/077939.
Anthony Steed, "Efficient Navigation Around Complex Virtual Environments", Virtual Reality Software and Technology, Proceedings of the ACM symposium on Virtual reality software and technology, 1997, pp. 173-180.
Colin Ware et al., "Exploration and virtual camera control in virtual three dimensional environments", Symposium on Interactive 3D Graphics, Proceedings of the 1990 symposium on Interactive 3D graphics, 1990, pp. 175-183.
Robert C. Zeleznik et al., "Two pointer input for 3D interaction", Symposium on Interactive 3D Graphics, Proceedings of the 1997 symposium on Interactive 3D graphics, 1997, pp. 115-120.
Jock D. Mackinlay, "Rapid controlled movement through a virtual 3D workspace", ACM SIGGRAPH Computer Graphics, vol. 24, No. 4, Aug. 1990, pp. 171-176.
Colin Ware et al., "Context sensitive flying interface", Symposium on Interactive 3D Graphics, Proceedings of the 1997 symposium on Interactive 3D graphics, 1997, pp. 127-130.
William H. Bares et al., "Intelligent multi-shot visualization interfaces for dynamic 3D worlds", International Conference on Intelligent User Interfaces, Proceedings of the 4th international conference on Intelligent user interfaces, 1998, pp. 119-126.
Tinsley A. Galyean, "Guided navigation of virtual environments", Symposium on Interactive 3D Graphics, Proceedings of the 1995 symposium on Interactive 3D graphics, 1995, pp. 103-104 and 210.
George Fitzmaurice et al., "Tracking menus", Symposium on User Interface Software and Technology, Proceedings of the 16th annual ACM symposium on User interface software and technology, 2003, pp. 71-79.
Nicholas Burtnyk et al., "StyleCam: interactive stylized 3D navigation using integrated spatial & temporal controls", Symposium on User Interface Software and Technology, Proceedings of the 15th annual ACM symposium on User interface software and technology, 2002, pp. 101-110.
Doug A. Bowman et al., "Testbed evaluation of virtual environment interaction techniques", Virtual Reality Software and Technology, Proceedings of the ACM symposium on Virtual reality software and technology, 1999, pp. 26-33.
Nicolas Burtnyk et al., "ShowMotion: camera motion based 3d design review", Symposium on Interactive 3D Graphics, Proceedings of the 2006 symposium on Interactive 3D graphics and games, 2006, pp. 167-174.
Azam Khan et al., "ViewCube: a 3D orientation indicator and controller", Symposium on Interactive 3D Graphics, Proceedings of the 2008 symposium on Interactive 3D graphics and games, 2008, pp. 17-25.
Michael Tsang et al., "Boom chameleon: simultaneous capture of 3D viewpoint, voice and gesture annotations on a spatially-aware display", Symposium on User Interface Software and Technology, Proceedings of the 15th annual ACM symposium on User Interface software and technology, 2002, pp. 111-120.
Ravin Balakrishnan et al., "Exploring bimanual camera control and object manipulation in 3D graphics interfaces", Conference on Human Factors in Computing Systems, Proceedings of the SIGCHI conference on Human factors in computing systems: the CHI is the limit, 1999, pp. 56-62.

(56) References Cited

OTHER PUBLICATIONS

Francois Guimbretiere et al., "ExperiScope: an analysis tool for interaction data", Conference on Human Factors in Computing Systems, Proceedings of the SIGCHI conference on Human factors in computing systems, 2007, pp. 1333-1342.

Gordon Paul Kurtenbach, "The Design and Evaluation of Marking Menus", PhD Thesis, Graduate Department of Computer Science, University of Toronto, 1993.

Francois Guimbretiere, "Fluid interaction with high-resolution wall-size displays", Symposium on User Interface Software and Technology, Proceedings of the 14$^{th}$ annual ACM symposium on User interface software and technology, 2001, pp. 21-30.

Shumin Zhai et al., "The 'Silk Cursor': investigating transparency for 3D target acquisition", Conference on Human Factors in Computing Systems, Proceedings of the SIGCHI conference on Human factors in computing systems: celebrating interdependence, 1994, pp. 459-464.

Tovi Grossman et al., "The bubble cursor: enhancing target acquisition by dynamic resizing of the cursor's activation area", Conference on Human Factors in Computing Systems, Proceedings of the SIGCHI conference on Human factors in computing systems, 2005, 281-290.

Gordon Kurtenbach et al., "The Hotbox: efficient access to a large number of menu-items", Conference on Human Factors in Computing Systems, Proceedings of the SIGCHI conference on Human factors in computing systems: the CHI is the limit, 1999, 231-237.

Tovi Grossman et al., "Hover widgets: using the tracking state to extend the capabilities of pen-operated devices", Conference on Human Factors in Computing Systems, Proceedings of the SIGCHI conference on Human Factors in computing systems, 2006, 861-870.

Beverly L. Harrison et al., "An experimental evaluation of transparent menu usage", Conference on Human Factors in Computing Systems, Proceedings of the SIGCHI conference on Human factors in computing systems: common ground, 1996, pp. 391-398.

Barry A. Po et al., "Comparing cursor orientations for mouse, pointer, and pen interaction", Conference on Human Factors in Computing Systems, Proceedings of the SIGCHI conference on Human factors in computing systems, 2005, pp. 291-300.

Michael McGuffin et al., "FaST Sliders: Integrating Marking Menus and the Adjustment of Continuous Values", Graphics Interface, 2002, pp. 35-42.

Ken Hinckley et al., "The springboard: multiple modes in one spring-loaded control", Conference on Human Factors in Computing Systems, Proceedings of the SIGCHI conference on Human Factors in computing systems, 2006, pp. 181-190.

Gordon Kurtenbach et al., "Issues in combining marking and direct manipulation techniques", Symposium on User Interface Software and Technology, Proceedings of the 4$^{th}$ annual ACM symposium on User interface software and technology, 1991, pp. 137-144.

Jack Callahan et al., "An empirical comparison of pie vs. linear menus", Conference on Human Factors in Computing Systems, Proceedings of the SIGCHI conference on Human factors in computing systems, 1988, pp. 95-100.

Michael J. Muller et al, "Multifunctional Cursor for Direct Manipulation User Interfaces", Conference on Human Factors in Computing Systems, Proceedings of the SIGCHI conference on Human factors in computing systems, 1988, pp. 89-94.

Francois Guimbretiere et al., "Benefits of merging command selection and direct manipulation", ACM Transactions on Computer-Human Interaction (TOCHI), 2005, pp. 460-476.

D. Nieuwenhuisen et al., "High quality navigation in computer games", Science of Computer Programming, vol. 67, No. 1, 2007, pp. 91-104.

George Drettakis, "Design and Evaluation of a Real-World Virtual Environment for Architecture and Urban Planning", Presence: Teleoperators and Virtual Environments, vol. 16, No. 3, 2007.

U.S. Appl. No. 12/200,278, filed Aug. 28, 2008, Fitzmaurice, et al., Autodesk, Inc.

U.S. Appl. No. 12/200,355, filed Aug. 28, 2008, Fitzmaurice, et al., Autodesk, Inc.

U.S. Appl. No. 12/200,340, filed Aug. 28, 2008, Fitzmaurice, et al., Autodesk, Inc.

U.S. Appl. No. 12/200,333, filed Aug. 28, 2008, Fitzmaurice, et al., Autodesk, Inc.

U.S. Appl. No. 12/200,346, filed Aug. 28, 2008, Fitzmaurice, et al., Autodesk, Inc.

U.S. Appl. No. 12/200,485, filed Aug. 28, 2008, Fitzmaurice, et al., Autodesk, Inc.

U.S. Appl. No. 12/200,327, filed Aug. 28, 2008, Fitzmaurice, et al., Autodesk, Inc.

U.S. Appl. No. 12/200,309, filed Aug. 28, 2008, Fitzmaurice, et al., Autodesk, Inc.

U.S. Appl. No. 12/200,440, filed Aug. 28, 2008, Fitzmaurice, et al., Autodesk, Inc.

U.S. Appl. No. 12/200,475, filed Aug. 28, 2008, Fitzmaurice, et al., Autodesk, Inc.

U.S. Appl. No. 12/200,373, filed Aug. 28, 2008, Fitzmaurice, et al., Autodesk, Inc.

U.S. Appl. No. 12/200,429, filed Aug. 28, 2008, Fitzmaurice, et al., Autodesk, Inc.

U.S. Appl. No. 12/200,449, filed Aug. 28, 2008, Fitzmaurice, et al., Autodesk, Inc.

U.S. Appl. No. 12/200,319, filed Aug. 28, 2008, Fitzmaurice, et al., Autodesk, Inc.

U.S. Appl. No. 12/200,458, filed Aug. 28, 2008, Fitzmaurice, et al., Autodesk, Inc.

U.S. Appl. No. 12/200,480, filed Aug. 28, 2008, Fitzmaurice, et al., Autodesk, Inc.

U.S. Appl. No. 12/200,421, filed Aug. 28, 2008, Fitzmaurice, et al., Autodesk, Inc.

* cited by examiner

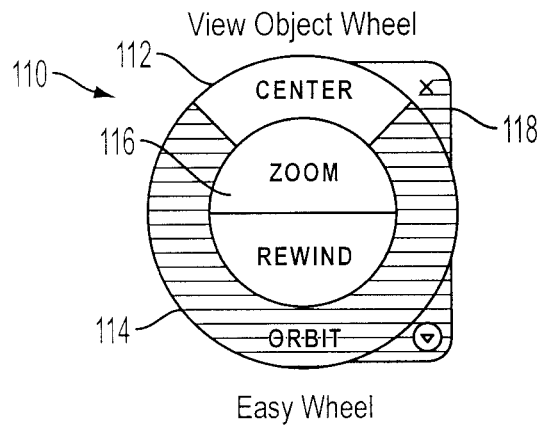
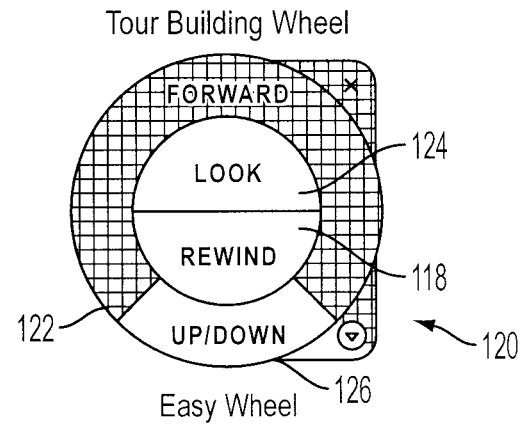
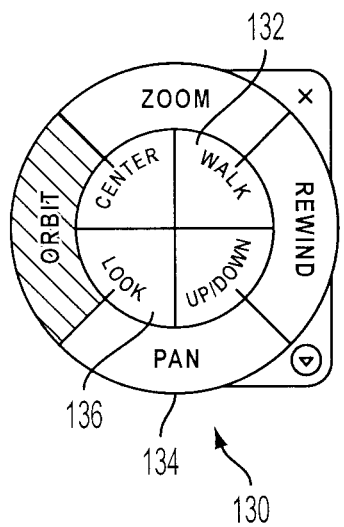
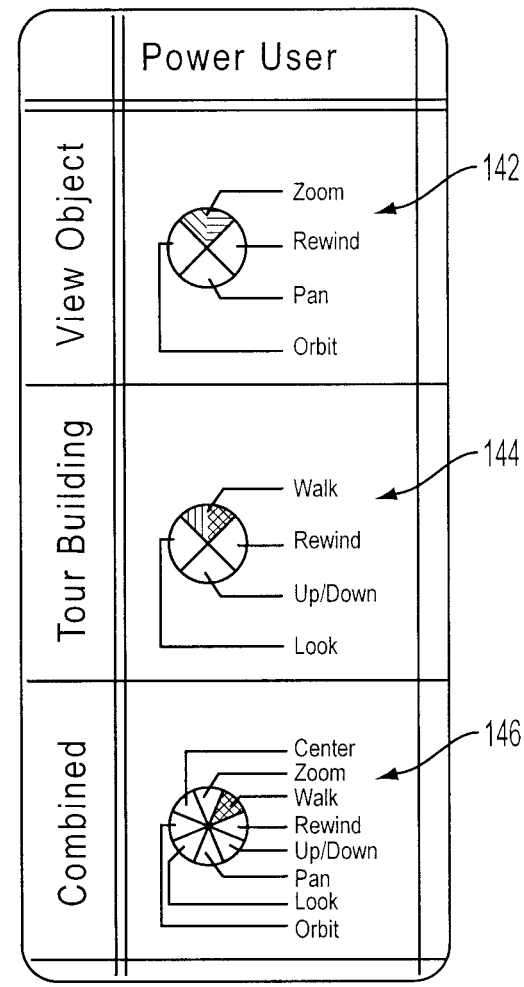
FIG. 1

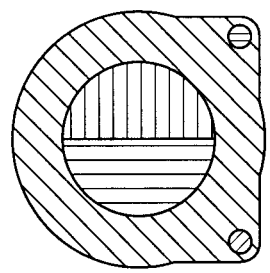
2D Wheel
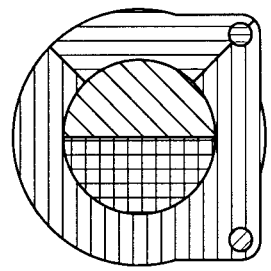
View Object Wheel
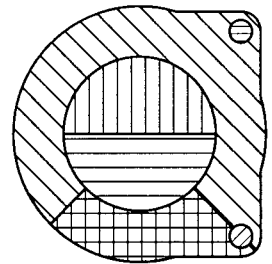
Tour Building Wheel
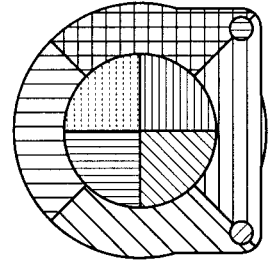
Full Navigation Wheel
FIG. 3A

Mini Full Wheel
Mini Object and Mini Tour Wheel
FIG. 3B

Walk

Up/Down

Zoom

FLOWCHART OF WINDOW CURSOR WRAPPING

FLOWCHART OF REWIND HISTORY ADDITIONS

FLOWCHART OF REWIND TOOL USAGE

FLOWCHART OF PAN TOOL INITIALIZATION

FLOWCHART OF MINIWHEEL WEDGE ACTIVATION

NAVIGATION SYSTEM FOR A 3D VIRTUAL SCENE

CROSS-REFERENCE TO RELATED APPLICATIONS

This application is related to and claims priority to U.S. provisional application entitled Steering Wheels having Ser. No. 60/975,366, by Fitzmaurice, et al, filed Sep. 26, 2007 and incorporated by reference herein. This application is also related to and claims priority to U.S. provisional application entitled Steering Wheels having Ser. No. 61/022,640, by Fitzmaurice, et al, filed Jan. 22, 2008 and incorporated by reference herein.

BACKGROUND

1. Field

The embodiments discussed herein are directed to allowing a user to move up and down within a scene relative to an up axis of the scene without the user being displaced horizontally with a scale is showing the user the relative position of the current view in the vertical bounding box of the scene.

2. Description of the Related Art

Today, operating with three dimensional (3D) scenes is becoming more and more common. As a result, new or novice users are being confronted with a system that can be difficult and hard to use. However, it is also necessary to allow experienced users to also use the 3D systems effectively. What is needed is a system that accommodates and helps both novice and advanced users.

SUMMARY

A navigation system for navigating a three-dimensional (3D) scene that includes a model or object with which a user can interact. The system accommodates and helps both novice and advanced users. To do this, the system allows a user to move up and down within a scene relative to an up axis of the scene without the user being displayed horizontally. A scale is provided that shows the user the relative position of the current view in the vertical bounding box of the scene. Moving up and down in a three dimensional scene can involve detecting activation of a mouse button, displaying an up down/slider with a position marker positioned on the slider indicating a position of a view relative to top and bottom bounding box limits, moving the view up and down in the scene along an up axis of the scene responsive to up and down cursor motion relative to the scene and updating the up/down slider responsive to view position.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates view object, tour and full navigation GUI wheels and the corresponding mini or pie cursor GUIs.
FIGS. 3a and 3b depict the hit zones of the wheels.
FIGS. 40 and 41 show rewind operation while

DETAILED DESCRIPTION OF THE EMBODIMENTS

Figure 2:
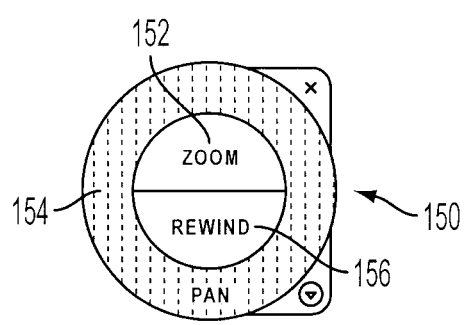
FIG. 2 depicts a 2D wheel.

The embodiments of the present invention discussed herein provide a navigation system for three dimensional (3D) scene navigation for new and experienced users that allow fast and safe navigation within a 3D scene (or 2D scene). The system, as depicted in FIG. 1, includes a set 100 of graphical user interface (GUI) navigation widgets or wheels (or navigation tools) and corresponding miniature or pie menu versions, action tools that can be activated with the widgets and accompanying GUI navigation aids (not shown in this figure). The tools allow the user to perform different operations within the scene, such as panning and zooming.

The set of widgets or wheels, as includes a view object wheel 110 would typically be used by a novice or an inexperienced 3D user to navigate around an object in a scene, such as a model of an automobile or a part. The view object wheel 110 includes a center action tool 112. The center tool 112 is located in the upper wedge of the view object wheel 110. The center tool is designed to bring (through an automatic pan operation) a clicked point on a model part or other object to the center of the canvas view.

A tool 110 secondary purpose is to establish a reference point in 3D space for other tools on the wheel 110. The orbit tool 114 allows a user to orbit around an object in a scene where the center of the orbit is the center reference point. The zoom tool 116 allows a user to zoom in toward or out away from the center point. The rewind tool 118 allows the user to rewind back through way points that are automatically saved as the user navigates about a scene.

A tour wheel 120 would typically be used by a novice to navigate within a building. A full navigation wheel 130 is designed for an experienced user and includes all of the tools of the object 110 and tour 120 wheels. The tour wheel 120 includes the rewind tool discussed above. The tour wheel 120 also includes a forward action tool 122. This forward tool 122 allows a user to move forward in the scene toward an object or model in the scene. If there is no object beneath the cursor, no motion occurs and the user is informed that no motion will occur via an invalid action or prohibited action message. A look tool 124 allows a user to "look" or change the view toward the left, right, up or down much the way a person turns their head in these directions. An up/down tool 126 allows the user to move vertically up and down within the scene.

The full navigation wheel 130 includes all of the tools functionality of the object 110 and tour 120 navigation tools with additional capability. A walk tool 132 allows users to interactively walk about in 3D space, moving forward and backwards and/or turning freely to the left or right. A pan tool 134 allows the user to move up, down, right and left in the scene. The zoom tool moves in and out from the current cursor position instead of the center point.

Each of the wheels 110, 120 and 130 has a corresponding miniature or mini wheel 142, 144 and 146, respectively, each of which includes the same action tools arranged in a pie type shape with each action tool occupying a pie wedge that corresponds to the general location of the action tool in the full size version.

A 2D navigation wheel 150 can also be provided as depicted in FIG. 2 and includes the zoom 152, pan 154 and rewind 156 tools.

Figure 2A:
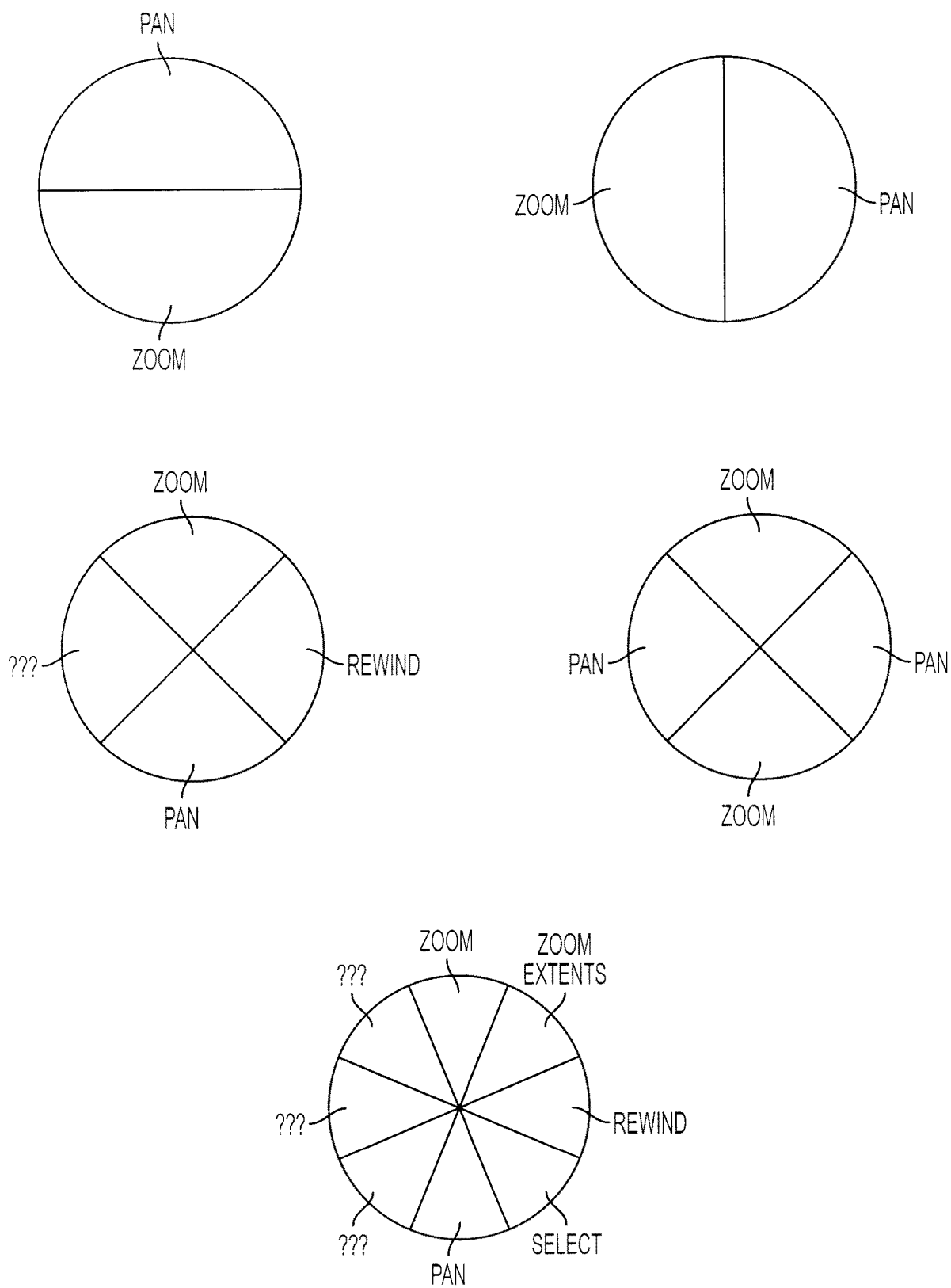
FIG. 2a depicts other mini-wheels.

FIG. 2a depicts enlarged versions of different mini-wheels some of which have places for additional functions.

The navigation tools or wheels have some common characteristics.

The wheels are all tracking menus. A tracking menu is a cluster of graphical buttons, as with traditional menus, the cursor (sometimes shaped like an arrow) can be moved within the menu to select and interact with items. However, unlike traditional menus, when the cursor hits the edge of the menu, the menu moves to continue tracking the cursor. Thus the menu always stays under the cursor and close at hand. Each wheel is displayed on the "canvas" of the screen display for 2D drawing and 3D model views. As long as the tool is active the wheel's menu surface will track and follow the mouse or input device cursor when it hits the edge of the menu surface. No mouse button down is required to get the menu to follow along. If the mouse cursor leaves the canvas area, the menu still follows the mouse off-canvas, and the navigation tool menu will re-display when the mouse cursor returns to the canvas and moves the menu along with it.

Each wheel is "pinned" to the mouse cursor when the left mouse button is held and a child tool is selected. When a child tool is no longer in use, the wheel re-appears under the mouse cursor on the canvas. The cursor is displayed exactly on the tool where it clicked to start the tool usage. So, for example, when the zoom tool is released, the wheel is aligned under the cursor exactly as it was when the mouse button was first pressed, while the cursor was on the zoom tool. This allows users to quickly re-invoke the same tool if needed. If the mouse cursor is off the canvas when the sub-tool is exited, the wheel continues to track the cursor. If the user moves the cursor back towards the canvas area the wheel is moved along until it becomes visible again.

Each of the wheels has the most used functions or action tools on an exterior and lesser used functions in the center. In addition, functions can occupy different amounts or space consistent with the importance of that function. The wheels, both full and mini, can have different sizes from 256×256 pixels down to 16×16 pixels. At a size of 32×32 the arrow cursor is no longer visible. The wheels appear on top of the canvas and any objects that are in the canvas are still visible since the wheels can be made semi-transparent. The wheels' level of opacity can be set in a range between 25% and 90% (i.e., mostly opaque). No matter what the transparency setting, the navigate tool or wheel is completely hidden (invisible) while one of its child tools is in use. Each child tool will determine any on screen display that may be required for itself. When the child tool is released, the wheel is redisplayed using the current transparency settings.

The area of each action tool is highlighted (including wedges in the mini wheels) as the cursor moves over the tool to alert the user that the user is over that tool. The area of each tool corresponds to the activation or hit zones, as depicted in FIGS. 3a (big wheels) and 3b (mini wheels), unless the area is enlarged or enhanced, as will be discussed in more detail later. As a cursor is moved about on the menu, the cursor location is mapped to a corresponding location in representation of the hit zones. If the cursor is in one of the zones, that tool is highlighted. If the left mouse button is clicked down or activated while in a zone the tool corresponding to the zone is activated and the function starts at the point of the cursors.

Figure 4:
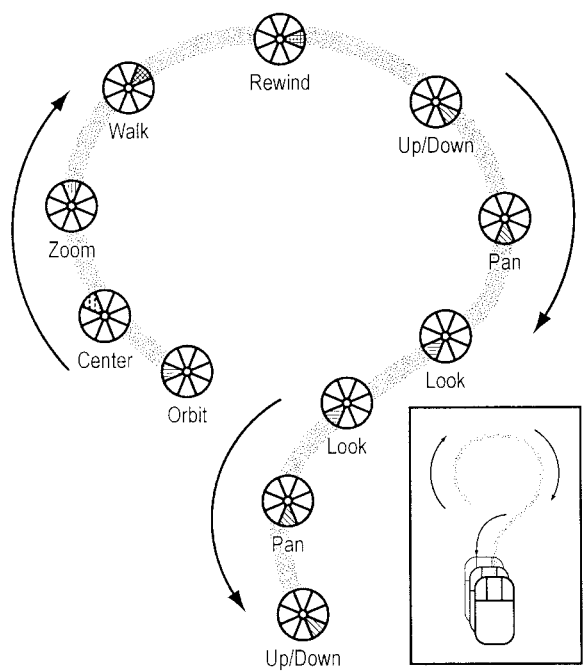
FIG. 4 shows cursor motion and wedge tool focus.

The highlighting and selection for a mini wheel is particularly depicted in FIGS. 4 and 5. With the mini wheel, a full size wheel is miniaturized into a cursor-size with a radial layout based on the particular corresponding full size navigation tool selected and in effect becomes a pie menu cursor. The cursor (arrow) is preferably hidden and, in effect, the mini wheel menu itself serves to show cursor location. When the hidden system cursor hits the edge of the mini wheel, the mini wheel follows the system cursor. However, depending on which direction the mouse is moved, the command in that direction within the pie layout is highlighted as depicted in FIG. 4. Preferably, command or tool wedges are color-coded with one wedge active at all times and a small label is shown below the cursor to indicate the tool name as shown in FIG. 4.

Figure 4A:
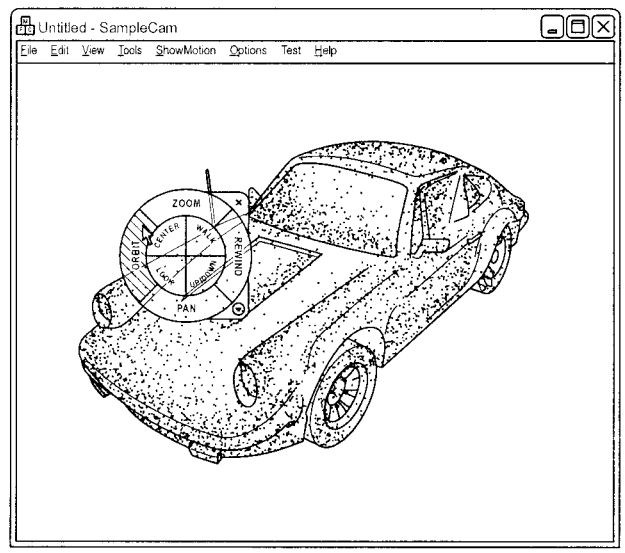
FIGS. 4a and 4b shows switching between big and mini wheels.
Figure 4B:
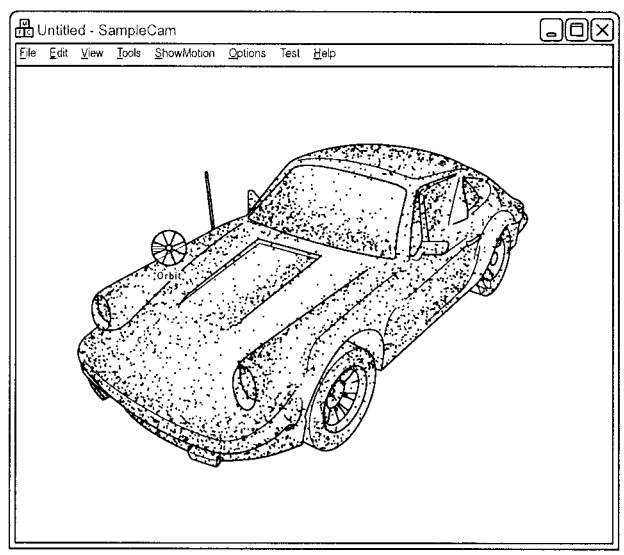
Figure 5A:
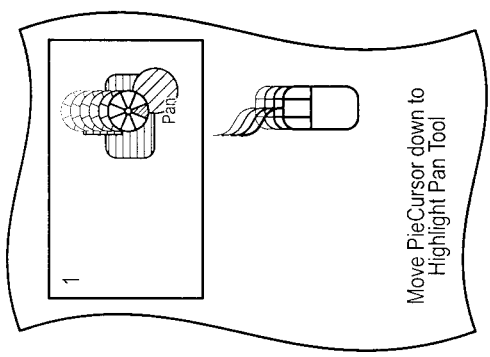
FIGS. 5A-5D, shows pie cursor operation.
Figure 5B:
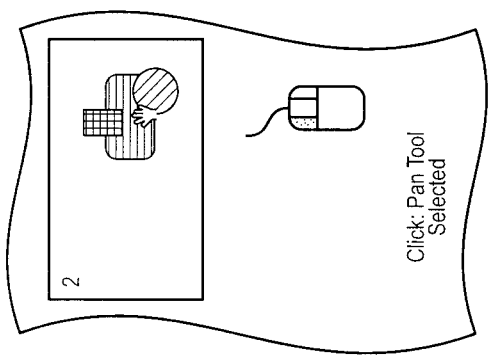
Figure 5C:
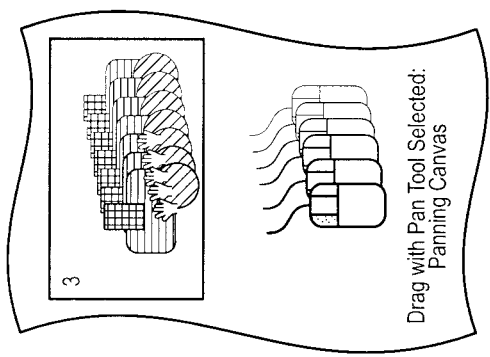
Figure 5D:
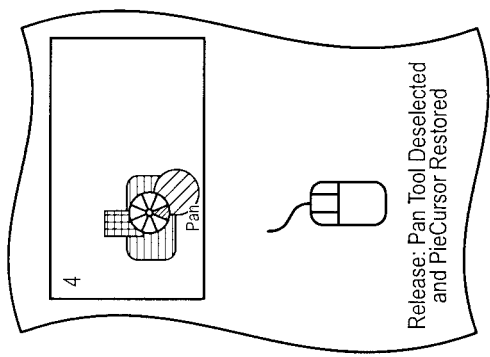

A mouse down event activates a highlighted command and the mini wheel cursor is replaced by the appropriate tool cursor. A user can then drag to operate the command (for example, dragging to zoom in/out using the standard zoom tool cursor). Releasing the mouse button brings back the mini wheel cursor as depicted in FIGS. 4a and 4b. The selection and operation of any of the commands in a mini wheel cursor is only one button press away and can be performed in-place. The one button press indicates both which command is being activated and the starting point for that command. By strategically planning ahead, a user is able to adjust their mouse input "approach path" to select a target object such that the desired command wedge is highlighted when over the target object. Thus, the desired command can immediately be activated with a mouse down event. This effectively merges pointing and command selection into a single act.

FIG. 5, including 5a-5c, shows an example usage of pointing, command selection and command operation for the mini wheel cursor. FIG. 5a shows the cursor motion to highlight a command. FIG. 5b shows clicking to activate the command (a pan tool). FIG. 5c shows dragging to operate the pan tool and FIG. 5d shows the release of the mouse button to deselect the tool and restore the mini wheel cursor.

Figure 6:
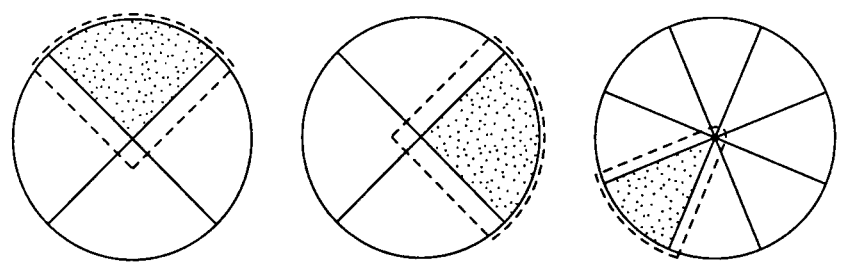
FIG. 6 shows enlarged hit zones for the pie cursor.

The wedge selection or tool associated with a mini wheel or pie cursor can be enhanced by extending the hit zone of the active wedge as shown in FIG. 6. As depicted the wedge hit zone is expanded (dotted line) to be larger than the visible tool wedge by a small percentage such as 10%. This allows for a subtle form of wedge stickiness and also serves to reduce the instability that can occur if the input point is at the center of the pie cursor. The hotspot for the pie cursor lies within the active wedge and is the true cursor position. Since the wedges are fairly small, and the true cursor position is usually at the outer edge of the wedge, the hotspot becomes very predictable. As previously discussed, the pie cursor is not a pop-up menu; rather, like a regular tool, you select it from the toolbar and it becomes your cursor thus changing your input mode.

Each wheel exhibits a slide under behavior when the ShowMotion UI and/or the View Cube are displayed on the canvas. The wheel passes under both of these other features' onscreen displays.

Figure 7:
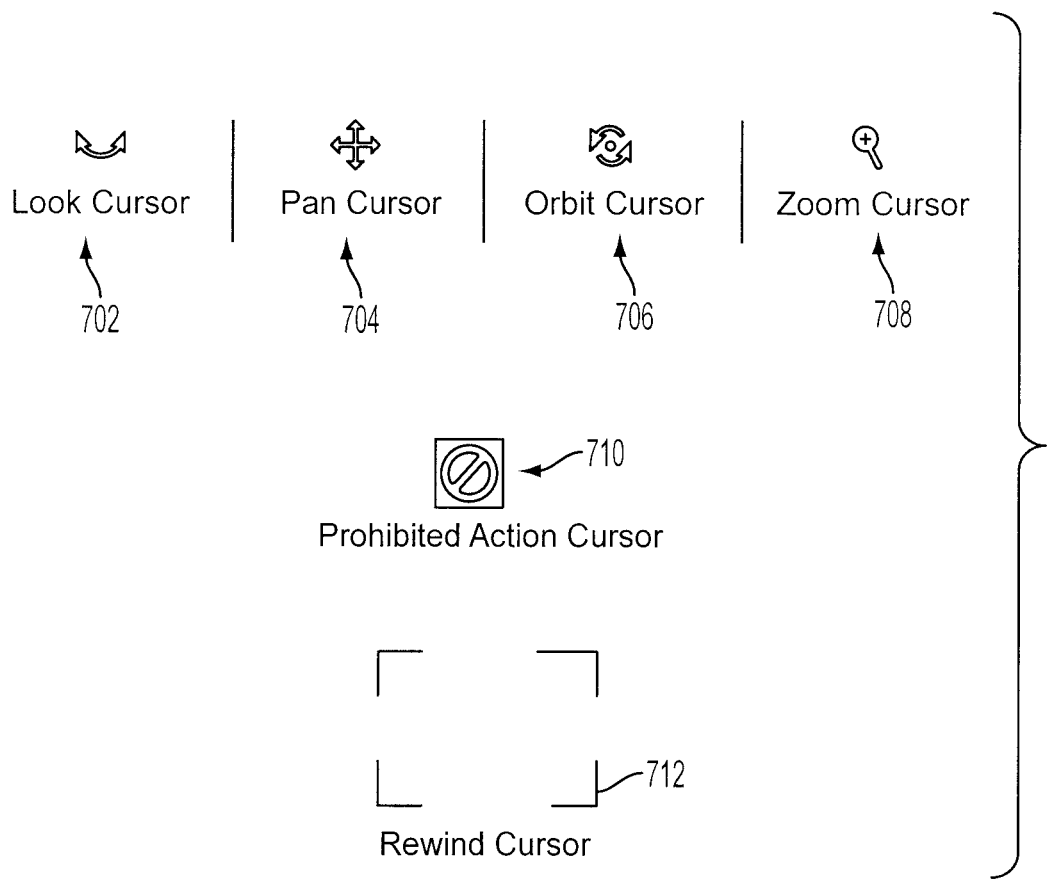
FIG. 7 shows cursors to various tools.

FIG. 7 depicts cursors that can be used when the look 702, pan 704, orbit 706, zoom 708, rewind 710 cursors are activated, as well as the prohibited operation/action cursor 712. Each of the cursors has text associated with it when it is displayed above the canvas that provides the name of the tool, such as the "Orbit Cursor" text shown for the orbit tool cursor 706.

Figure 8:
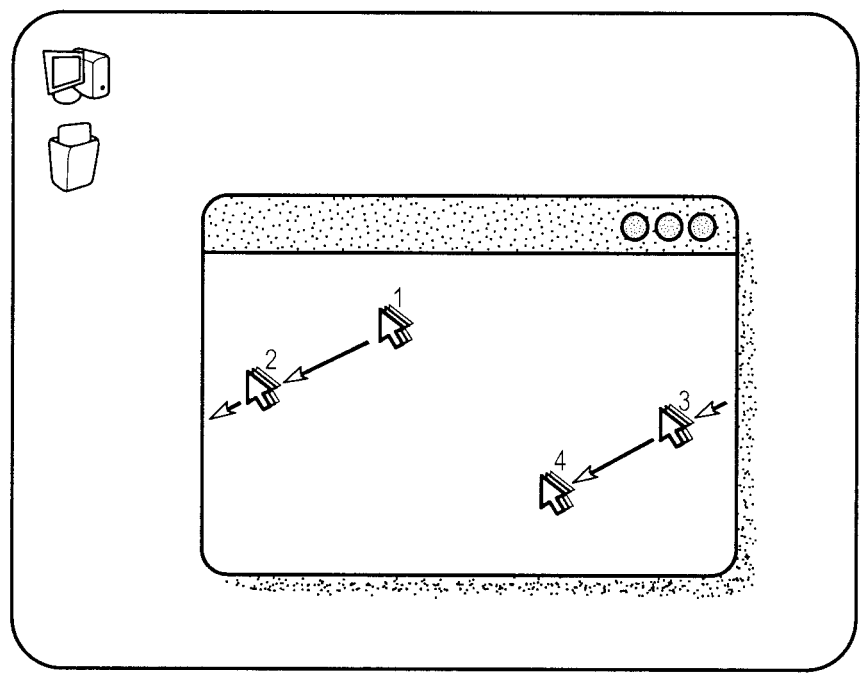
FIG. 8 shows cursor wrapping.

As the above cursors are moved about on the canvas, when the cursor encounters the edge of the display or canvas, the cursor wraps around as depicted in FIG. 8. As can be seen as the cursor moves from position 1 to 2 to the left edge of the screen, the cursor reappears on the right side of the screen at the same vertical position and traveling in the same direction as shown by positions 3 and 4. When the cursor exits the top or bottom, the cursor reenters at the same horizontal position.

Figure 9:
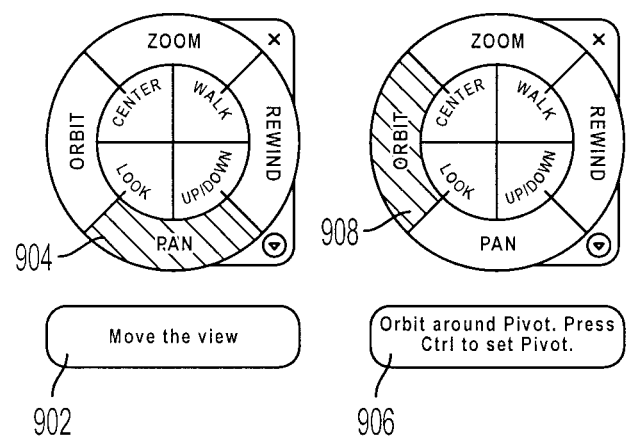
FIG. 9 shows tool tips.
Figure 10:
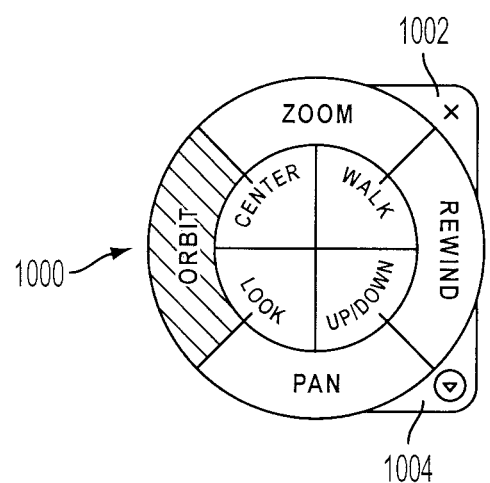
FIG. 10 illustrates close too and open tool menu nibs.

All of the tools of each wheel can have a tool tip or description graphic (HUD—heads-up-display) that is displayed when the cursor hovers over the tool. FIG. 9 depicts a tool tip 902 for the pan tool 904 and a tool tip 906 for the orbit tool 908. The tool tips are the same size for each function. The HUD may also be shown below the cursor while a tool is in use. This HUD display element can follow the cursor about on the canvas while the tool is active (left mouse down) and is removed when the user exits the tool (left mouse up). Some tools may offer more complicated displays or aids than just a description.

As depicted in FIG. 5, each full size wheel 1000 has a close button 1002 that closes the GUI. The system stores and will remember the last tool that was in use when one of the wheels is activated. When a wheel is closed or dismissed, the previously active toolbar tool is restored or made active. If no other tool has been activated in the session, the "Select Tool" menu will be activated by default when closing a wheel via the close button. Each wheel also includes a menu button 1004. When the menu button 1004 is left mouse clicked, a menu is displayed. Right mouse click anywhere on the wheel surface will also display this menu. As with standard menus, hitting the ESC key will cancel the menu. The menu items for the view and tour wheels can include:

```
Mini View Object Wheel
Mini Tour Building Wheel
Mini Full Navigation Wheel
-----------------------------
Full Navigation Wheel
Basic Wheels   ->   View Object Wheel
                    Tour Building Wheel
-----------------------------
Go Home
Fit to Window
Restore Original Center
-----------------------------
[Application specific menu items, if any, go here]
-----------------------------
Help...
Preferences...
-----------------------------
Close Wheel
```

The menu items for the full wheel can include:

```
Mini View Object Wheel
Mini Tour Building Wheel
Mini Full Navigation Wheel
-----------------------------
Full Navigation Wheel
Basic Wheels   ->   View Object Wheel
                    Tour Building Wheel
-----------------------------
Go Home
Fit to Window
-----------------------------
Restore Original Center
Level Camera
Increase Walk Speed
Decrease Walk Speed
-----------------------------
[Application specific menu items, if any, go here]
-----------------------------
Help...
Preferences...
-----------------------------
Close Wheel
```

When the 2D wheel is active it will display the following menu items in its menu:

```
Go Home
Fit to Window
-----------------------------
Help...
Preferences...
-----------------------------
Close Wheel
```

The first four menu items in the view, tour and full wheels switch to the corresponding wheel, the "Basic Wheels" is a sub-menu with the two novice wheels. Go Home moves the camera to the document's saved Home View with a quick animation lasting 1 second. Fit to Window adjusts the current camera to frame the 3D content to fit entirely within the view. Level Camera flattens the camera view rotation relative to the XY ground plane. Restore Original Center restores the view object wheel center point to the center of the currently loaded model's bounding box. Increase/Decrease Walk Speed doubles or halves the current walk speed. Help brings up the help window for the wheels. Preferences brings up the Preference window for the wheels. Close Wheel exits from the current wheel navigation tool and returns to the previous tool (or the default tool such as Select). Optional wheel menu arrangements can be provided.

Figure 11A:
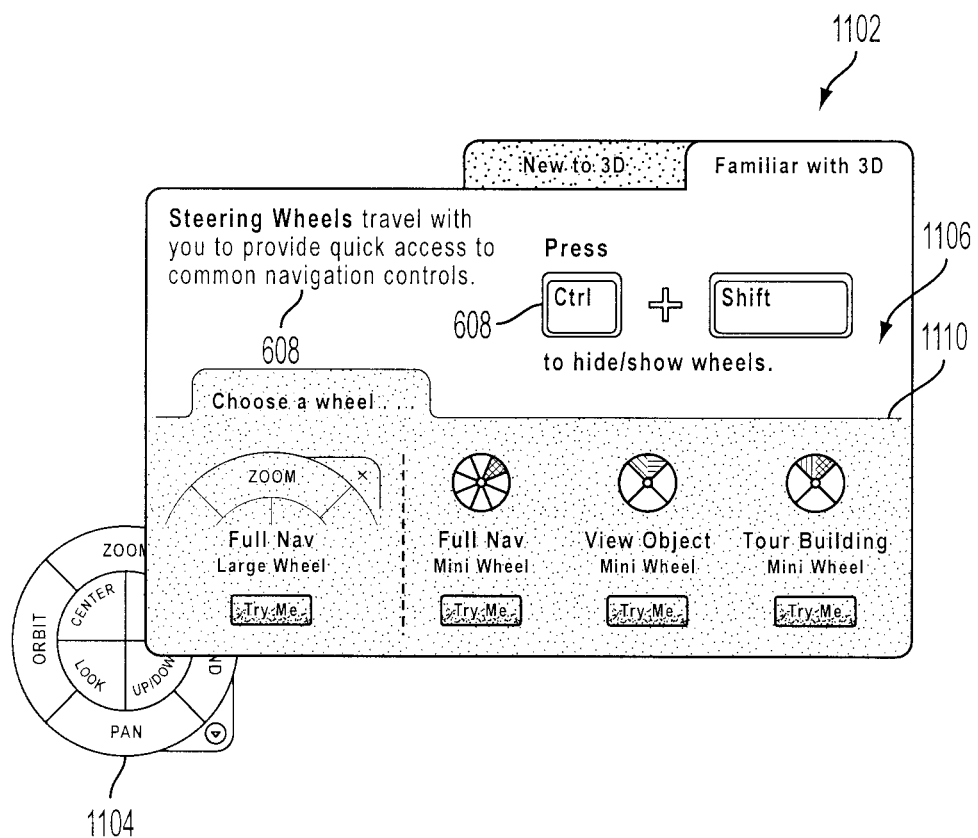
FIGS. 11a-11d show first contact GUIs.
Figure 11B:
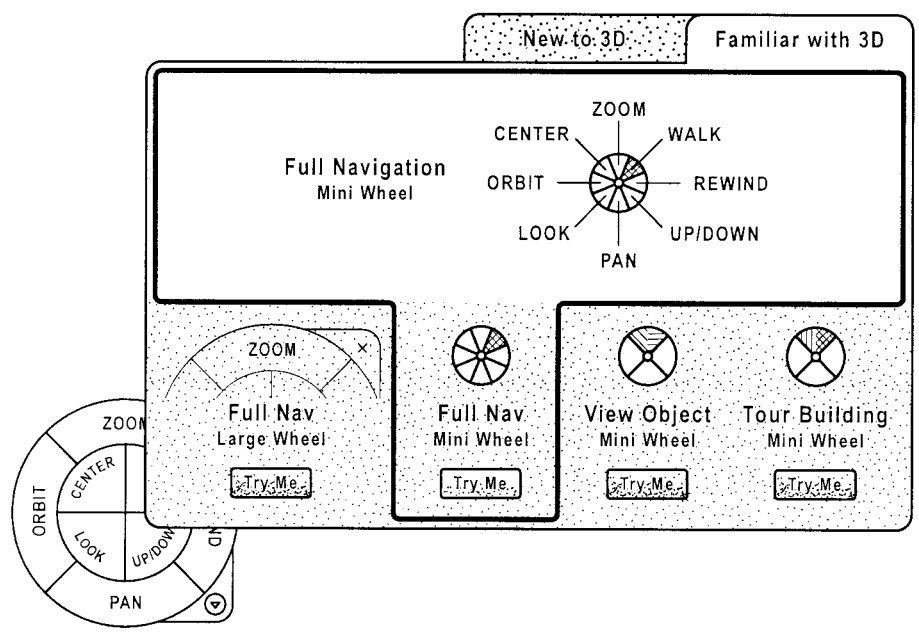
Figure 11C:
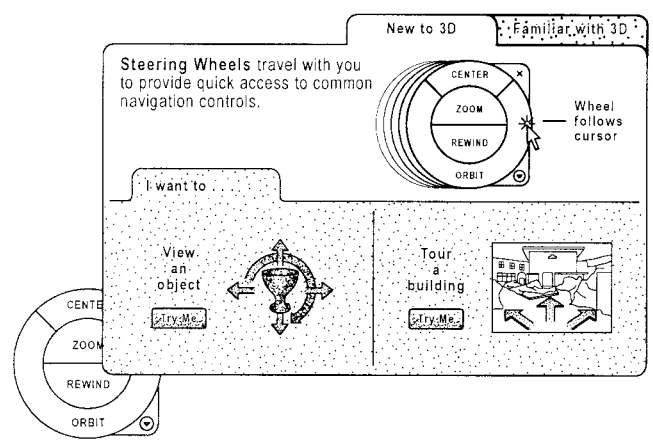
Figure 11D:
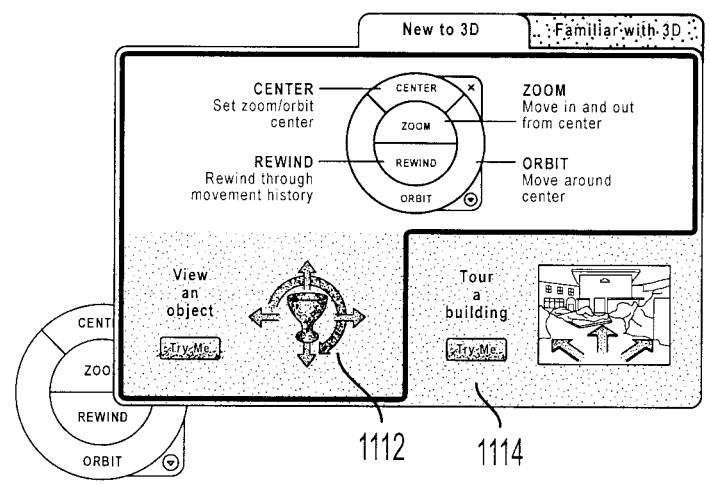

To help users get started a set of graphic tool tips is provided that includes first contact tool tips depicted in FIGS. 11a and 11b for those new to 3D navigation and those familiar with 3D navigation. FIG. 11a shows an initial graphic 1100 that includes tabs 1102 for novice and advanced users. The tab for an advanced user is shown as selected includes a graphic 1104 of a full navigation wheel, the mini wheels and a tip 1106. The tip 1106 provides text on behavior 1108 (tracking and hide/show wheel) and wheel type selections 1110. The user can see each selection type by positioning the cursor over a type. FIG. 11b illustrates a display of the full mini wheel type tip where all of the tools and their locations on the mini wheel are shown. In FIG. 11b the full navigation wheel tool tips has been selected for review and the locations and of the actions/names of tools are noted. FIG. 11c illustrates possible selections within the novice tab and once again text describing behavior and possible selections are shown. FIG. 11d shows a view object wheel tip having been selected where the operations of the tools for that wheel are described in text. The typical use is show by an image 1112 along side the other tool 114.

When the system is first run and a 3D model is loaded into the canvas either the view object wheel or the full navigation wheel is preferably be displayed in the canvas or display in the lower left corner. While displayed in this manner the wheel is even more transparent than when it is active. The wheel is in an inactive or pinned state, and only responds to mouse cursor rollover. While in this state the pinned wheel does not interact with any other tools or features. The pinned wheel has no other functions. After the first run from installation, the currently selected wheel is pinned to the same location. (The wheel selection is stored as an option across sessions.) If a mini wheel is the currently selected wheel, then the full navigation wheel is displayed. When the user moves the cursor into the pinned wheel's space a small combined graphical tooltip as discussed above and roll-over switch will pop up. As described above, the tool tip is broken up into different regions corresponding to a wheel type. When the cursor rolls over one of these tooltip regions, the pinned wheel changes to bring up the matching wheel. When a mouse click is detected in the tool tip region or the wheel, the current wheel is activated (i.e., unpinned). The wheel is not to be pinned on startup again unless the user goes and re-enables the behavior manually ("Always Show the Pinned Wheel on Startup" setting). If no click is detected the wheel stays pinned on cursor exit. If the user does not click and moves the cursor beyond either the border of the wheel or tool tip, the tool tips go away and the wheel remains in the pinned state. Preferably, to get rid of the wheel users first activate it and then close the wheel, or select another tool. Otherwise the wheel remains pinned in the 3D canvas.

A main menu pull down menu can also be provided in an application to allow activation of one of the navigation tools, such as:

```
        Mini View Object Wheel
        Mini Tour Building Wheel
        Mini Full Navigation Wheel
        -----------------------------
        Full Navigation Wheel
        Basic Wheels   ->   View Object Wheel
                            Tour Building Wheel
```

Where the above-menu is ordered for an advanced user and could be inverted in order for a novice user.

Figure 12:
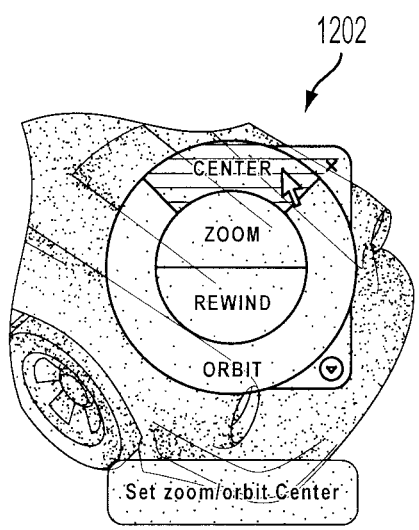
FIG. 12 shows a cursor when used in a model point zoom with the center tool.
Figure 13:
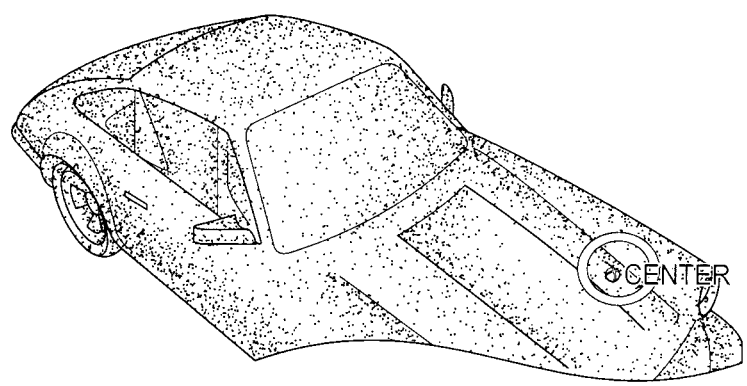
FIGS. 13-15 show center point section and centering.
Figure 14:
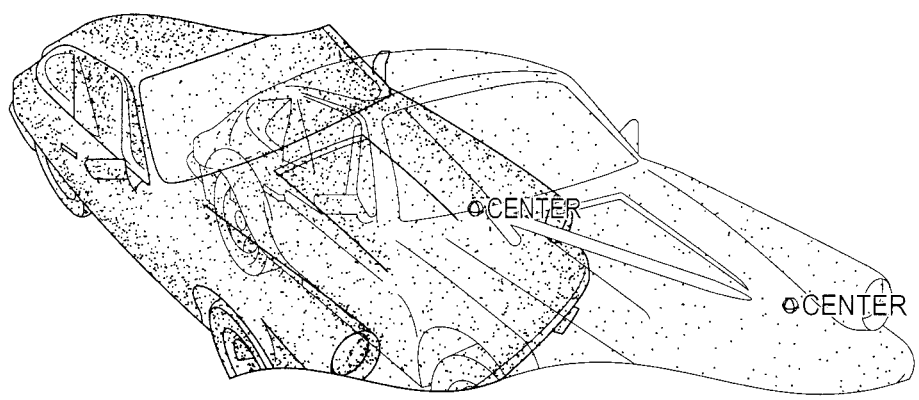
Figure 15:
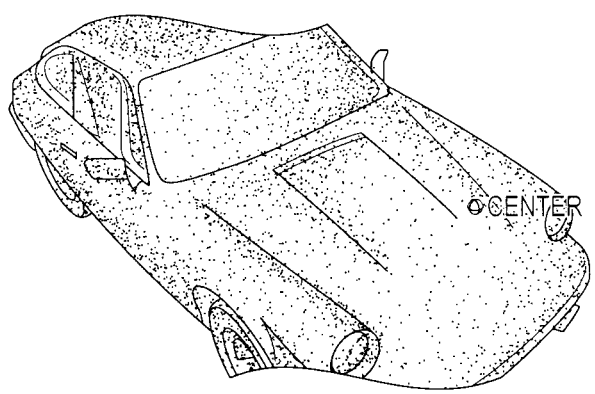

As previously mentioned the center tool moves a clicked or designated point on a model part to the center of the view and establishes a 3D space reference point. When the user places the cursor over the center wedge and over a model part in the canvas or scene at the same time, the cursor will display as the select arrow 1202, as shown in FIG. 12. When the user left mouse clicks to use the center tool, and starts to drag, the cursor icon changes to show the prohibited/invalid operation or action cursor/symbol (see FIG. 7) as long as there is no model part directly under the cursor. A HUD message will also be displayed with the text "Click or Drag over the model to set the Pivot." When the cursor is over the model a center sphere, which will be discussed in more detail below, is displayed. The center sphere will not move with the cursor as long as the cursor shows the prohibited symbol. When the cursor rolls or moves over a model part the sphere jumps to that position and begins to track the cursor, and the icon will change to the normal arrow icon. The HUD message will then also go away. If the cursor is over the center wedge but not over a model surface, the left mouse click will display a momentary HUD message until the mouse-up event occurs that has text as noted above. If the Center Tool is active and the cursor is over a model part, then the system shows the center point sphere at the cursor's location in screen space projected onto the underlying model's surface as depicted in FIG. 13 (circled for ease of identification). Upon mouse up the view will be animated/panned to bring the current center point to the center of the canvas or view as shown by the arrow in FIG. 14 where the "ghosting" is used to illustrate this movement. When the center point reaches the center of the canvas the automatic view pan operation stops as shown in FIG. 15 and the center point sphere can be hidden. The center point is stored for use with other tools on the view object wheel to use, namely zoom and orbit. While the center tool is active, a graphical tool description is shown below the cursor location on the canvas with the following text: Center Tool.

The center point sphere represents a 3D point in model space. As discussed above, this point is set by the center tool and used by the orbit and zoom tools that are found on the view object wheel. If the user has not defined a center point by clicking in the canvas view, then the default center point location in space is preferably defined as the center of the currently loaded Model's bounding box. The sphere is a 3D model that is placed into the current model view. Since the sphere is a geometric object with 3D geometry it may appear larger or smaller depending on how far the target point is from the camera view, and it may be occluded by any model geometry that falls between it and the camera view.

Figure 17:
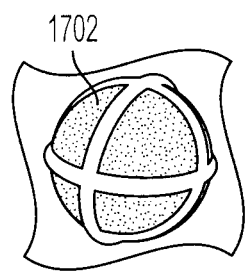
Figure 18:
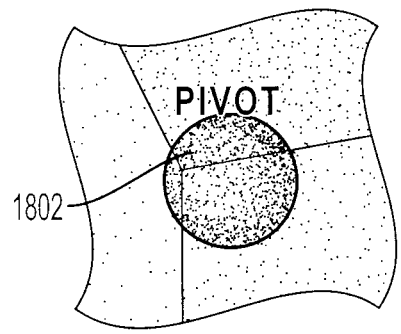
Figure 19:
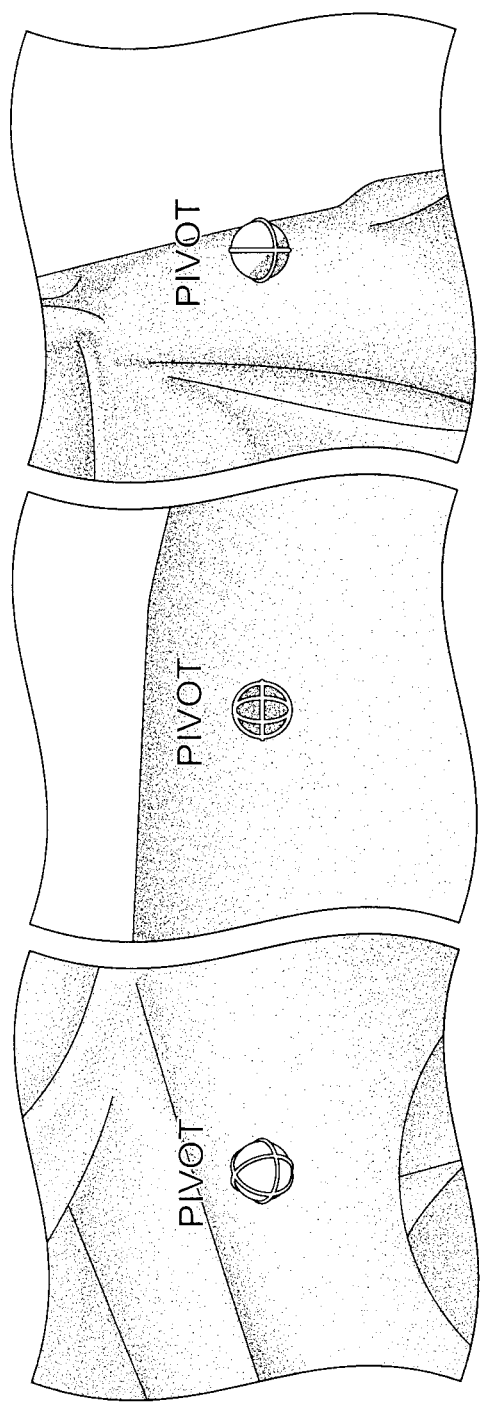
FIG. 19 shows locations of a sphere relative to a model.

Preferably, the center sphere is a "green ball" pivot indicator 1602 preferably with a text label 1604. The sphere can have axis rings 1702 around the perimeter as depicted in FIG. 17. The sphere should always be visible and should be displayed completely solid when there is no intervening geometry, and be displayed as partially see through when there is occluding geometry between the camera and the sphere as depicted in FIG. 18 where the sphere is shown with the label "Pivot" from the orbit tool. Note that as the two planes occlude the sphere the sphere becomes see through and remains visible. FIG. 18 shows a view with a corner of a cube pointing out of the page with the top 1802 of the sphere above the cube and the reminder of the sphere inside the cube. FIG. 19 illustrates a sphere completely outside a model (19a), completely inside the model (19b) and embedded in the model (19c).

Figure 20:
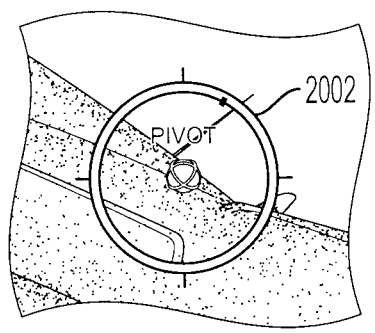
FIG. 20 shows an orientation ring.

The sphere is preferably always accompanied by a text label where the label appears in a fixed pixel size on the canvas. The label is preferably always drawn in front of any model geometry in the view. The label text changes depending on which tool is using the center point sphere. The label text when seen with the center tool is: CENTER The view object wheel version of the orbit tool 114 (see FIG. 1) or command preferably always gets its pivot point from the center tool center sphere. It is preferably placed on the wheel at the bottom three quadrants. It also maintains a dominant up-axis of the scene or canvas. A left mouse click anywhere in the orbit wedge hit zone invokes the orbit tool. For the view object wheel the last defined center point (from the center tool) is used as the orbit operation's pivot point. Horizontal and vertical mouse movement rotates the view about this pivot point in the same way as the standard orbit tool does dragging the cursor on the canvas to the left orbits the camera view around the pivot point along the world Y axis and moves the camera to the left, the model appears to turn to its right. Drag to the right does the opposite. Dragging the cursor upward orbits the camera around the pivot point on the X axis relative to the screen and moves the camera downward. Dragging the cursor down does the opposite. While the mouse is held down and the orbit tool is active the cursor is changed to the orbit cursor 706 (see FIG. 7). The cursor is allowed to wrap around the canvas when the Orbit tool is active. When the orbit tool is active the center point sphere is preferably displayed in the canvas and the sphere's text label is shown: CENTER. By default the system maintains the scene upright with respect to the model. If this default is off, the orbit tool behaves in screen space (not model space). When "Keep Scene Upright" is turned off, the orbit algorithm is changed to not force an explicit up direction. When "Keep Scene Upright" is off, a shift key modifier can be enabled that, on mouse-down presents a graphical roll ring 2002 (see FIG. 20) HUD centered around the current pivot point, where up/down mouse motion adjusts the roll values for the camera. Note that the label for the green ball pivot point is turned off while the roll ring 2002 is up. When a user makes a selection using the orbit tool, the pivot or center point is moved to the center of the bounding box of the current selection. Subsequent orbit operations will use this pivot point unless it is moved again by another selection or other navigation actions (e.g., Pan operation, etc.).

The zoom tool 116 (see FIG. 1) is invoked by clicking while in the hit zones for the tools on the wheels 110 and 130. The typical zoom-in and zoom-out operations preferably occur relative to the center point set by the center tool. However, the zoom for the view object wheel has some constraints placed on it that are not found in the version that is provided for the full navigation wheel. The view version of zoom tool is constrained in the following by the system so that it cannot zoom (dolly) in further than its focus point, it cannot zoom out farther than the minimum size constraint, and it can only zoom directly in to the center of the canvas, as it uses the target point set by the center tool as its focus. In the view object wheel the zoom tool is preferably placed in the top of the center two wedges just above the rewind command. The zoom tool has a graphical tooltip that includes the text: Zoom in or out from Center. Whenever the zoom tool is active, the target point is indicated in the HUD by the green center point sphere with a text label: CENTER. When the camera is zooming, either automatically from a single click zoom, or interactively with the click and drag zoom, the zoom cursor previously discussed is shown along with the zoom custom HUD with the text "Zoom Tool" below the cursor.

During operation, after a single left mouse click and release the camera view will perform an animated transition and zoom in towards the current target point. The amount the camera travels during this transition is preferably defined as 25% of the distance from the camera view's current location to the target point location. The zoom tool on the view object wheel preferably always uses as its target point the last point created by the center tool. This means that the view object wheel zoom tool preferably always zooms directly to the center of the canvas. Zoom is typically a camera dolly operation; it typically does not change the camera's field of view (FOV) in any way. Holding the Shift key when clicking the zoom tool inverts the single click zoom, and moves the camera view directly away from the target point. The zoom out distance is preferably defined as 125% of the distance from the current camera view location to the target point location.

Clicking on the zoom tool wedge will activate the zoom tool and also allow mouse dragging to zoom in our out from the current focus point. Again, the last defined center point is used as the target point for the view object wheel zoom tool. This means that this version of zoom always zooms in to the center of the canvas.

Figure 21:
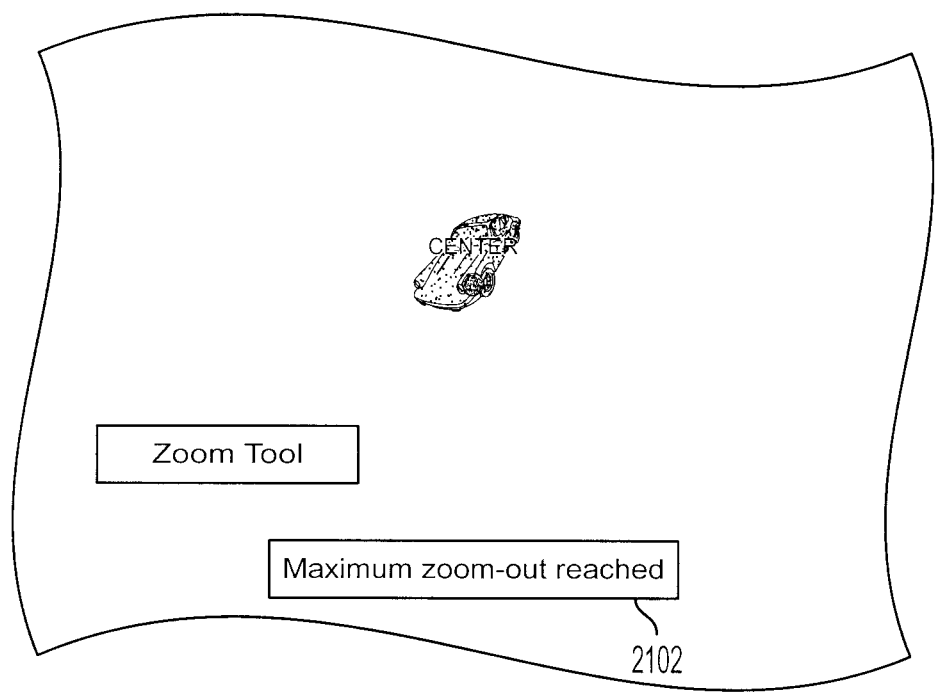
FIGS. 21 and 22 show tool warnings.
Figure 22:
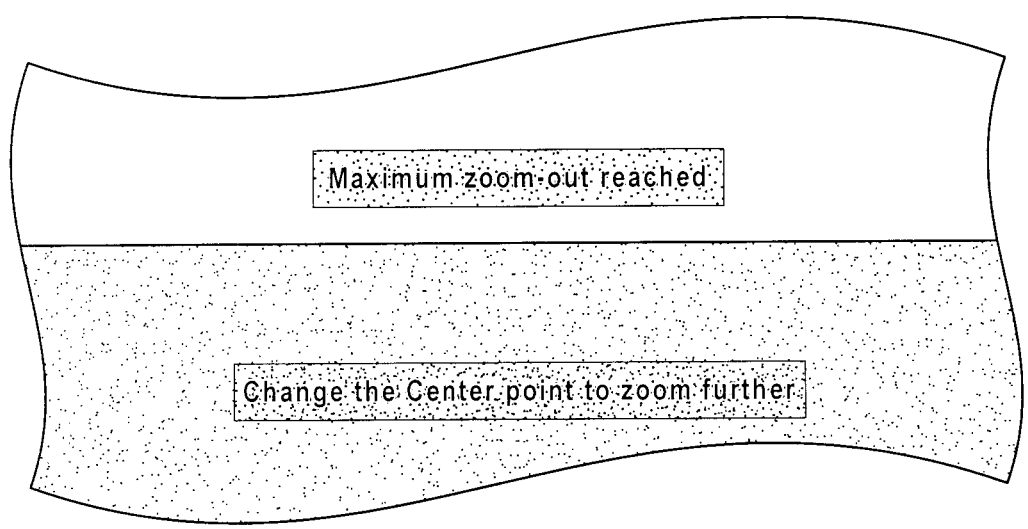

In the view object wheel, the zoom tool cannot zoom in forward beyond the target point. The camera view will stop moving once it reaches the Target Point and further mouse drag in that direction will have no effect. The user can always reverse mouse drag direction to zoom back away from the Target Point. When the user has reached this boundary an additional message is displayed in the HUD: Change the Center point to zoom further The zoom tool is also constrained when zooming out or away from the target point when using the view object wheel. The camera view cannot be moved further away than a maximum distance, which is determined by the model's bounds. Once the view has backed out to this maximum distance the camera will stop and further mouse drag in that direction will have no effect. User can always reverse their mouse drag direction to zoom back inward. A HUD message is provided as depicted in FIG. 21 with this figure indicating 2102 a maximum zoom-out has been reached. When the user has reached this boundary an additional message can be displayed in the HUD as depicted in FIG. 22. Also FIG. 22 shows that the HUD message is readable on a variety of background colors since it is always drawn with white text on a semi-transparent grey box.

The zoom tool can have additional modes available. When tool is active and the user holds down the Shift key, a "+" cursor is shown and the system allows the user to perform a "zoom extents" operation. In this operation, clicking and dragging define a rectangle which is visually shown to the user, to define a zoomed view. Releasing the mouse after the clicking and dragging, zooms the view (using an animation) to match the defined rectangle as best as possible. At the end of the transition, the visual zoom rectangle fades away.

A cursor drag up or drag right will zoom the view in. A cursor drag left or drag down mouse will zoom the view out. By default the directions for zoom-In are cursor drag up and right, but this can be inverted based on the zoom direction options dialog setting.

The mouse scroll wheel can also be enabled for the view object wheel. Scrolling the wheel forward causes the view to zoom, and backwards to zoom out. Zooming with the scroll wheel is preferably always towards, or away from, the center of the canvas. While scrolling with the wheel the target point sphere is displayed at the center of the canvas with the label discussed previously.

The rewind tool is found in all of the wheel interfaces. Its behavior does not change no matter which wheel it is found on. It is located in a wheel differently depending on the wheel. The tool allows the user to navigate 3D spaces with a level of security as they can always rewind back through their navigation history to a previous view location. The tool presents this rewind history as a set of onscreen thumbnails that show each step the user has so far taken so far. The rewind tool also lets users interactively drag between the waypoint thumbnails to run back and forth through their navigation history animating the camera view as they do so. When the cursor is held over the rewind tool a tooltip is shown below the wheel in the canvas with the text: Rewind through your movement history. The system uses "waypoints" to facilitate the rewind function or command. Each waypoint is a captured camera view position+orientation, along with a thumbnail of the model as seen from the camera's current view at that location. As the user navigates using: the tools provided by the wheels (e.g., forward, orbit, center), or the ViewCube available from AutoDesk (clicking or dragging) or any other 3D scene navigation tool, these events are added to the navigation Rewind history. Every camera and viewport combination has a separate Rewind navigation history queue. Thus, in a quad view (2×2 viewport) arrangement where there is a Front, Top, Right and Perspective camera/view, 4 separate Rewind queues are maintained. Each time the mouse is released when using a navigation tool; the system stores the current view as a new waypoint and appends it to a history list for that camera/view combination. This new waypoint is set as the "current" waypoint. In general, waypoints are preferably not captured or recorded (but can be) at stages during a tools usage, only at the ending view position when the tool interaction is completed. Some tools, such as the walk tool described below, can generate multiple waypoints (see section below).

Figure 23A:
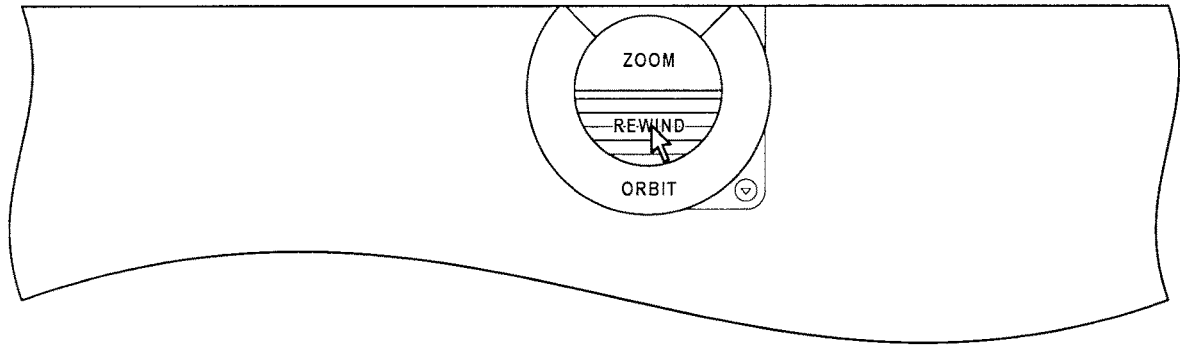
FIGS. 23a-23c show rewind cursor appearance.
Figure 23B:
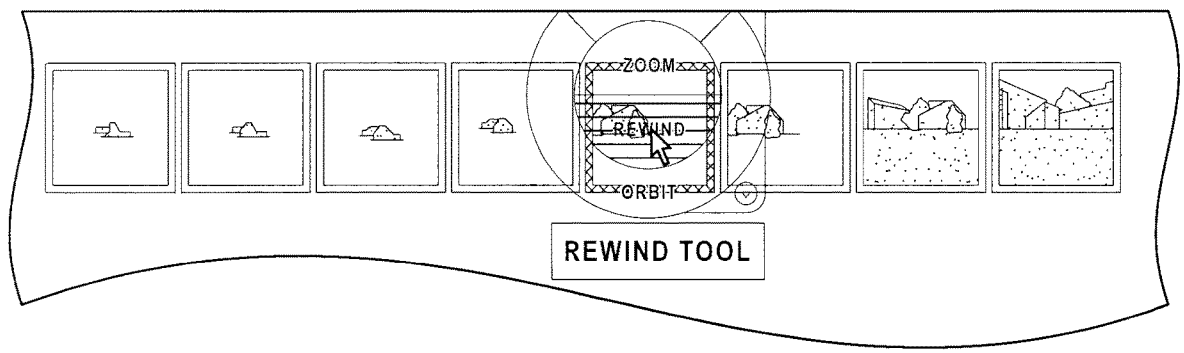
Figure 23C:
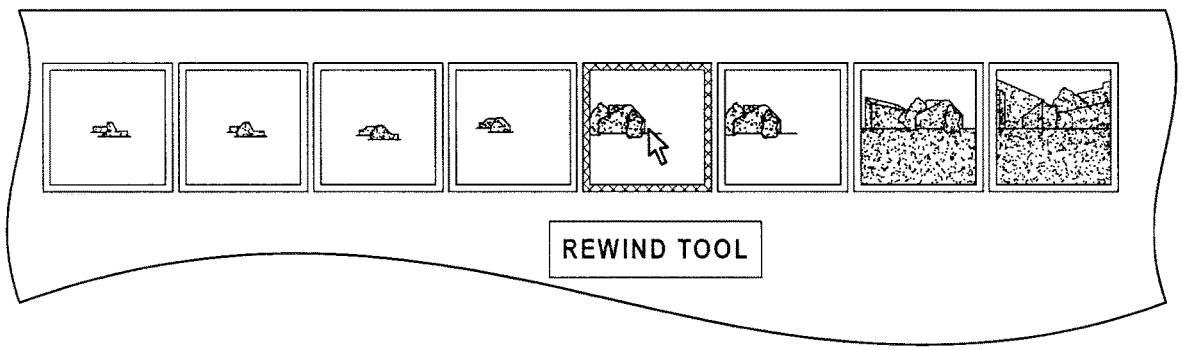

FIG. 23a illustrates a cursor positioned over the rewind tool in the view navigation widget, when the user clicks on the tool, the widget fades-out and the waypoint history fades-in as shown in FIGS. 23b and 23c.

The rewind history list preferably works like an Undo/Redo mechanism, when the user rewinds and subsequently creates a new waypoint the new waypoint becomes the end of the history list and all others after it in time are discarded. The rewind history is stored for the current model only. If a new section or model is loaded then the history is discarded. The rewind history also persists across wheel switching and all of the wheels can make use of it in the same manner. When another tool is selected and the wheels are dismissed, the rewind history continues to be stored. When the user returns to navigation with the wheels by selecting them again, all previous history waypoints are retained and the user can rewind through them normally. A maximum number of history events are saved (by default 100 events).

Figure 24A:
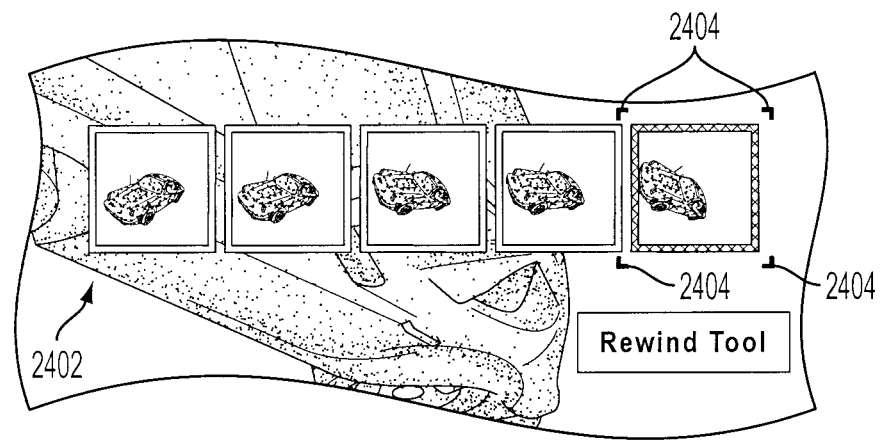
FIGS. 24a-24c show rewinding.

A single mouse click on the rewind wedge in the wheels 110, 120 and 130 (see FIG. 1) will temporarily activate the rewind tool and display the history waypoint thumbnails as discussed above. Upon releasing the mouse the rewind history is backed up to the previous waypoint in the list. That previous waypoint is set as the "current" waypoint. The wheel is redisplayed and an animated camera transition is performed to transition the current view to the older waypoint's location and orientation. The rewind history thumbnail strip is displayed during the rewind animation. If no history has been created yet and the user clicks the rewind tool, the system displays an empty rewind thumbnail and does not change the camera view in any way. The arrow cursor is hidden and the cursor for the rewind tool, called the timeline or rewind cursor and composed of four corner brackets as shown in FIG. 24*a*, is displayed while the mouse is held down. While the mouse is clicked or held down the rewind tool graphical tool description element (HUD) is displayed below the cursor on the canvas with the text: Rewind Tool. Note that this HUD element will appear in front of the thumbnails.

If the user left mouse clicks and holds the mouse down, the rewind GUI as shown in FIG. 24*a* is displayed. This GUI is a set of thumbnails 2402 arranged in a row horizontally in the canvas over objects of the scene. The most recent or current history waypoint's thumbnail 2404 is shown directly under the rewind cursor 2404 (angle lines around the thumbnail) and centered (vertical and horizontal) on the cursor position. Older waypoint thumbnails are shown to the left and will be clipped by the canvas edge if there are too many to display. Newer waypoints are shown to the right and also may be clipped by the canvas edge. (Clipping simply means these are HUD elements and will not be draw outside the canvas bounds.)

Figure 24B:
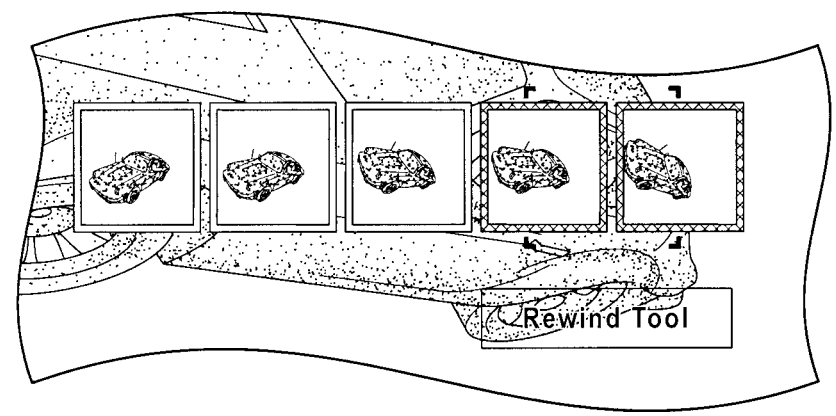

If the user then drags the cursor to the right or left the current waypoint's border will start to fade out and the next (in the dragged direction) thumbnail's border will begin to brighten as shown in FIG. 24*b*. The border is brightest when the cursor is dead center horizontally on a given thumbnail.

Figure 24C:
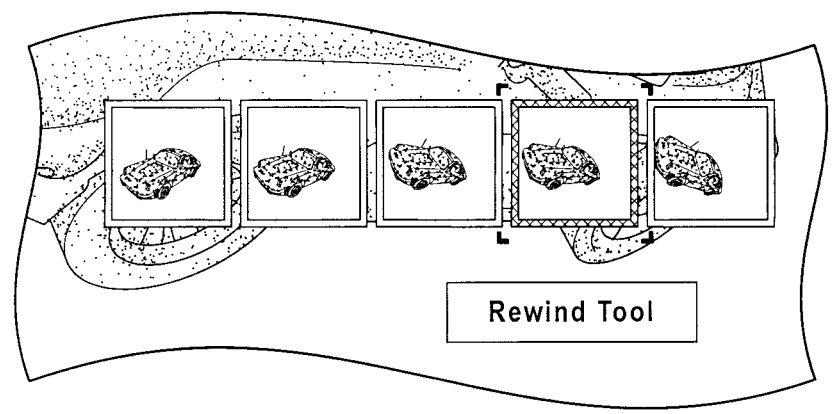

The distance the cursor is currently placed between any two waypoint thumbnails is used to control the transition of the camera view between those two waypoint locations and orientations. So, if the cursor is halfway between two waypoints, the camera view will be smoothly animated to the halfway point between the two waypoint view locations using linear interpolation. The camera view is constantly updated to follow the transitions between these thumbnails and waypoints as the user drags over them using the linear interpolation. This sequence of cursor position changes and corresponding scene changes is shown in FIGS. 24*a*-24*c*. Note that additional positional hints (instead or in combination with linear interpolation) may be used to more accurately reproduce the motion history. A noticeable snapping occurs when the cursor is dragged near the center of a thumbnail to allow a user to match exactly the saved waypoint view.

When the user releases the mouse the camera will remain at its current position and orientation even if this is part way between two waypoints.

When the mouse is released: If the closest thumbnail under the cursor is not the last in the history list (there are more thumbnails to the right of it) or the cursor is not exactly on a saved waypoint, a new waypoint thumbnail will be generated and info will be stored or updated. This selected waypoint becomes the "current waypoint" and any new waypoints will be created after it in the list. If there are any new waypoints created, the entire list from this current one on will be discarded.

When the mouse is released if the closest waypoint under the cursor is the last waypoint in the history list (no more thumbs to the right of the selected item) then the waypoint's information is replaced with the camera's current position+orientation+thumbnail. This last waypoint becomes the current waypoint and any new views will be created after it in the list.

The rewind cursor is constrained to move only horizontally and graphical "corner borders" are also displayed surrounding the cursor to frame the current thumbnail.

To access rewind history beyond what is currently visible in the thumbnail strip on the canvas, an automatic thumbnail strip scrolling has been defined. When there are only two visible thumbnails remain in the history due to canvas clipping, the rewind cursor remains fixed and the thumbnail strip begins to move in the opposite direction of the mouse movement. This movement is position-based not rate-controlled.

Rather than discard (or write over) all later in time waypoints when a past waypoint is selected, it is also possible to create a branch in the rewind history and maintain all of the waypoints. Multiple waypoints can also be compressed. As previously mentioned, waypoints are typically saved at the end of tool operation and at intervals within some tools. However, it is possible to constantly record waypoints in "high resolution" with small separations in time between them.

As previously discussed the tour building wheel 120 (see FIG. 1) is primarily focused towards moving the camera (user) about in 3D building models or virtual spaces. It allows for forward movement, looking about, and moving between vertical floors. Along with the common close and menu buttons, this wheel provides four tool wedges: forward, up/down, look and rewind. The rewind tool has been discussed above. Normally the middle mouse scroll wheel (hardware) is allowed to zoom the view in or out. While the tour wheel is active the zoom behavior of the middle mouse scroll wheel is disabled to prevent the user from escaping the constraints that are placed on 3D view navigation while using the tour wheel.

Figure 25:
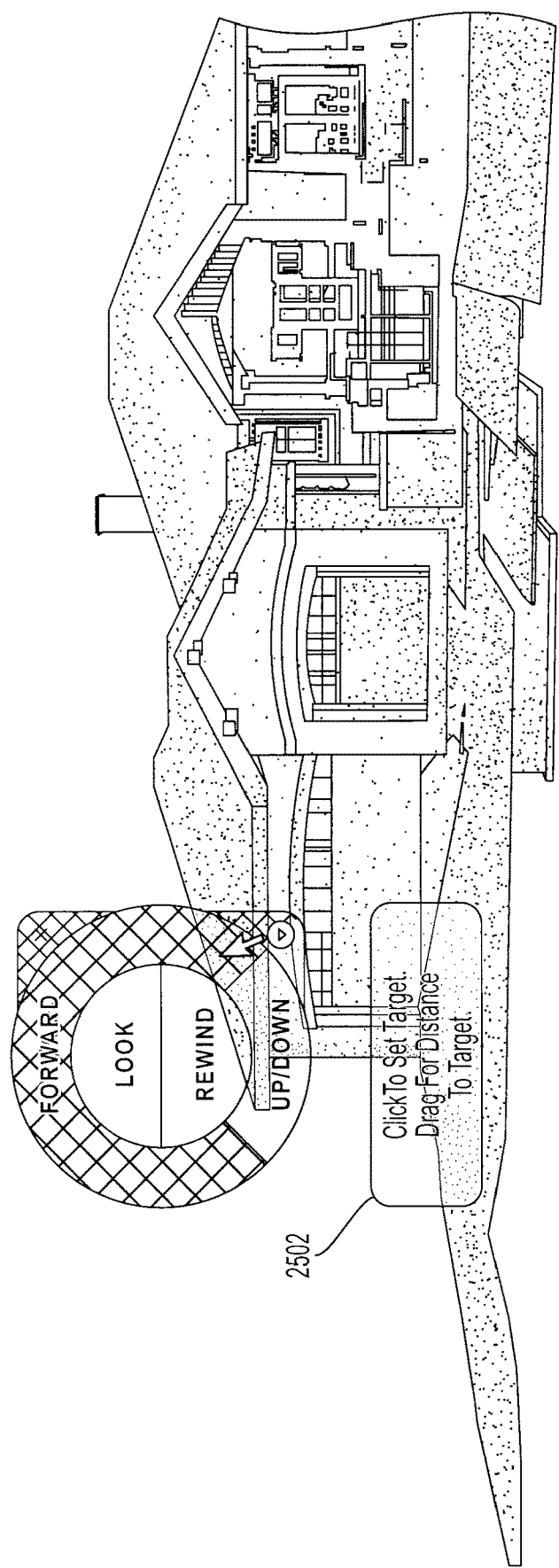
FIG. 25 shows a forward tool tip.

The forward tool or command is located at the top center of the tour building wheel 122 (see FIG. 1) occupying the top three quadrants of the outer ring and is the primary method for moving the camera for the tour wheel. The tool tip text 2502 for this tool is: "Click to set target. Drag to adjust distance to the target." as shown in FIG. 25

Figure 26:
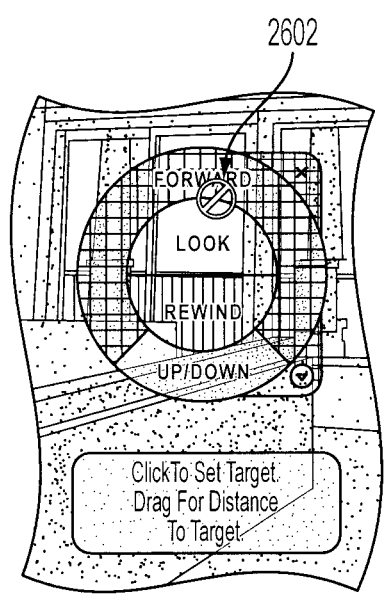
FIG. 26 shows a warning for an invalid action.

The forward tool moves the view towards a clicked focus point location. When the mouse is clicked over a model surface with the forward tool, a focus point is defined by projecting the cursor location on the canvas onto the model surface using ray casting in a "click-through" type manner. If no model part falls under the cursor then camera view will not move forward and a prohibited operation cursor 2602 (see also 710 of FIG. 7) is temporarily displayed as shown in FIG. 26. If a model is found then the focus point is set, and the camera is animated moving (zooming) in towards the target point when the mouse is released. The total distance of this move is preferably half of the distance from the current view plane to the focus point. While animating the view forward, the wheel and the cursor are preferably hidden.

Figure 27A:
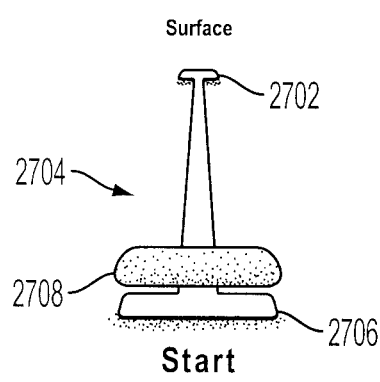
FIGS. 27a and 27b show a perspective slider.
Figure 27B:
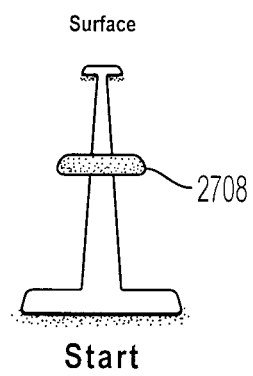

The center point sphere is reused as the target point and the sphere remains displayed until the user releases the mouse. For this tool the sphere has no label. Instead an endpoint 2702 of a perspective slider (HUD) 2704 reads: Surface—as depicted in FIG. 27a. A mark 2706 is shown at the very bottom of the scale indicating the starting camera position. This marker is labeled with text: START. The distance indicator 2708 is displayed during the click to go forward camera transition. A distance marker 2708 moves along automatically with the camera motion. FIG. 27b shows the wiper or marker 2708 between the start position and the surface. The wiper changes size based on the drag distance (i.e., depth into the scene). This element is shown while dragging to set distance (also while the view is animating with the click to go forward behavior above.) This display element is placed into the view just below the cursor on the canvas. When the transition is complete and the camera stops moving, the distance indicator HUD is hidden. This graphical display gives feedback on the distance moved from the camera view's starting position towards the focus point. An optional set of dotted lines or pass through markers are shown above and below the target marker, these indicate that the user may go forward beyond the target (surface), or that they may back up past the start.

Clicking and dragging on the forward tool wedge also sets the focus point in the same manner as for the click to go forward behavior described previously, but instead of animating the camera towards the target automatically, the user may drag the mouse to move the view forward (and back) to set the distance to the focus point interactively.

Like with a zoom tool the user may perform both the forward and backward movement with a single mouse drag action. This is basically a zoom interaction but the zoom amount is capped in both directions. While interactively dragging the view with the forward tool, the tour building wheel is hidden. Dragging the mouse/cursor upward moves the view forward. Dragging the cursor downward does the opposite.

The zoom forward distance is capped so that when the user has moved (dragged) forward right up to the focus point position, the tool resists further mouse drag beyond that point in a resistance zone, which is a percentage of the distance to the surface, such as 95%. If the user continues to drag the mouse in the forward direction for a period of time, they will be allowed to "pop-through" the view to beyond the existing focus point position and continue to zoom in/move forward from there. This behavior allows users to push through solid surfaces or walls.

The user may also interactively move backwards from their starting position towards an invisible focus point that is behind the camera view. A "sticky point" or range of no movement is defined for the start position of the forward tool. To go backwards, the user must drag some distance downward to move off the sticky point. Similar to the forward movement, a ray is cast behind the camera view plane to try and see how far the user can move without entering a wall or passing through a model surface. If a surface is found, the camera is allowed to only move backwards as far as ½ the distance from the start position to the surface found behind the camera. Unlike forward the user cannot push beyond the surface that is detected behind the camera.) If no backward surface is found during the initial ray cast, the camera is allowed to move backwards a small amount (roughly 25% of a forward ray). Again the cursor is hidden during this behavior.

Figure 28:
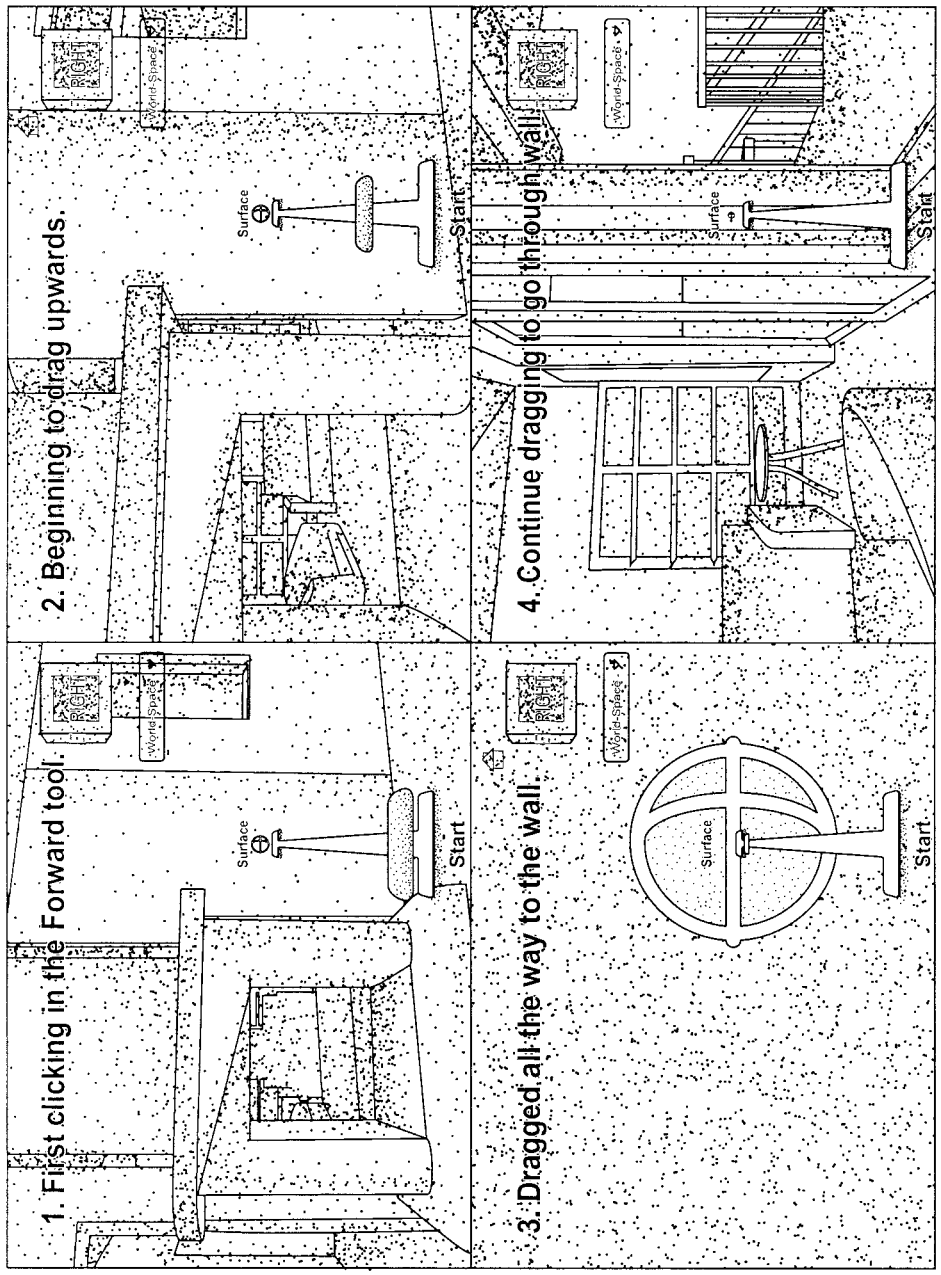
FIG. 28 shows forward motion.

During use, a user places cursor over target and clicks on the forward tool wedge. At this point, as depicted in FIG. 28, a number things happen: the distance indicator HUD is shown just below the cursor's last location, the current position indicator is placed at the start position on the bottom of the vertical scale, the focus point sphere is shown in the model view and the arrow cursor goes away (see image 1 of FIG. 28). In this example, the user has clicked on the wall to the right of the fireplace. Next, the user can now drag the mouse to move forward (image 2), while doing so the camera is animated forward (zoom in) and the current position indicator or marker (having a color such as orange) moves up along the scale towards the "Surface" marker. (Note that the user can also drag to move backwards (zoom out) see details above.) When the user drags forward far enough to reach the focus point the forward view movement stops. The current position indicator aligns with the surface marker (image 3). If the user keeps moving forward, the movement resumes and they are allowed to pass beyond the surface and continue forward. The current position indicator continues to move upward past the surface marker. The focus point sphere will become more and more transparent as the camera view gets closer to it until it finally disappears and the camera view passes through it allowing the user to pass through the surface or wall (image 4).

The up/down tool 126 (see FIG. 1) is located in the bottom center wedge of the tour wheel and in the bottom right quadrant of the full navigation tool (130). The up/down tool gives users a way to move their view vertically between floors or levels of a building using an up vector in the model. Note that this is different than what is possible with the pan tool. Panning is dependent on the camera orientation. For example, if you are looking down at your feet (mostly looking at the floor) and then try to pan up to get to the next floor above you, this would take a long time and significantly displace you since you are sliding along the camera plane (screen space) which, when looking down, is at an angle with respect to the floor planes. The up/down tool slides along a Y-up axis of the scene without displacing the user along the horizontal plane of the view.

When the cursor is over the up/down tool on the wheel the tool tip text is: Move up or down.

A bounding box of the model (plus a small amount of extra padding 10-15%) is used to determine an absolute high and low Y axis values. The up/down tool is constrained by these values and cannot push the view beyond them in either direction.

To avoid sudden jumps in the camera view when the up/down tool is invoked the following rules apply. If the camera is already above the bounding box high mark when the user first clicks and drags the mouse, then the system uses the current camera position as the high mark. If the camera is already below the bounding box low mark when the user first clicks and drags the mouse, then the system uses the current camera position as the low mark.

Figure 29A:
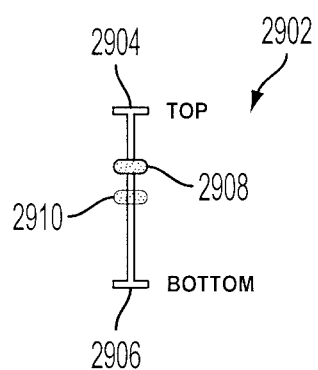
FIG. 29a shows an up/down slider and 29b shows up down motion.

When the up/down tool is active the display (see FIG. 29*a*) shows a slider or scale 2902 that is similar to that of the forward tool display. This HUD is displayed centered vertically at the cursor's last position on the canvas, and vertically with the current position Indicator aligned the cursor's last location. The top 2904 of the scale is marked to show the highest point that the camera or view can be moved to with this tool. This point on the scale has a label: Top. The bottom 2906 of the scale is marked to show the lowest point that the camera can be moved to with this tool. This point on the scale has a label: Bottom. An indicator marker 2908 (preferably orange in color) shows the current camera view position relative to the High and Low positions. When the user moves the view up or down a slightly dimmer orange marker or shadow indicator 2910 is left in place to show the starting view position on the scale.

Figure 29B:
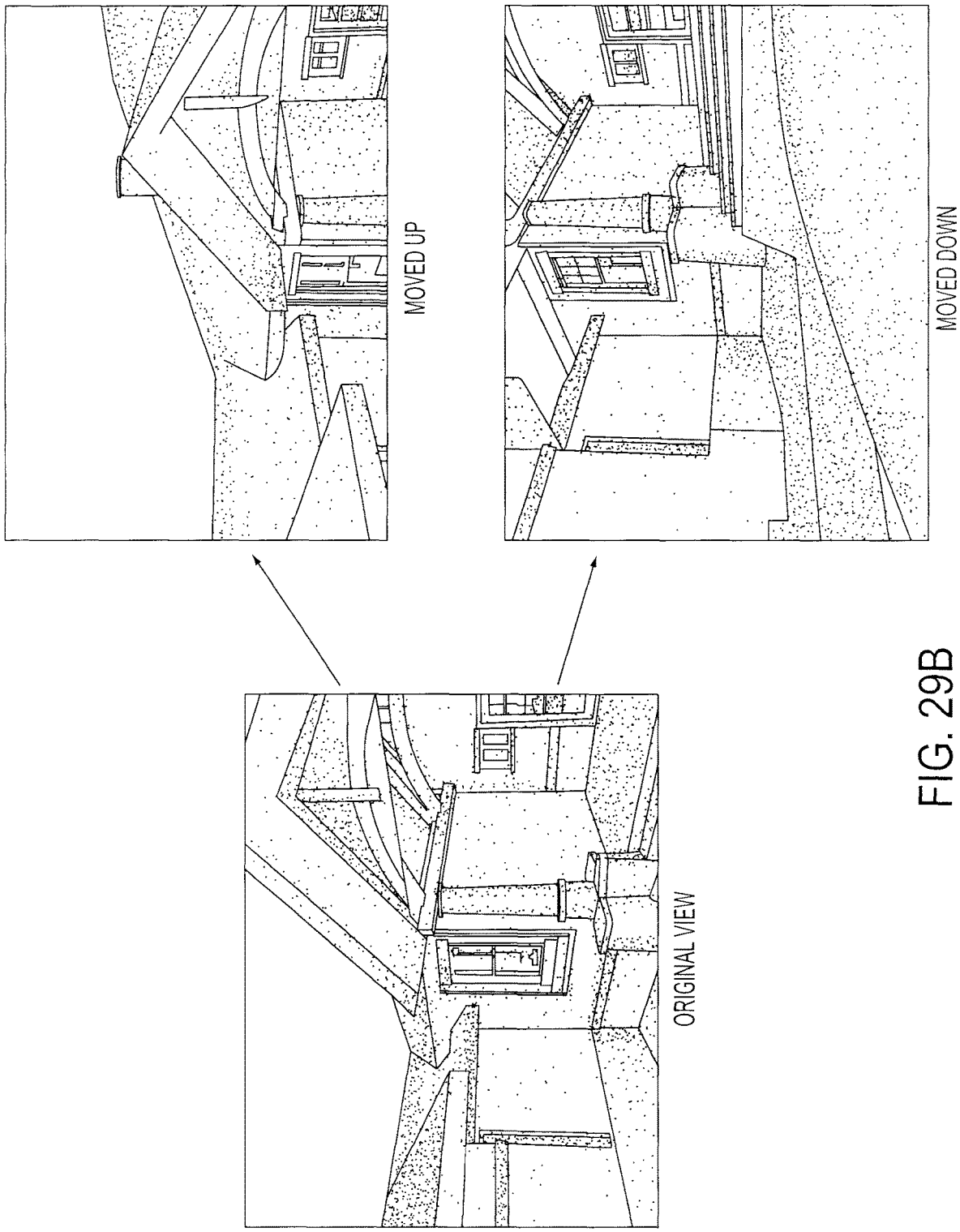

During use of the up/down tool, a vertical mouse/cursor drag upward (relative to the view) will push the view up towards the high or top marker. A mouse drag downward does the opposite. FIG. 29*b* shows an up and down motion. The drag amount of the mouse can vary the up/down camera direction directly or alternatively can move using a rate control design; this allows for small initial incremental camera movements and with more cursor dragging larger camera movements.

The look tool on the tour wheel has movement keyboard keys disabled whereas on the full navigation wheel, as discussed below they are enabled. The look tool 124 located in the top half of the middle circle on the tour building wheel 120 (see FIG. 1) and on the lower left quadrant of the inner circle of the full navigation tool 130 as will be discussed later herein. The tool tip when the cursor hovers over this tool reads: Look around your current position.

To look left or right, a horizontal drag or X-axis mouse movement (relative to the view) causes the view to rotate to the left or right. To look up or down, a vertical drag or Y-axis mouse movement causes the view to rotate up or down. The up and down looking is optionally constrained so that the view never flips upside down. The camera or view can be rotated until it looks nearly straight up or down in the tour wheel, but not beyond. When the Look tool is active the cursor is changed to the look cursor 702 as shown in FIG. 7. The cursor is allowed to wrap around the canvas when the look tool is active.

While the mouse is held down the look tool graphical tool description element is displayed below the cursor on the canvas with the text: Look Tool.

As previously discussed, the full navigation wheel 130 (see FIG. 1) contains eight tools: walk, up/down, look, center, orbit, zoom, rewind and pan.

The walk tool 132 allows users to interactively walk about in 3D space, moving forward and backwards and/or turning freely to the left or right. The walk is preferably along a horizontal axis or plane of the scene. The walk tool also allows shortcut key access to the up/down tool to adjust the view up or down while walking. The walk tool is preferably located in the top right interior wedge on the full navigation wheel. The tool tip text is: Click and drag in the direction you want to walk.

Figure 30:
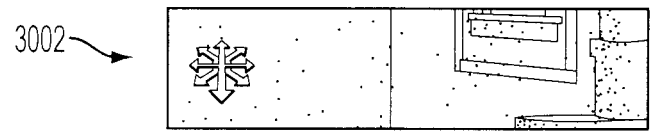
FIGS. 30-32 show a walk.
Figure 31:
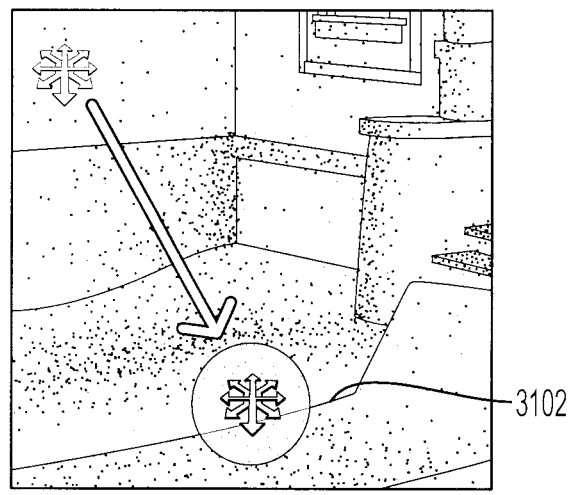

Clicking the left mouse button with the cursor over the walk tool activates the walk tool. When the mouse is first clicked on the walk tool the cursor changes to a default walk icon or cursor 3002 as depicted in FIG. 30. If the user moves the mouse even a tiny bit while holding the button down, the cursor is warped or moved to the center of the canvas (see arrow showing motion in FIG. 31), and a target circle or region or motionless zone 3102 is displayed. This actual position for this GUI display element (zone) is centered horizontally left to right and adjacent to the bottom about ⅓ up from the bottom of the canvas vertically. If the user further drags the cursor in any direction away from the center target 3102, then the camera view begins to move or "walk".

The direction of the cursor from the center target or zone 3102 determines the walk direction. Up is forward, down is backwards, left is turn left, right is turn right, and diagonal combines the two closest headings. The distance of the cursor from the center target 3102 determines the speed of walking. The closer to the center is slower, farther away is faster. A default speed is set based on scene space parameters, such as the size of the bounding box, and can be changed by the user. Placing the cursor over the center circle area 3102 will stop camera or view movement. At any time the user may release the mouse button to end walking and redisplay the wheel.

Figure 32:
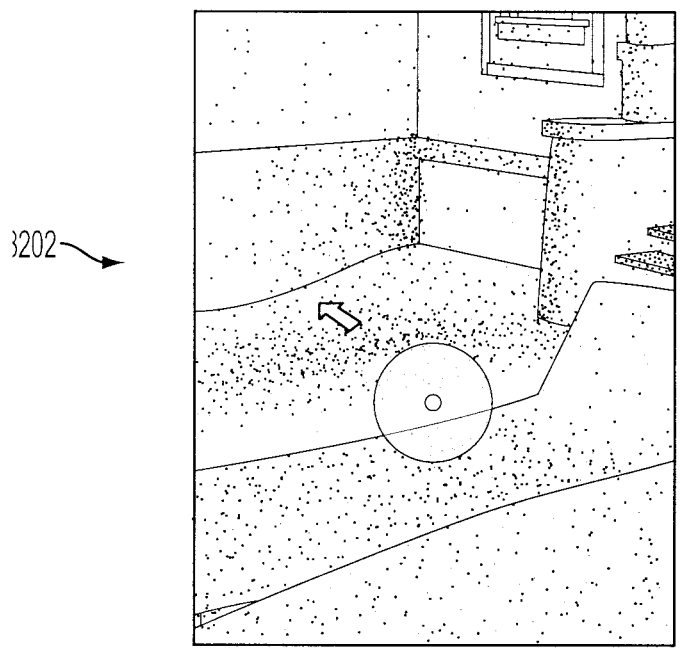

While walking the cursor is changed to an arrow (a direction indication cursor) 3202 that indicates the current move direction and rotation. In FIG. 32 the diagonal arrow cursor 3202 indicates that the user is moving forward and turning to the left.

Figure 33:
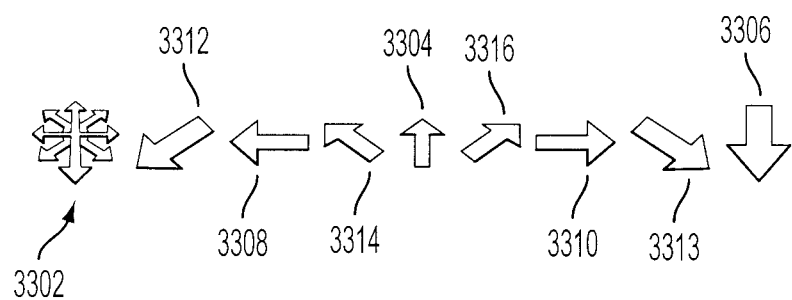
FIG. 33 shows walk cursors.

There is a default cursor 3302 for when the camera is not moving and the cursor is hovering inside the center circle or zone as shown on the far left of FIG. 33. There are eight walk direction cursors for when the cursor leaves the center circle HUD area as also shown in FIG. 25. These include forward 3304 and backward 3306, left 3308 and right 3310, and the four diagonals 3312, 3314, 3316, 3318 between the primary directions.

While the walk tool is active the following text is displayed as a HUD element on the canvas: Hold down Shift key to move up or down. This HUD text does not follow the cursor movement, and is instead fixed to the lower center of the canvas area.

While the walk tool is active the user may press and hold a hot key such as the Shift key at any time to temporarily activate the Up/Down tool and move up or down. The walk tool is suspended while the Shift key is held and the up/down tool is active and operates as previously discussed. When Shift is pressed the cursor location (and therefore the walking speed and heading) are temporarily stored. When the shift key is released the cursor is placed back to its previous location and the walk operation continues on from where it left off. A walk tool option allows users to adjust the walking movement direction based on their current camera looking direction instead of the default ground plane. Thus, it can be used in combination with the look tool to move around in 3D space.

It is possible and likely that users will activate the walk tool for long periods of time (30 seconds to a minute, etc). In order to capture some of these long walk events, the system defines multiple rewind events during a single mouse drag walk event. Preferably, this is the only tool that allows for multiple rewind events to be defined. By default, a walk rewind event is preferably recorded every 5 seconds. Consequently, a thumbnail is added to the rewind thumbnail strip (history) for each event. If it is not possible to create thumbnails during a walk (due to performance issues or if it is too noticeable during the walk), it may be possible to create the thumbnails on the mouseUp event or, a less favorable solution, to use the same thumbnail for all multiple walk events belonging to a given long walk drag history. To increase walk speed (increase movement rate) the user presses CTRL+Shift+>. To decrease walk speed (decrease movement rate) the user presses CTRL+Shift+<. Alternative hotkeys may be used.

The look tool 136 on the full navigation wheel 130 allows the user to move the view while looking by pressing the arrow keys on the keyboard. The tool is located on the bottom left interior wedge on the full navigation wheel 130 (see FIG. 1). The tool tip text is: "Look around your current position. Press arrow keys to move." To look left or right, an horizontal drag or X-axis mouse movement in the view causes the view to rotate to the left or right and to look up or down, vertical drag or Y-axis mouse movement causes the view to rotate up or down (drag left allows you to look left; drag up to look up; etc.). This up and down looking in the full navigation tool is not constrained so that the view can flip upside down. The camera can be rotated continuously until the view somersaults.

The look tool can also have an additional mode. When the user holds down the Shift key while the tool is active, the system performs a "look at" operation. Similar to the Center tool, the green ball is positioned and can be dragged along the model surface. The surface beneath the green ball is highlighted. Once the key is released, the view animates to move the green ball to the center of the view, roughly keeping the zoom factor the same but orients the view to be looking "head-on" to the surface where the green ball resides (e.g., the surface normal is pointing directly at the user/camera).

Shortcut key inputs from the keyboard are provided to extend the look tool for users using the full navigation tool who have keyboard access. These keys will cause the camera to move forward or backward, and left or right. These movement commands are available while the look tool is active. (left mouse down). The forward key command causes the camera or view to move forwards (dolly in) based on the camera's current heading. For example, if the user is looking straight up and presses this key they will fly up into the air like superman. If they are looking straight ahead they will fly directly ahead. The camera movement rate for the keys is determined by a walk speed factor that can be set by the user. The move backwards key command causes the camera to move backwards (dolly out) based on the camera's current heading. The move left or sidestep left key command causes the camera to move to the left as if the user was panning horizontally. The move right or sidestep right key command causes the camera view to move to the right as if the user was panning horizontally. No up or down movement key is provided.

Both the walk tool and the look tool take into consideration the scales of the model space in which they are operating. The speed to move through an engine block is very different than what will work to move past the Empire State Building. A base movement rate value is automatically calculated, based on the model's bounding box when the model is loaded. Both look and walk use the same base setting. Increase or decrease speed commands can modify this base move rate setting to fit the user's needs, and these +/−modifications can be stored for the duration of the session.

When the look tool is active the cursor is changed to the look cursor 702 as depicted in FIG. 7. The cursor is allowed to wrap around the canvas while the look tool is active. While the mouse is held down the look tool graphical tool description element is displayed below the cursor on the canvas with the text: Look Tool.

Figure 16:
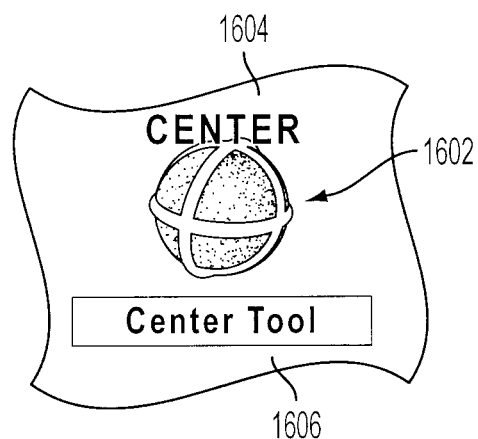
FIGS. 16-18 show the focus sphere characteristics.

The orbit tool 114 appears on both the view object wheel 110 and the full navigation wheel 130. The version on the full wheel uses the same mouse control scheme to orbit the view about a pivot point, but this tool has a more dynamically defined pivot point that is not always directly in the center of the view. The tool is located on the left side wedge of the full wheel 130 (see FIG. 1). As other tools are used on the full navigation wheel, the pivot point location for the orbit tool is being constantly updated. By default the pivot is set to the center of the screen. The center point sphere 1602 (see FIG. 16) is preferably used for the pivot point. The sphere remains displayed until the user releases the mouse. For this tool the sphere label text is: PIVOT. While the mouse is held down and the orbit tool is active the cursor is changed to the orbit cursor 706 shown in FIG. 7. The cursor is allowed to wrap around the canvas while the orbit tool is active. While the mouse is held down the orbit tool HUD element is displayed below the cursor on the canvas with the text: Orbit Tool.

If the user activates CTRL+Click or CTRL+Click and drags on a model in the view with the orbit tool, a new pivot point is defined about which to orbit. Subsequent orbits will use this pivot until the user defines a new one by using another tool, such as zoom, another CTRL+click on the orbit tool and navigating the view with another tool so that the pivot location ends up off screen.

By default the Keep Scene Upright option is on. If it is turned off, then the orbit tool behaves in screen space (not model space). When "Keep Scene Upright" is off, a Shift key modifier is enabled that, on mouse-down presents a graphical ring HUD (see FIG. 20 previously discussed) centered around the current pivot point, where up/down or left/right mouse motion adjusts the roll values for the camera. The label for the green ball pivot point is turned off while the roll ring is up.

When a user makes a selection, the pivot point is moved to the center of the bounding box of the current selection.

Subsequent orbit operations will use this point unless it is moved again by another selection or other navigation actions (e.g., pan operation, etc.).

Pan operation of the full wheel is preferably a common pan operation except that the clicked point in the view will stay fixed to the cursor and not go flying off too fast or too slow.

For the full navigation wheel the tool is not constrained, and can zoom towards or away from any point visible in the canvas. A single click to zoom in (left mouse button click and release) behaves like the single click behavior for the view wheel zoom tool, with the following exceptions. The target point is set based on where the user placed their cursor over the model, not the center of the canvas. The user is allowed to click anywhere on the canvas to set the zoom target point and zoom will zoom into this location. This behavior may be turned off. The single click to zoom out (Shift+left mouse button click and release) zooms out away from the clicked point on the canvas. The target point is set based on where the user placed their cursor over the model, not the center of the canvas. The user is allowed to click on 'nothing' and can still zoom. This Zoom tool also supports the invert mouse zoom option setting where the zoom can cause the scene to be inverted. Whenever the zoom tool is active on the full wheel, the target point is indicated as a green sphere with a text label and is the same HUD graphic as for the Center tool shown earlier. The mouse scroll wheel will zoom in to the last defined pivot/focus point in the same manner as the CTRL+Zoom shown above.

The mini wheels (see FIG. 1) are designed for advanced users and provide even more rapid access to the navigation action tools. Three Mini wheels exist which are task-based: mini view object wheel 142, mini tour building wheel 144 and mini full navigation wheel 146. The action tools within each mini wheel behave exactly like the big full wheel. The gestural and spatial location are similar to the big full navigation wheel. For example, orbit is on the outer left wedge in the big full wheel and the mini view object wheel. The mini wheels are preferably small (32×32 pixels) and replace the default "arrow" cursor. In this default small mode, the arrow cursor is turned off. The mini wheels can be made larger than the default 32×32 and in these cases, the arrow cursor is preferably made visible along with the active mini wheel. The mini view object wheel 142 contains the tools: zoom (top wedge), rewind, (right wedge), pan (bottom wedge), and orbit (left wedge). The mini tour building wheel 144 contains the tools: walk (top wedge), rewind (right wedge), up/down (bottom wedge), and look (left wedge). The mini full navigation wheel 146 contains the tools: zoom (top wedge), rewind (right wedge), pan (bottom wedge), orbit (left wedge), center (top-left wedge), walk (top-right wedge), up/down (bottom-right wedge), and look (bottom-left wedge).

Figure 34A:
FIG. 34 shows optional cursors for the mini wheel or pie cursor.
Figure 34B:
Figure 34C:

Showing the standard arrow cursor within a mini wheel or pie cursor can be visually heavy and confusing. Preferably no cursor is shown and the mini wheel visually acts as the cursor. However, there may be times when it is useful to have a visible cursor. In such a situation, a smaller dot cursor (what can be called a flea cursor) can be provided as depicted in FIG. 34*a* or a miniaturized arrow cursor within the pie cursor that indicates the precise mouse input and active hotspot can also be provided as depicted in FIG. 34*b*. A further alternative is to not show the mini wheel cursor but display a modified arrow cursor as depicted in FIG. 34*c*. When the arrow cursor moves into a new command wedge of an invisible pie cursor, the visible cursor is changed to the corresponding tool cursor. Yet another approach is to use a click-hold design during command activation within the pie cursor to lock-in/release a command/tool mode. A velocity based alternative can serve as a means of switching between command selection (high velocity mouse movement) and precision pointing (low velocity mouse movement). To accommodate precision pointing, the user can hit a modifier key such as the Shift key which will lock-in the currently highlighted tool in the mini-wheel and replace the mini-wheel with an arrow cursor. Holding the Shift key will also retain the current tool for multiple mouse movements/clicks and allows the user to repeat a command multiple times until the Shift key is released and the mini-wheel returns All of the wheels can share a particular key as a shortcut key. Pressing this shortcut can bring up the last used wheel for 3D, or just bring up the 2D wheel for 2D content. Tapping the shortcut key when a wheel is already up will bring the wheel down and activate the last tool (e.g., Select Tool). The CTRL+Shift or another key can be used as a shortcut key or hot key to activate/deactivate the wheels. Activating a wheel should occur "transparently" from the current tool. For example, if the a first tool is active, a user can hit Ctrl+Shift to activate the view object wheel, navigate, hit Ctrl+Shift again to bring down the wheel and be placed back into the first tool to continue working.

Figure 35:
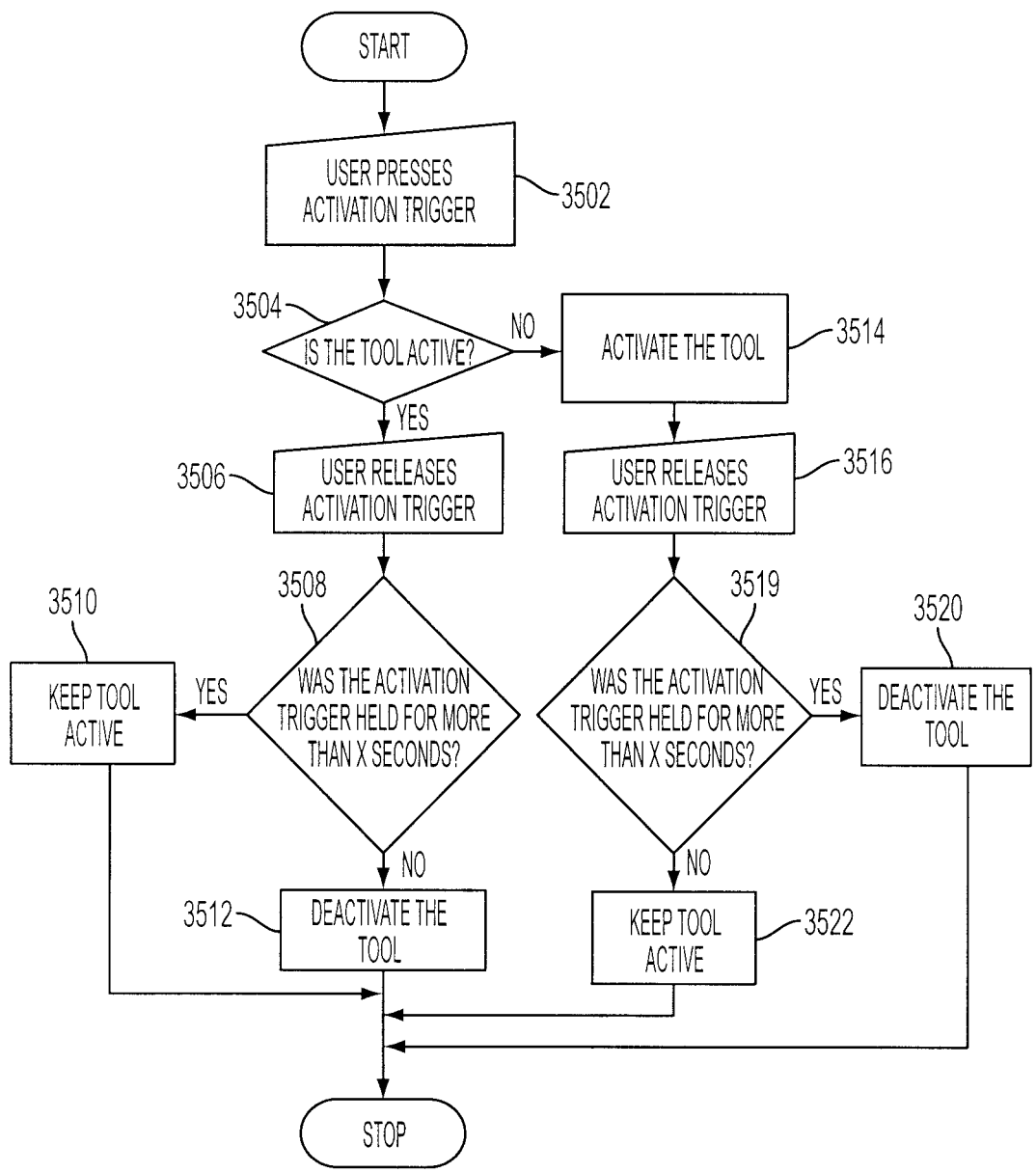
FIG. 35 shows tap activation operation.

The flow of this shortcut key process 3500 is depicted in FIG. 35 and starts with the user activating (pressing) and the system detecting the trigger key 3502. The system then checks 3504 to determine whether the corresponding tool is active and, if so, when the user releases 3506 the key, the system checks 3508 to see whether the key was held down for at least a threshold amount of time, such as _1_ seconds. If held down for the threshold time, the tool is kept 3510 active, otherwise it is deactivated 3512. If the initial check 3504 indicates that the tool is not active, it is activated 3514. When the user releases 3516 the activation trigger, the system again checks 3518 the hold down time against the threshold, deactivates 3520 the tool when not met and keeps 3522 it active when met.

Figure 36:
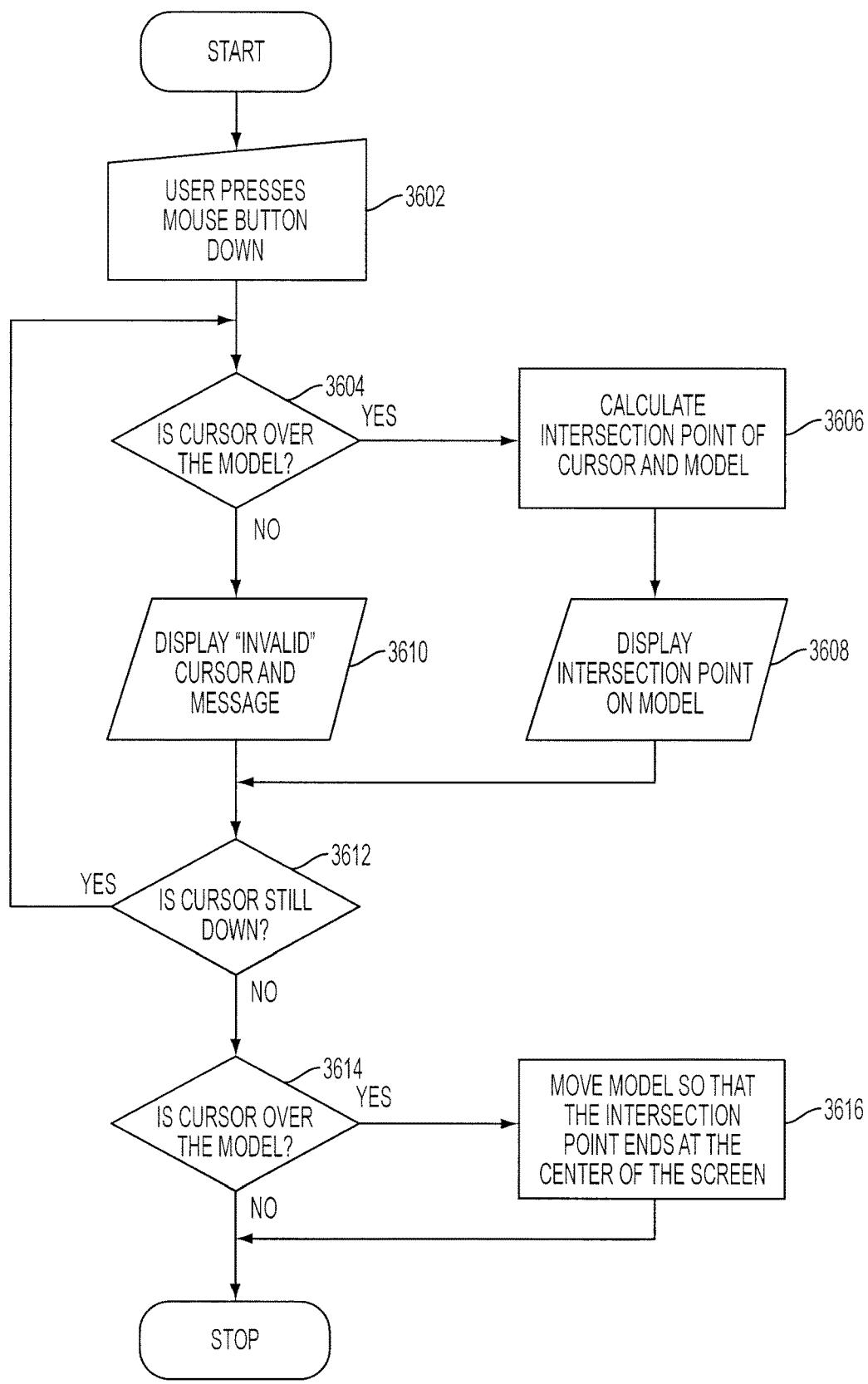
FIG. 36 shows center operation.

The center tool operation is depicted in FIG. 36 and starts with the user pressing the mouse button which is detected 3602. The system then checks 3604 to see if the cursor is over the model by ray casting the cursor into the scene and determining whether the ray encountered the model. If the cursor is over the model, the intersection point is determined 3606 and it is displayed 3608 on the model, preferably as the green ball. If the cursor is not over the model, the invalid operation message is displayed 3610. The system then determines 3612 whether the mouse button has been released and, if so, again checks 3614 to see if the cursor is over the model. If so, the model is moved or animated 3616 so that the intersection is in the center of the screen.

Figure 37:
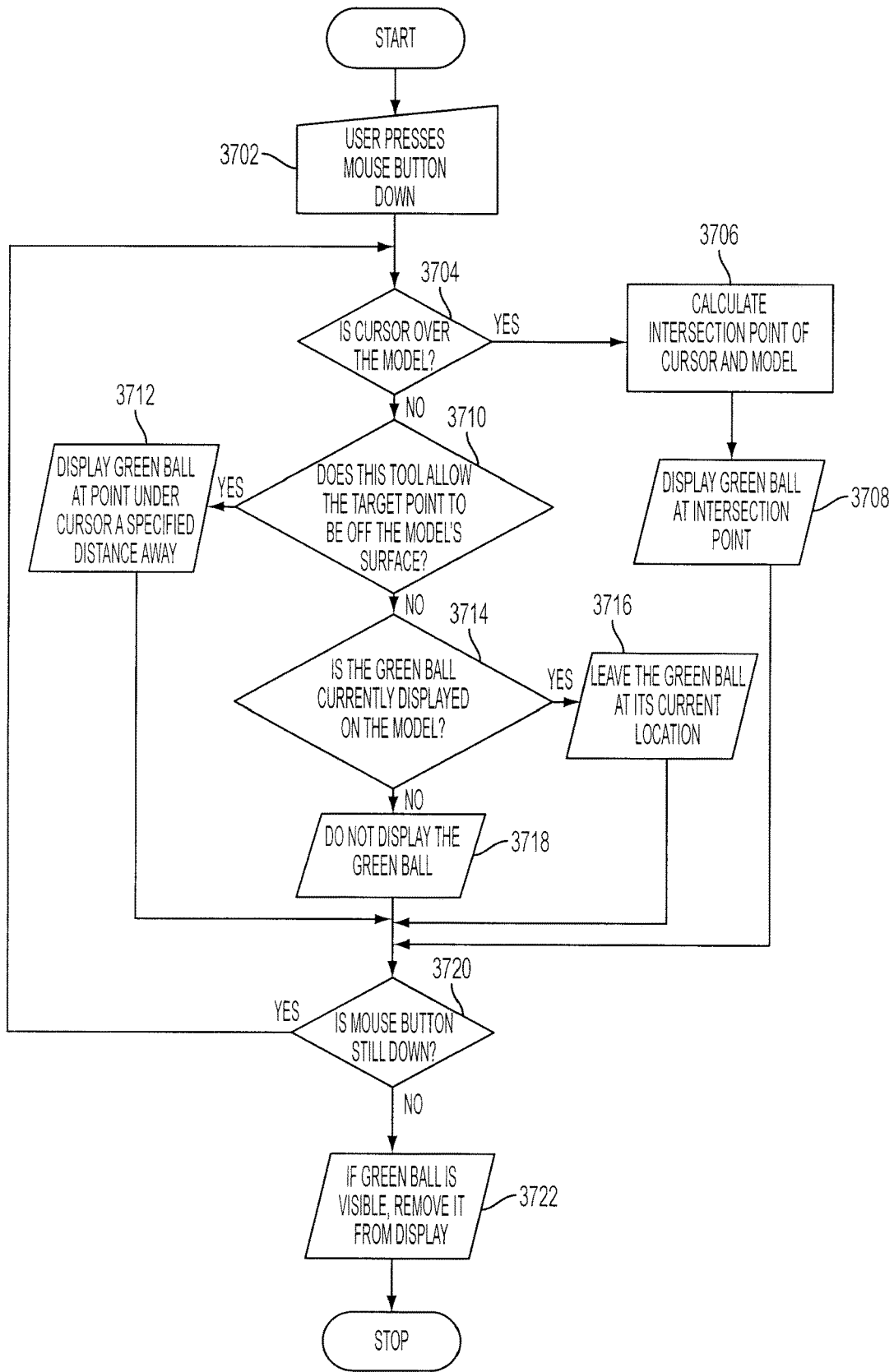
FIG. 37 shows sphere operation.

When the green ball or center sphere is used, it can be moved about in the model space. As depicted in FIG. 37, when the user presses 3702 a mouse button, the system checks 3704 to see if the cursor is over the model. If so, like described above, the intersection point is determined 3706 and the sphere is displayed 3708 at the intersection point of the model. If not, the system checks 3710 as to whether the active tool allows the sphere to be anywhere in the model space. If so, the sphere is displayed 3712 at a specified depth into the model from the current view position, such as the depth position from the last time it was on the model. If the sphere is currently displayed 3714 on the model, the sphere is not moved 3716 and, if not, the sphere is not displayed 3718. The button status is then checked 3720 and if it is not down, the sphere is not displayed 3722.

The orbit operation, except as described above, has a conventional flow and so is not described herein.

Figure 38:
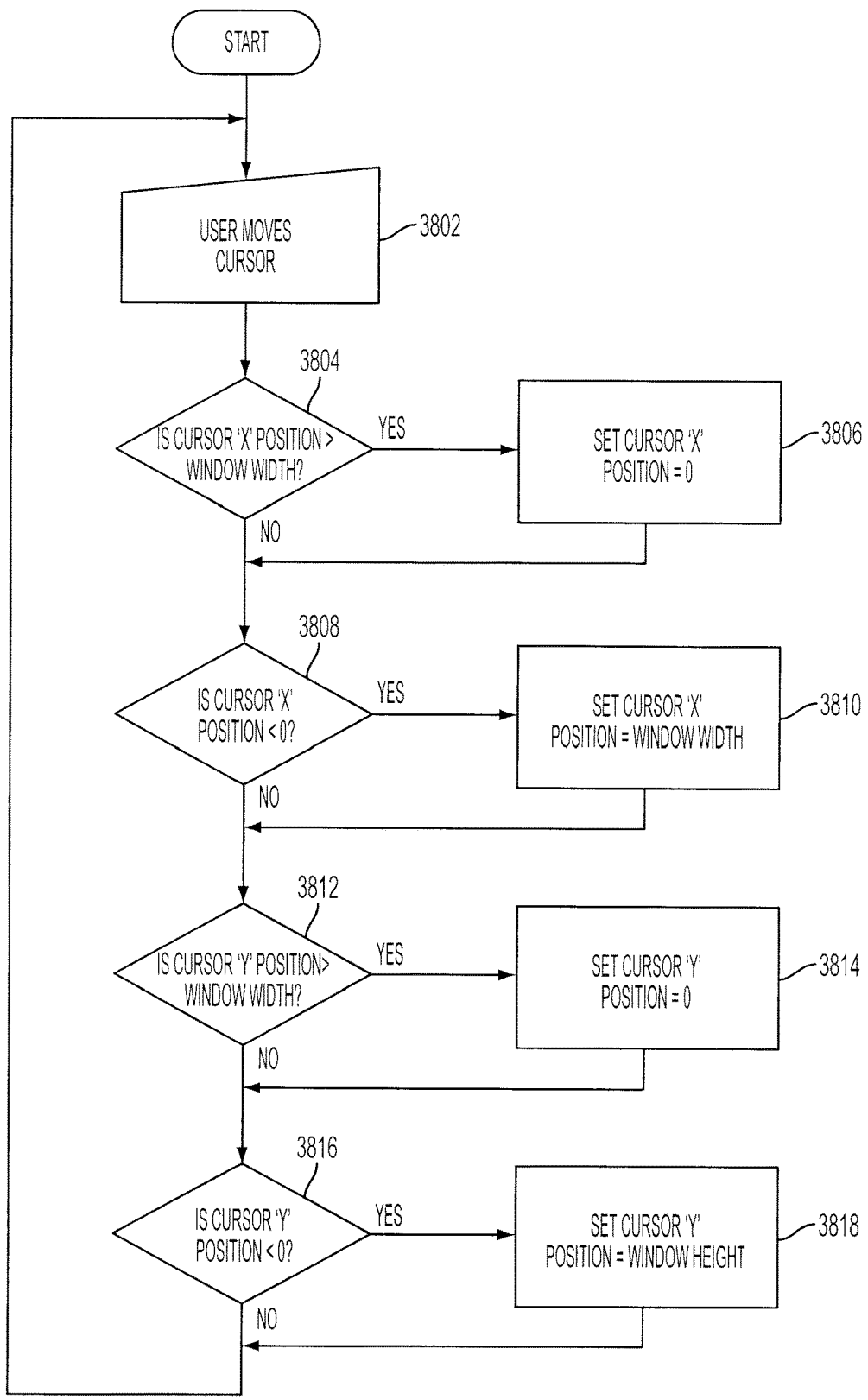
FIG. 38 shows cursor wrapping operation.

For the tools that allow cursor wrapping, this operation, as depicted in FIG. 38 starts with the user moving 3802 the input device for moving the cursor and this being detected. When the cursor x position is greater than the window width 3804, the x position is set 3806 to zero. When the cursor x position is less than zero 3808, the x position is set 3810 to the window width. When the cursor y position is greater than the window height 3812, the y position is set 3814 to zero. When the cursor y position is less than zero 3816, the y position is set to the window height 3818. Once the cursor x and y values are adjusted, the cursor is displayed.

Figure 39:
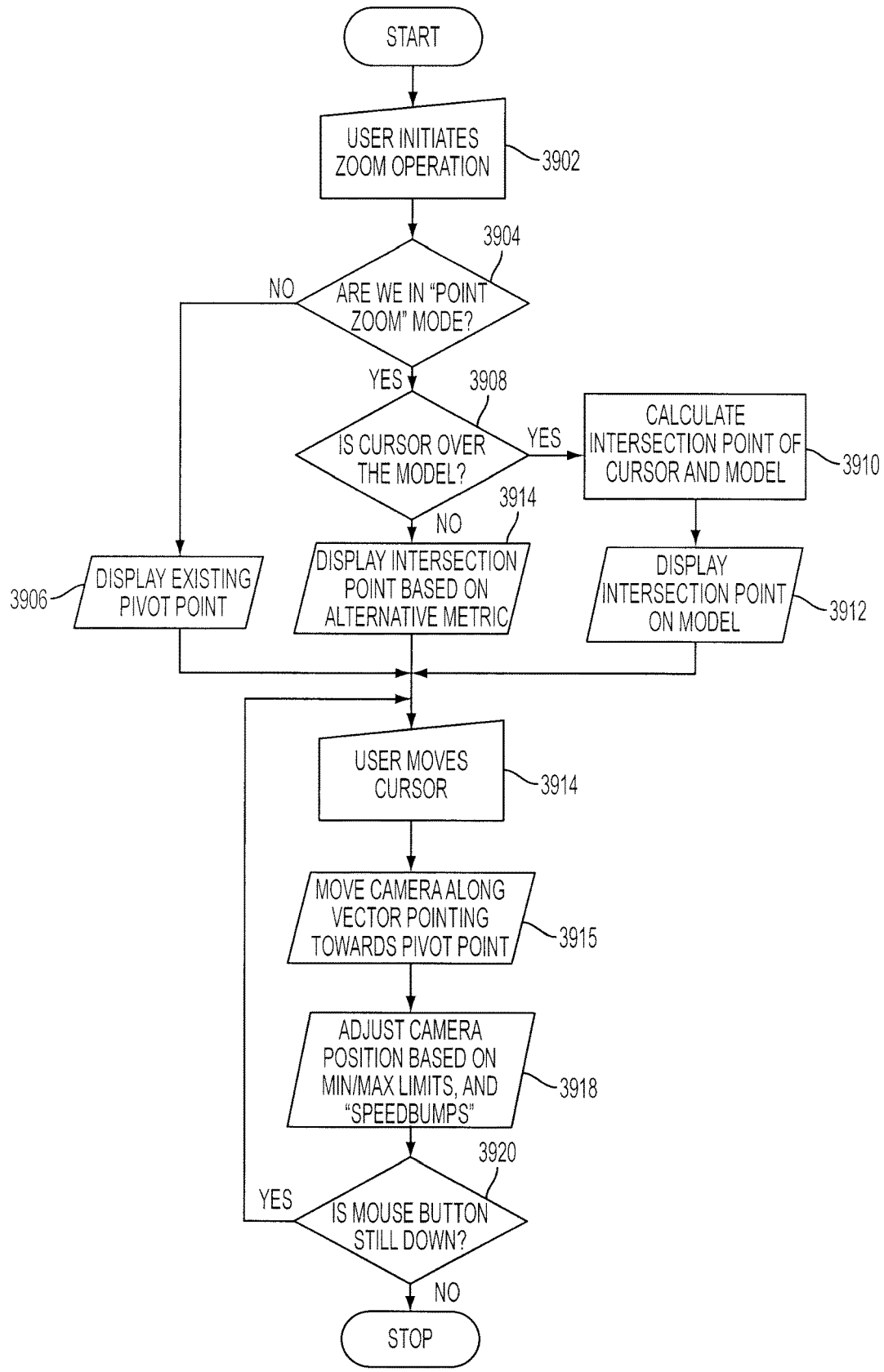
FIG. 39 shows zoom operation.

The zoom operation starts with the user initiating 3902 the zoom tool as depicted in FIG. 39. The system checks 3904 to see if the mode is the zoom point mode. If not the existing pivot point (the sphere) is displayed 3906. If in the point mode, a check 3908 on whether the cursor is over the model is performed. If so, the point is determined 3910 and displayed 3912. If the cursor is not over the model, the intersection point based on the alternate metric is displayed 3914, such as setting the point a predetermined distance into the space from the current camera position or view point as previously described. When the user moves 3914 the cursor, the camera or view is moved 3916 along the vector (in or out depending on the cursor motion) from the cursor to the pivot point. The motion of the camera is adjusted 3918 based on maximum limits and whether the pivot point has been encountered. When the mouse button is released 3920, motion stops.

Figure 40:
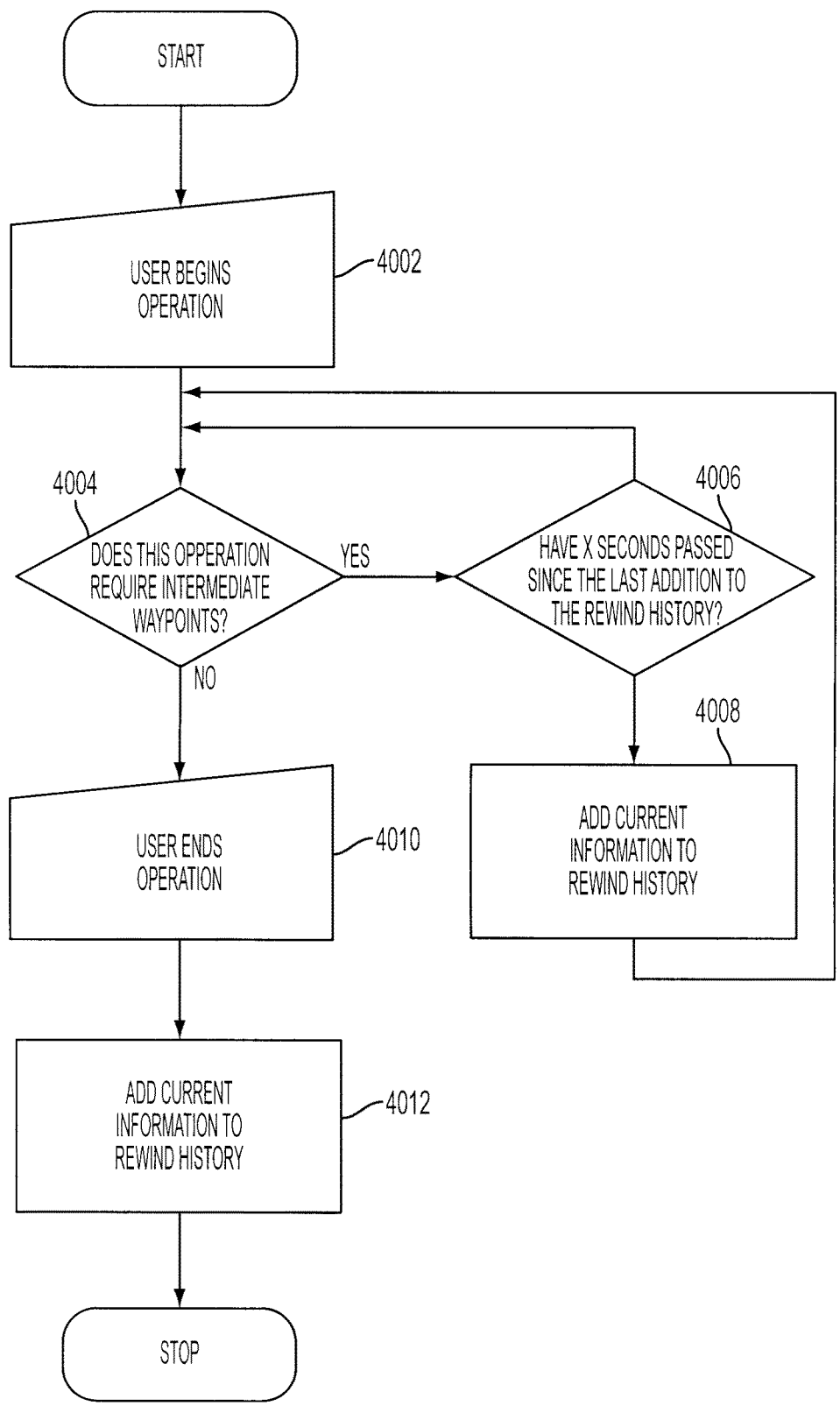

During tool operation, the rewind history is saved and this operation 4002 is shown in FIG. 40. The system checks 4004 to see if this tool requires intermediate waypoints and, if so, the elapsed time since the last waypoint was saved is checked 4006 against the waypoint interval. If it is time to add a waypoint, the current view state information is added 4008 to the rewind history and a thumbnail is created. When the tool does not require period waypoints, the system waits for the current tool operation to end 4010 and then saves 4012 a new waypoint.

Figure 40A:
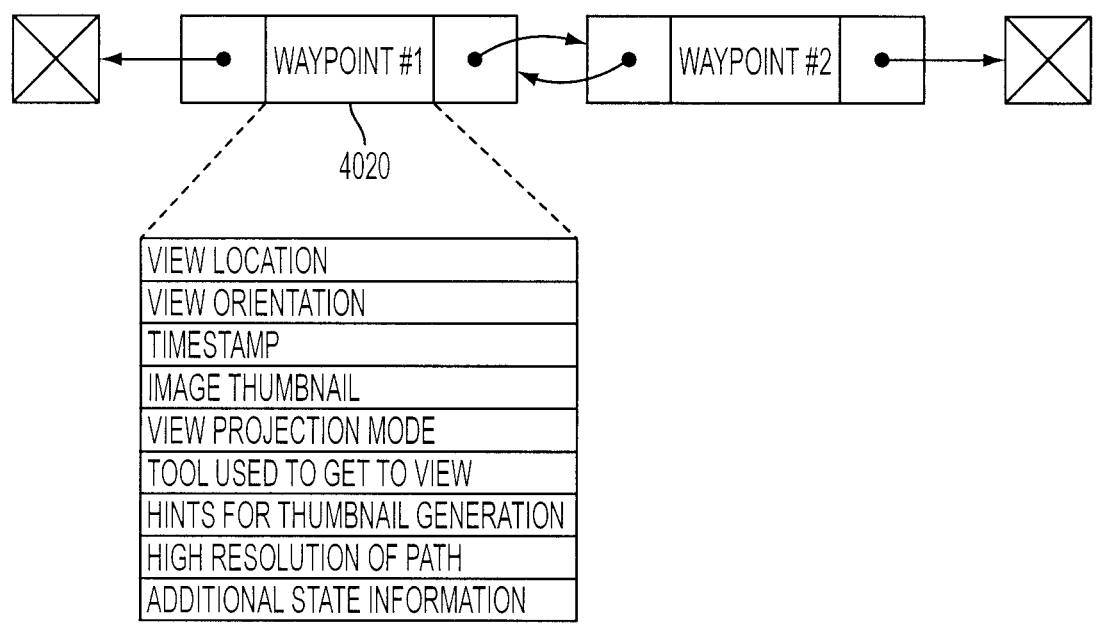
FIG. 40a shows the history data structure.

FIG. 40a illustrates a linked list data structure used for the movement history where each entry 4020 includes view location, orientation, etc.

Figure 41:
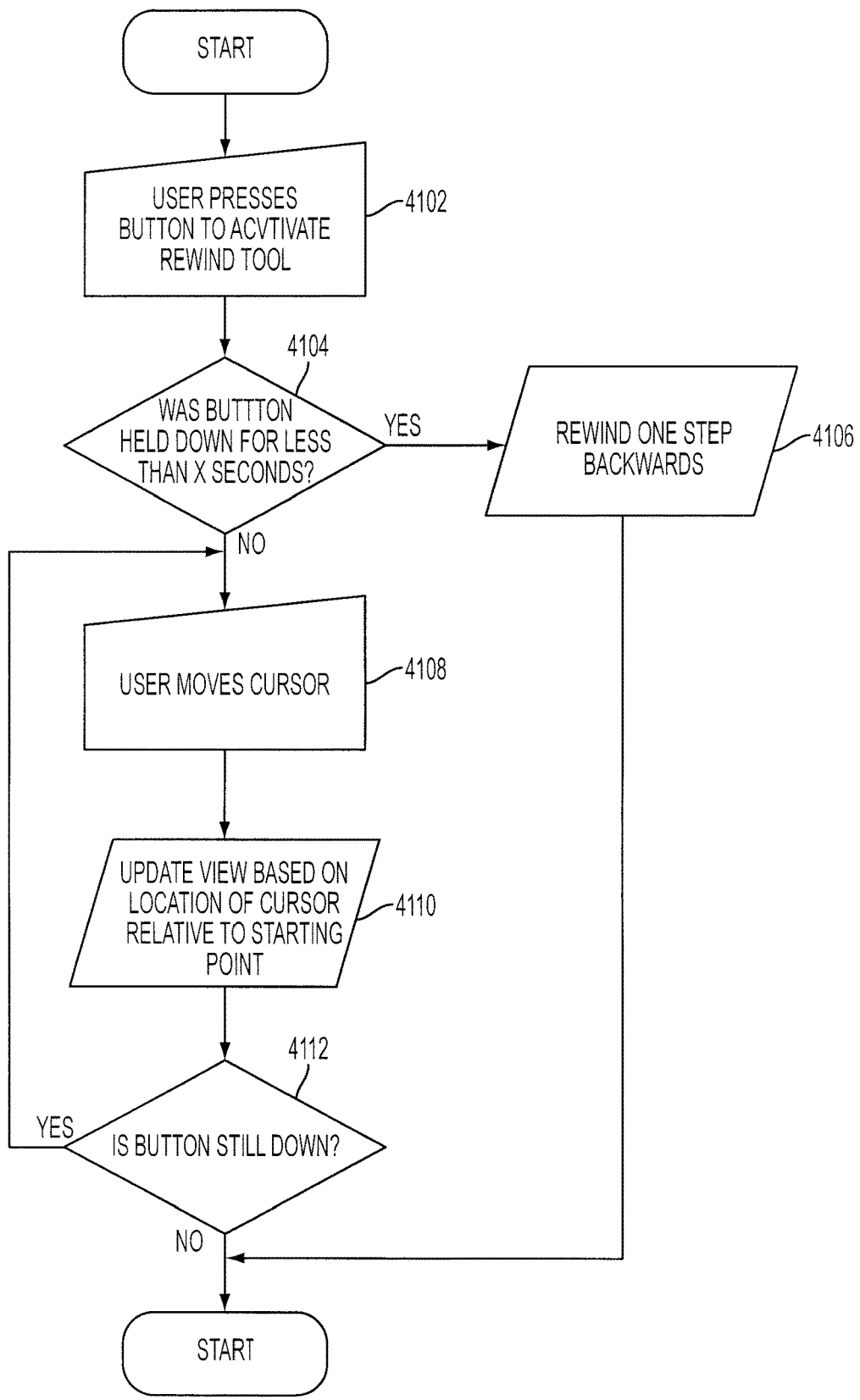

FIG. 41 shows the flow of the rewind tool operation. When the rewind tool is activated 4102, the hold down period of the tool is compared 4104 to a threshold and if it is less than the threshold, the system moves or animates 4106 the view back one step (or back to the place where the last thumbnail was saved). When the user moves 4108 the rewind cursor 712 (see FIG. 7), the view is updated or animated 4110, preferably linearly based on the thumbnails involved in the motion of the rewind cursor as previously discussed. While the mouse button is down 4112, the motion can continue.

Figure 42:
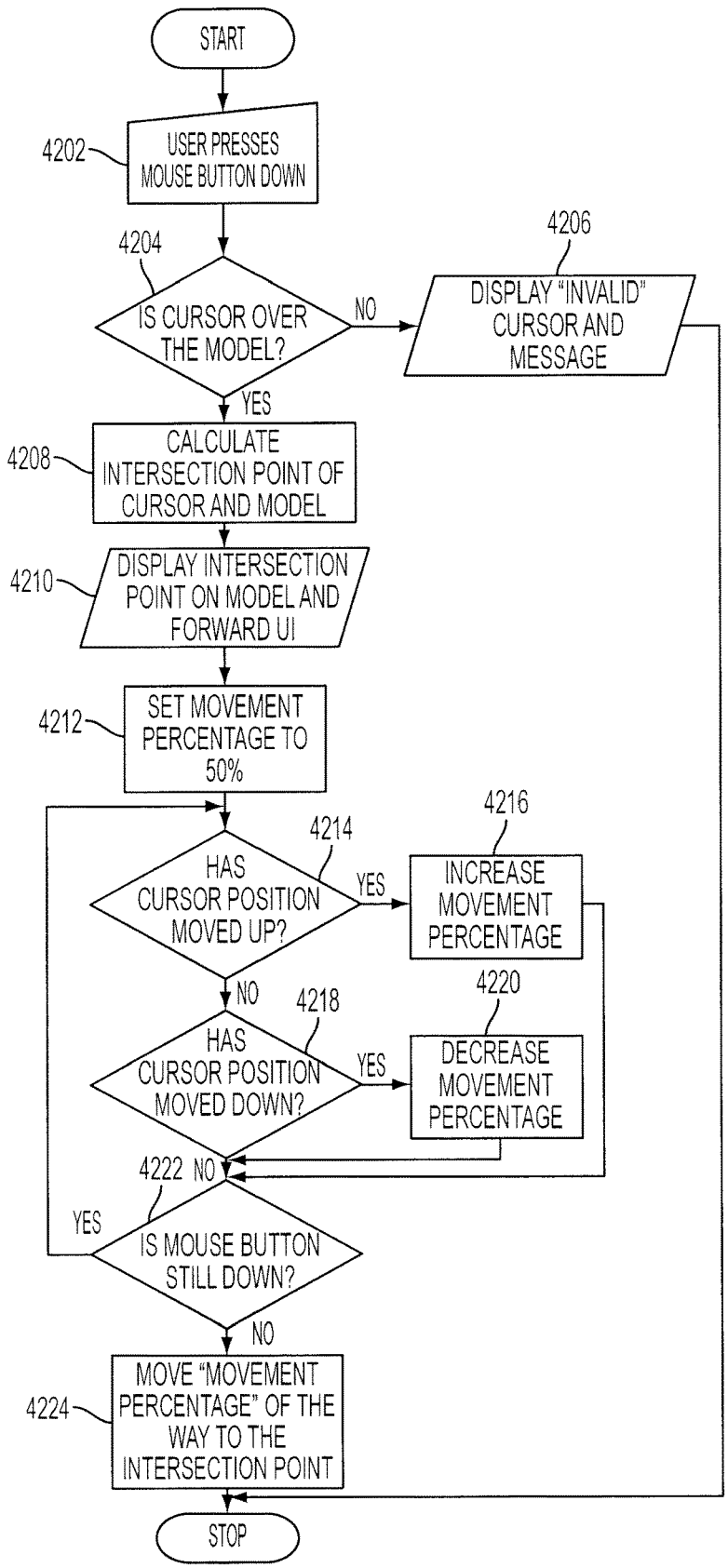
FIG. 42 shows forward operation.

During operation of the forward tool, when the user presses 4202 the mouse button, the system determines 4204 whether the cursor is over the model as depicted in FIG. 42 and if not the invalid operation cursor and message is displayed 4206. Otherwise, the intersection point is determined 4208 and displayed 4210 along with the motion scale (see FIG. 27), followed by a move 4212 of the view a predetermined distance to the intersection point, such as preferably 50%. The scale is updated to show the amount of movement. If the cursor is moved up 4214, the movement percentage is increased 4216. If the cursor is moved down 4218, the percentage is decreased 4220. When the mouse button is released 4222, the movement percentage is used to move both the view and the marker on the perspective scale.

Figure 43:
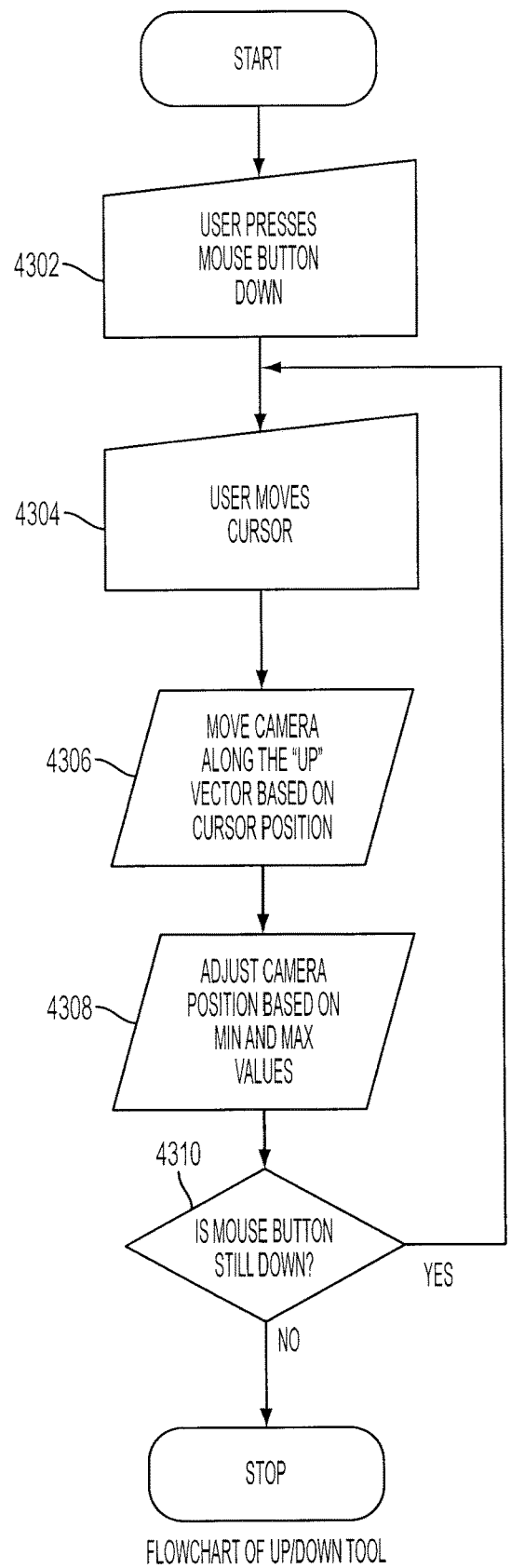
FIG. 43 shows up/down operation.

The up/down tool flow is activated 4302 and when the user moves 4304 the cursor, the camera view is moved 4306 along the up vector (a vector vertical with respect to the model) based on the current position as shown in FIG. 43. The camera position is adjusted 4308 based on the minimum and maximum positions. The up/down scale is updated and displayed to show the move. This continues as long as the mouse button is down 4310.

Figure 44:
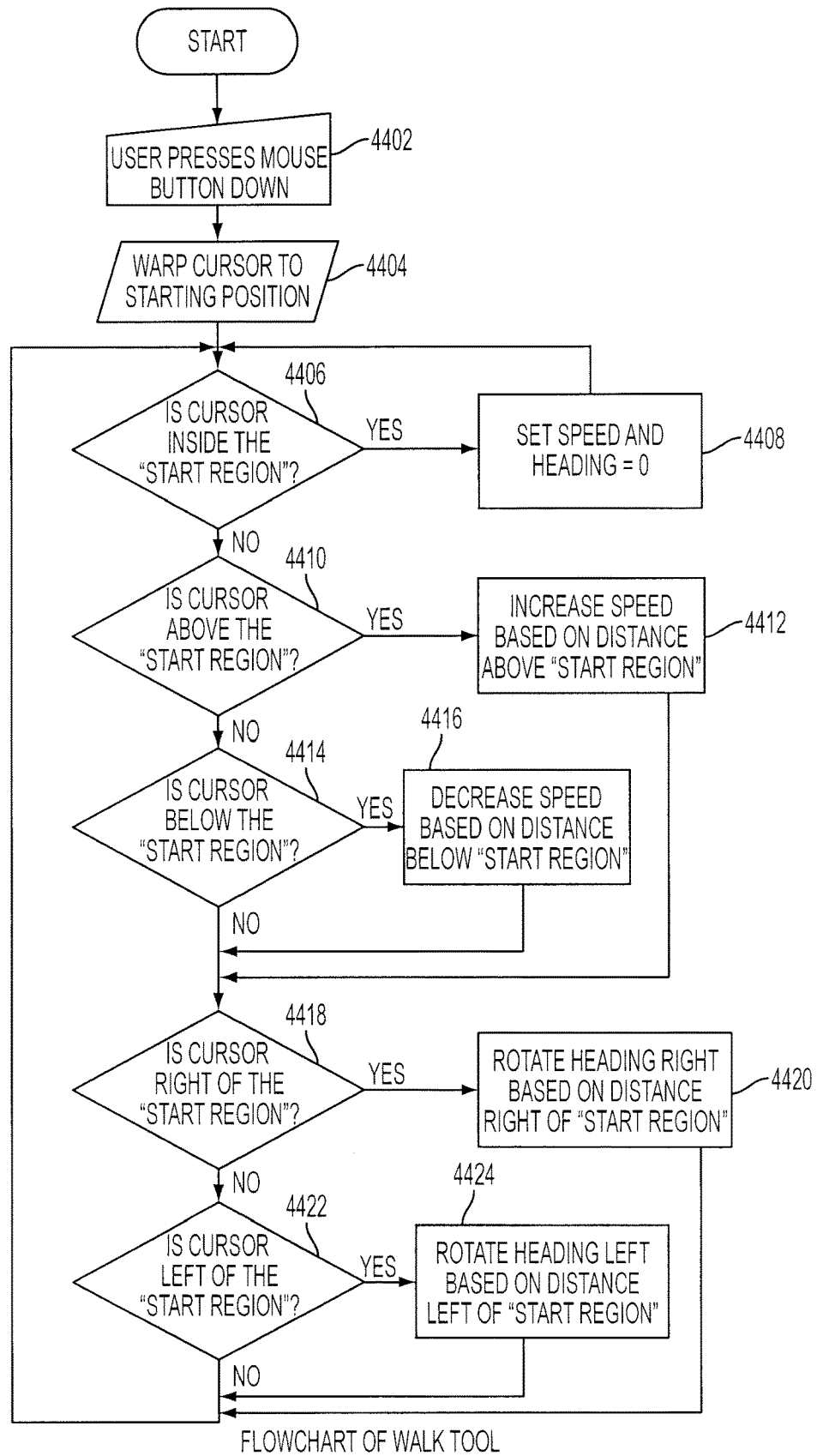
FIG. 44 shows walk operation.

As shown in FIG. 44, the walk tool, when activated 4402, the system warps 4404 the cursor to the starting position as previously discussed. When the cursor is inside the start region 4406, the speed is set 4408 to zero. When the cursor is above the start region 4410, the view is moved forward based on a speed that is increased 4412 responsive to the distance the cursor is above the start region. When the cursor is below the start region 4414, the view is moved based on a speed that is decreased 4416 responsive to the distance the cursor is below the start region. When the cursor is to the right of the start region 4418, the view is rotated right 440 based on the distance the cursor is to the right of the start region. When the cursor is to the left of the start region 4422, the view is rotated left 4424 based on the distance the cursor is to the left of the start region.

Figure 45:
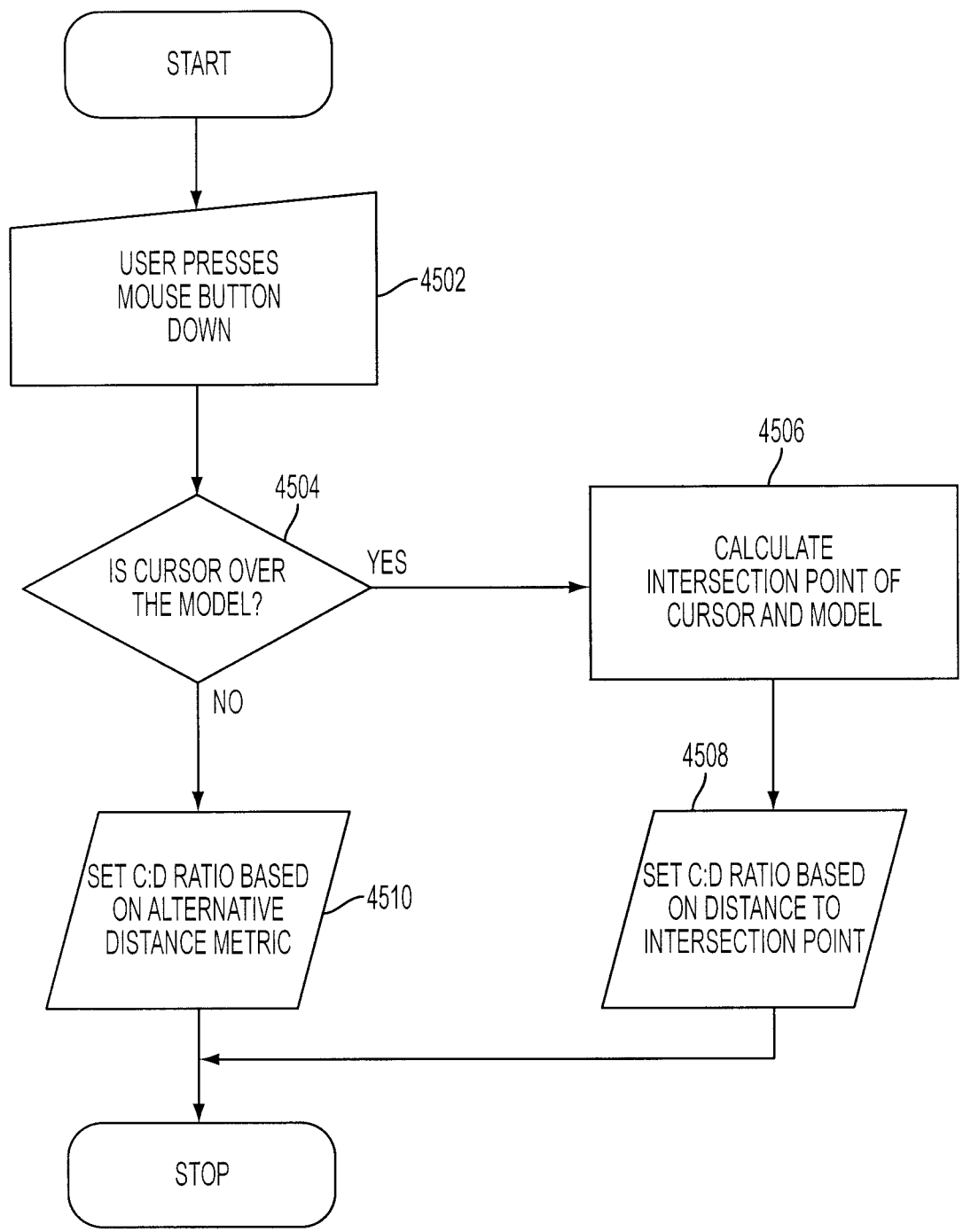
FIG. 45 shows pan operation.

The pan operation (see FIG. 45), when activated 4502 by clicking through the pan tool, determines 4504 whether the cursor is over the model. If so, the intersection point is determined 4506 and a C:D ratio (the rate of movement speed) is set 4508 based on the distance to the intersection point and the scene is panned based on the motion of the cursor using the ratio. If not over the cursor, the C:D ratio is set 4510 based on an alternate metric, such as the dimensions or size of the model space and the scene is panned responsive to cursor motion.

Figure 46:
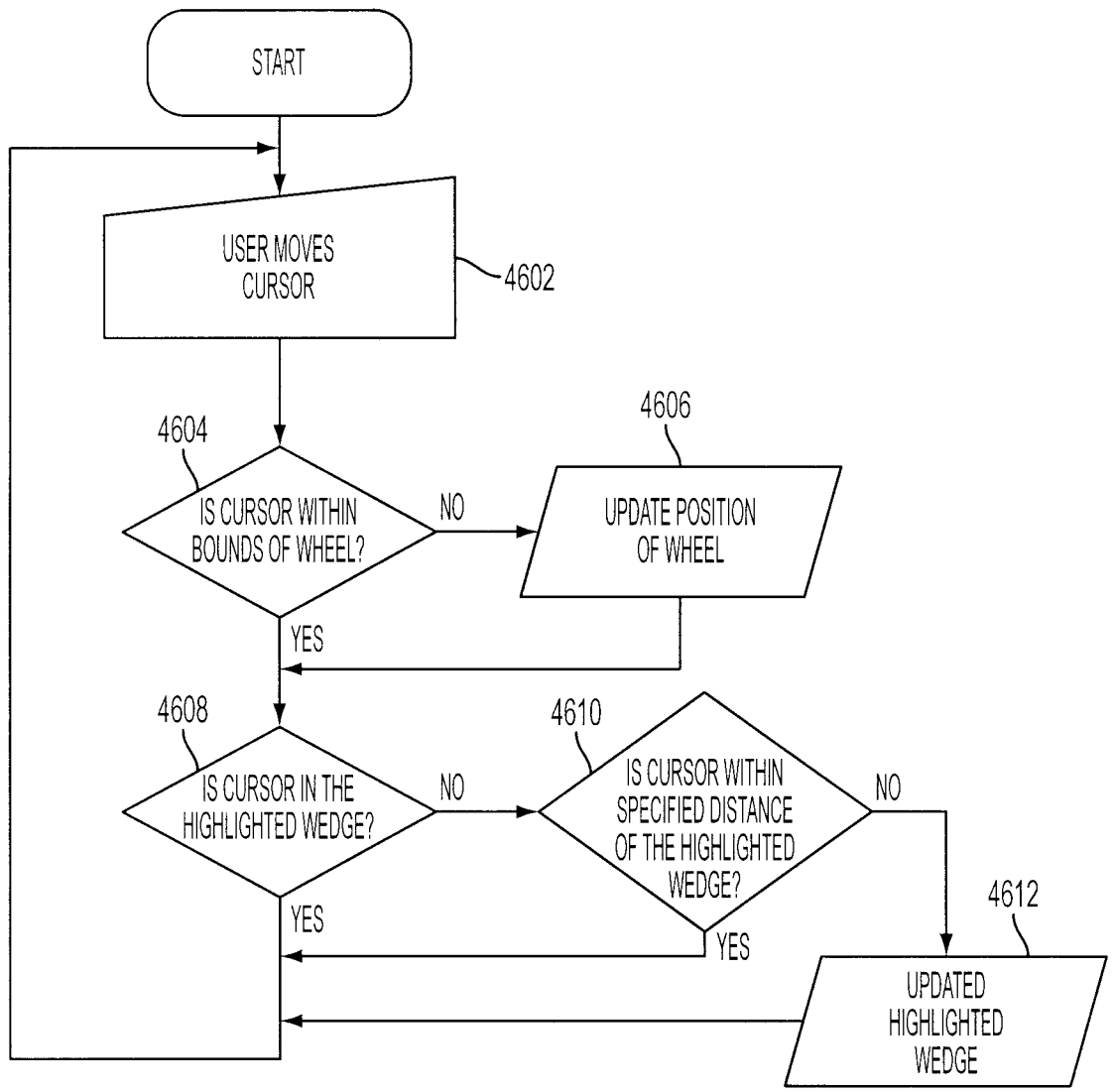
FIG. 46 shows mini-wheel activation operation.

The mini-wheel activation (see FIG. 46), when activated 4602 by clicking through the pan tool, determines 4604 whether the cursor is within the wheel boundary. If not, the position of the wheel is updated 4606. If so, a determination 4608 is made as to whether the cursor is in the highlighted wedge. If not, a determination is made 4610 as to whether it is within the specified distance of the wedge. If not, the wedge is highlighted 4612.

Figure 47:
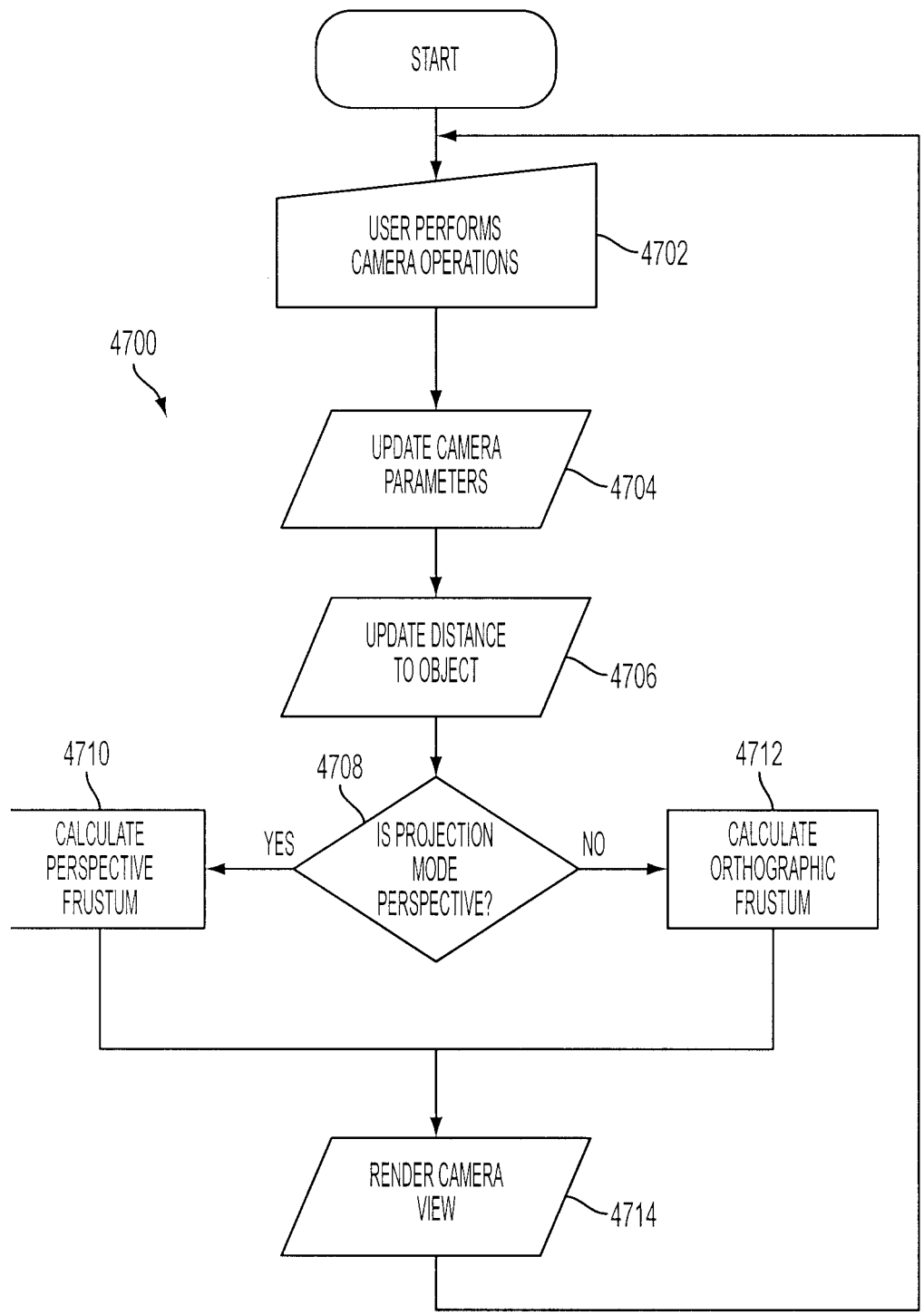
FIG. 47 shows parity maintenance between perspective and orthographic projections.

Perspective and orthographic projections differ in that orthographic projection has no sense of depth. Thus, when using only a view direction to determine the perspective and orthographic frustums for a scene, a great disparity can emerge between the two after several camera operations have been carried out. Depicted in FIG. 47 is an approach 4700 to maintaining parity between perspective and orthographic projections, by using a single camera model, from which both orthographic and perspective viewing frustums can be derived.

The standard pinhole perspective camera model has been augmented to include the distance to the geometry in the scene. This is updated whenever the camera position changes. That is, the user performs a camera move operation 4702, the camera parameters are updated 4704 and the distance to the object is updated 4706. We then use this extra information to scale the orthographic frustum such that the size of the geometry as it is viewed in orthographic projection mimics the size of the geometry as it is viewed in perspective projection. In doing this, a determination 4708 is made as to whether the mode is projection or perspective. If perspective, the perspective frustum is calculated 4710. If orthographic, the distance is used to calculate 4712 the frustum. After the frustum is determined, the view is rendered 4714.

This distance value is used when calculating 4712 the orthographic frustum; the parameters of orthographic width and height are calculated from the pinhole camera model as follows:

$$ORTHO_W = d \times \tan(f_{hor})$$

$$ORTHO_H = d \times \tan(f_{ver})$$

where d is the distance to the geometry in the scene, and $f_{hor}$ and $f_{ver}$ are the horizontal and vertical field-of-views, respectively.

The approximate distance to the object can be calculated based on the distance of the perspective camera's eye to the center point. In doing this the position of the center point is updated throughout all camera operations and generally lies on scene geometry. This is an effective and computationally inexpensive way of approximating distance to the geometry in the scene. In addition, the magnitude of the view direction vector is transparent to the perspective projection model. However, as this is an approximation, it does not work in all cases.

Another approach is to calculate the actual distance to the geometry view for every frame. While this ensures the calculation of the orthographic frustum is accurate, it is computationally expensive. Carrying out such calculations on a graphics processing unit (GPU) helps reduce the load on a central processing unit (CPU) but can result in slower than real-time interaction for complex geometry.

Figure 48:
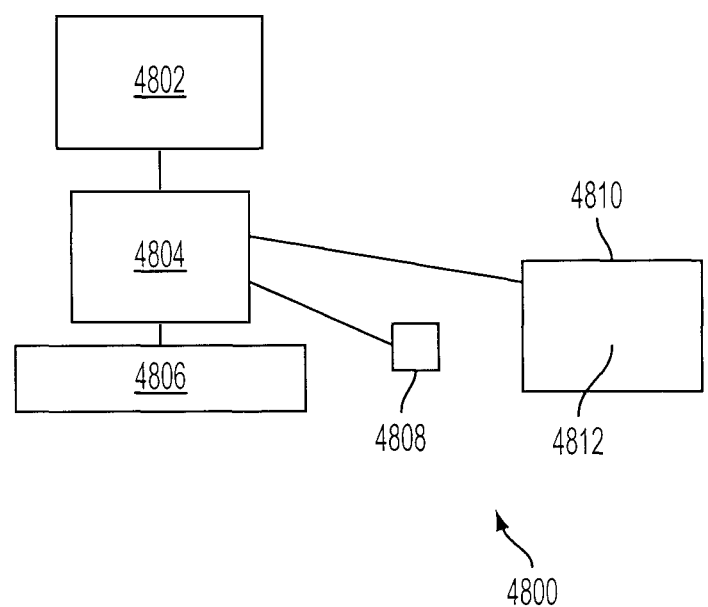
FIG. 48 shows system hardware.

The typical hardware 4800 for the system discussed herein, as depicted in FIG. 48, includes a display 4802 that can be a non sensitive display or a sensitive display such as a touch or stylus type display screen as used in tablet or lap top type computers. The display is coupled to a computer 4804 that can have the power of a cell phone, PDA, lap top, desk top or server type computer. A keyboard 4806 is provided for the key based operations. A mouse 4608 or other cursor position control input device is used to control the cursors discussed herein. A digitizing tablet 4810 that uses a stylus 4812 can also be coupled to the computer. Other types on input devices that allow selection and cursor motion can also be used. The computer has associated memory and other types of storage capability (CD, hard disk, DVD, etc.) to allow the programs or processes and data structures discussed herein to be stored. The system can operate over a network as the need arise for more power or speed with the processes, etc. being distributed.

The embodiments of the present invention discussed provide a safe 3D navigation environment by clustering and caching tools; creating task and skill-based tool sets; providing orientation awareness; enhancing tool feedback; providing pre-canned navigation; preventing errors; and recovering from errors. Rapid access and use are provided by the tracking menu and click through features. The circular design of the wheels with important action tools on the exterior and less used tools in the interior organizes the tools so they are easy to access in an order that fits the tasks. The tool selection dialogs that allows new and advanced users to select a navigation tool makes the users quickly aware of what is available and what are the navigation tool uses and allows immediate selection. The task grouping of commonly used tools for and limited to types of tasks helps prevent users from becoming confused during navigation. The customization of the action tools for the type of task also prevents confusion and errors during navigation. The sphere provides visual feedback to orient the users and the limitations on placement of the sphere prevent navigation errors. The sliders provide location feedback for dragging operations. Labels and icons reinforce the operations of the tools being used. Constraints on navigation, such as limiting motion to the bounding box or to a rear wall along with cursor control like the cursor screen wrapping, keeps users from getting into visually confusing states. Error recovery using rewind allows users to return to a familiar visual state.

When any of the 3D wheels are selected, and the user then navigates to a 2D sheet, the 2D navigation wheel can automatically become the selected tool. When the 2D navigation tool is selected tool and the user navigates to a 3D model, the last used 3D Wheel will become the selected tool. If the 'pinned' option is enabled, show the 3D wheel pinned to the canvas. If a non-compatible section type is displayed in the canvas the wheel(s) are dismissed and the Select Tool is activated instead.

Depending on the hotkey being used, it may be preferable to offer spring-loaded activation of the wheel. That is, only when the hotkey is pressed down, the wheel is visible and a user can interact with it. Once the hotkey is released, the wheel goes away. Again, this is an optional offering depending on the available hotkey and ease of articulation.

Alternative, and less ideal, systems may be built that offer the collection and sets of navigation tools not using the Tracking Menu design but instead using standard tools on a toolbar as well as potentially offering hotkey access to the individual tools. So, for example, a 3D navigation tool palette may offer: Forward, Look, Rewind, and Up/Down tools as one set and Center, Zoom, Rewind and Orbit as another set.

Additionally, the shapes of the Tracking Menus may be altered (from circles to other shapes such as ovals or squares) and the tool regions shapes may be reshaped and their proportions changed. The positioning of the tools may also be rearranged (e.g., the Orbit wedge on the left side of the wheel could be moved to the top wedge).

Other elements such as the "green ball" may be different colors or shapes (e.g., square or pyramid or cross), orientation demarcations (e.g., tick marks instead of axis belts) and have different transparency dynamics.

Note also that the help text in the HUDs and tooltips change based on the language settings of the computer (e.g., French, Chinese, etc).

The Rewind tool can have different visual representations for each waypoint and be presented to the user in different styles (such as a line with beads on it or timestamps, or a stack of thumbnails or a stack of graphical objects) and different orientations (e.g., vertical instead of horizontal or in 3D). The Rewind mechanism can be attached to different input devices such as the mouse scrollwheel. Additional information can be saved in the Rewind queue beyond camera position and orientation such as user settings, background color and styles, environment settings, rendering modes (e.g., line or shaded), camera options such as orthographic or perspective projection, etc. When Rewinding occurs, the previous state information is installed. In some cases, interpolation of application state information can occur between two waypoints. For example, if the user switched between perspective and orthographic projection, these two projection modes would be blended when rewinding between the two waypoint events.

In addition to the thumbnail strip, supplementary information can be presented such as user or system annotations or indicating which tools were active during the navigation history or other system activity. The Rewind thumbnail strip and graphics may be drawn semi-transparently.

Note for the Rewind Tool, it is possible to save the exact movement path the user performed (instead of just the last position and orientation when the mouse is released). We call this "high resolution". We have found that this is mostly undesired and requires a lot of information to be saved. However, we prototyped this and found it too frenzied when someone dragged through the rewind history. Nevertheless, it may be useful in some applications in which a modifier key can be hit to toggle between using low or high resolution rewind information.

Also navigation events may be created by the system (not explicitly by the user). These can be added to the Rewind history.

Note that some events may be compressed or combined. For example, navigation events that occurred in which the view did not change or in which the view was composed of viewing empty space, are candidates for being dropped from the Rewind history or compressed into a single event.

The perspective sliders can be used in other contexts where for example 3D depth information is useful to indicate. Note that an interesting property of the perspective slider is that it can take less visual space than a 2D slider since it is drawn in perspective.

The perspective slider does not have to relate to positional information about the 3D scene. For example, it can adjust volume settings. The point is that it is drawn in perspective and the perspective may not even match the current perspective in the 3D scene. Also, it could be used in a 2D canvas or 2D application.

The slider can be drawn such that it become more transparent as the slider is deeper in the scene. Thus, the "Start" end of the slider would be more opaque and the "Surface" end would be more transparent.

The perspective slider can be drawn in many different visual ways using different metaphors such as a measurement ruler, or a road/driveway.

User or system annotation labels (text, graphics, iconic symbols) can be added on or near the slider to provide information and context.

Additional semantic controls to go up one floor or down one floor—or other units (e.g. one meter, one foot, etc.), instead of up/down one page or screen full of information on typical scrollbars.

Input snapping at interesting points along the slider (e.g., at each floor or tick mark indicating distance) may also be added for additional user control.

The up/down slider may also have additional graphics, annotations and tick marks on it to indicate application specific information or sizing/scale information. For example, tick marks may indicate floors in a building or where important elements are in a building (such as pipes, electrical junctions, etc. Drag snapping can occur at designated points along the slider for precise movement. In some cases, it may be useful to enable the tool without drawing the graphical slider. The slider may also be drawn semi-transparently. The preferred behavior is for the slider to initially appear near the current cursor position but it may be useful to have it come up in other locations such as the center of the 3D canvas.

Pre and Post actions may be conducted while using the slider. For example, temporarily leveling the camera such that it is parallel to the ground plane before and after actions are performed while using the Up/Down slider.

During mouse-dragging input for the Up/Down tool, the mouse movement can be mapped to a non-linear function to move the camera. For example, an exponential function (which we use), has the property that initial mouse movement move the view in small amounts (for precise adjustments) and as the drag motion gets longer, large view movements are generated. This design is handy if the user is viewing a condominium building and wants to either move up/down in small distances (e.g., within a floor) or large distances (multiple floors at a time).

The Walk tool may deploy intelligent sensing to automatically determine a constant height above the current "ground plane" or horizontal surface the camera is currently over. Smoothing algorithms would make the transition to different heights more visually pleasing. Additional sensing could be used to avoid objects or walls. In addition note that application specific or user customized HUD messages and graphic annotations can be triggered and displayed depending on the user's current location, direction and speed of travel. Moreover to ensure smooth traveling, the system may deploy "level of detail" adjustments in the graphics rendering of the scene—drawing fewer polygons and performing less rendering in dense scenes to approximate the visuals to keep the refresh redrawing at a high rate. Hotkeys may be used to increase or decrease the speed factor of the walk movement.

It is possible to have the walk left/right action and the up/down action be assigned to different parameters (e.g., navigation directions). For example, left/right may pan the user left/right instead of the default look left/right. It is also possible to have the up/down mouse direction map in the up/down direction instead of the in/out direction. Thus, a rate-based pan operation which behaves directionally similar to the standard Pan operation but is rate based.

As a convenience, if the user is walking using the Walk tool and performs cursor-wrapping, moving the cursor into the dead zone will cause the movement to stop and reset the speed to zero. Thus, the user does not have to disengage the Walk tool (by releasing the mouse), or "unwrap" the cursor to pause and reset movement.

The method of cursor-wrapping can be activated while the user input is in the tracking state (e.g., moving a mouse device with no buttons pressed) or during a drag state (e.g. moving a mouse device with the left mouse button pressed). In most scenarios, the cursor-wrapping is active when a tool is active (such as dragging while orbiting).

With cursor-wrapping, the concepts are the same for a view displaying a mixture of 2D and 3D or purely 2D content. When the cursor reaches the out-of-view position, an audio signal or visual signal can be displayed near the cursor location. For example, a chirp sound may be heard and the cursor could fade out, then fade in on the other side. Alternatively, as an example, a small animation could be played showing a puff of smoke near the cursor location. Note that it is possible to display a portion of the cursor (and auxiliary graphics that are currently moving with the cursor—such as a tool/cursor label or status information) at the out-of-view position and the remaining portion at the new wrapped-around position. A number of variations are possible: clip the cursor and auxiliary graphics; re-format or reposition the auxiliary graphics to remain visible until the cursor completes its wrap; always keep the cursor displayed whole but allow auxiliary graphics to be split.

The cursor-wrapping boundary may be dynamically defined to be not the current view boundary but the boundary of the currently selected object or set of objects in the scene. In addition, the cursor-wrapping boundary could be dynamically determined to be the bounds of the object it currently is over. Both of these cases are useful in that it keeps the cursor near where the user is working and auxiliary information that is moving with the cursor (such as dimensioning, status info, or state information) can remain nearby.

For the Tap Activation functionality, some embodiments will only implement the quick tap toggle to activate/deactivate a tool and not the spring-loaded tap to activate a tool. In the quick tap situation, the trigger will often require that "no mouse buttons are pressed" as this is typically reserved for modifying the current selection.

If spring-loaded mode is supported, then mouse button presses are processed. However, the trigger key is already in use so if the tool requires this key, it is unavailable. That is why we like less used combinations such as cntrl+shift or the Alt key. The First Contact pop-up mechanism is anchored to some visual element (e.g., a tool icon button in a toolbar or a widget in the 2D/3D scene). In our case we put a grayed-out 2D graphic on top of the 3D scene.

An important behavioral design to capture is that the FirstContact graphic will dismiss itself when the user moves the cursor outside of the bounds of the graphic. Moving the cursor over sub-elements of the graphic may change the graphic and switch default settings for the tool if the user chooses to activate the tool by clicking with the mouse. Thus, the user customizes the tool while learning about the tool or collection of tools.

It is important to emphasize that the user can switch between options by clicking on sub-element graphics without activating the tool. These graphics are used to select different sub-groups. We have found that an important grouping is by user expertise. Moreover, users are very bad at self-assessment and classifying themselves as a novice or expert. Thus, we strategically do not use these terms and instead use terms such as "Familiar with 3D" and "New to 3D".

One style of FirstContact is that the FirstContact graphics and tool choosing should be seen only until the user activates the tool for the first time. This is to reduce information overload and clutter. The next time the user hovers over the anchor element, the FirstContact will not be presented. This state information is preserved in the user preferences and thus when the application is re-launched, FirstContact exposure is respected.

A mechanism exists to always re-activate FirstContact on application start-up for those users who want this mechanism to persist and to always be shown FirstContact.

The "green ball" navigation sphere has some important characteristics. The sphere becomes more transparent as the user gets closer during a camera movement operation (such as zoom) until the sphere is completely transparent.

Also it is important to note that the size of the sphere resets after any camera movement operation. When the sphere is interactively moved within the 3D scene, its size changes depending on the depth location information. By default, the sphere does not cast a 3D shadow but it could if desired. A texture could be added to the sphere to alter its appearance.

We display the focus point sphere on tool activation (i.e., mouse down) and remove it on tool deactivation.

Alternatively, one may choose to show/hide the sphere when the tool is selected from the toolbar—in addition to when the tool is being used (e.g., while the mouse button is pressed). The sphere could change color when the tool is being used (i.e., mouse down).

The sphere could change shape, color or be annotated with graphics or icons to indicate state or mode information. For example, within the Orbit tool, the sphere could indicate if dimensional constraints were active (e.g., only allowing orbit in x dimension).

In general modifier keys can be used for all of the tools to add additional functionality.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method of navigating within a three-dimensional model, the method comprising:
   displaying an up/down slider having a position marker, the position marker indicating a first elevation of a virtual camera along a vertical axis, wherein the virtual camera has a first camera view at the first elevation within the three-dimensional model;
   displaying a rewind control;
   moving, via a processing unit, the position marker on the up/down slider when a position of the virtual camera is moved along the vertical axis to a second elevation, wherein the virtual camera has a second camera view at the second elevation;
   upon completion of moving the position marker, recording a first waypoint corresponding to the second elevation; and
   moving the virtual camera to the second elevation corresponding to the first waypoint when the rewind control is selected.

2. The method of claim 1, further comprising:
   moving, via the processor, the position marker on the up/down slider towards a first end of the up/down slider when the second elevation of the virtual camera is above the first elevation along the vertical axis, wherein the first end of the up/down slider corresponds to a high elevation of the virtual camera along the vertical axis; and
   moving, via the processor, the position marker on the sider towards a second end of the up/down slider when the second elevation of the virtual camera is below the first elevation along the vertical axis, wherein the second end of the up/down slider corresponds to a low elevation of the virtual camera along the vertical axis.

3. The method of claim 2, wherein the high elevation of the virtual camera is associated with a top of a bounding box, and the low elevation of the virtual camera is associated with a bottom of the bounding box.

4. The method of claim 1, wherein:
   the three-dimensional model comprises a building model, and
   the position marker is moved along the up/down slider when the elevation of the virtual camera is moved along the vertical axis between floors of the building.

5. The method of claim 1, wherein the elevation of the virtual camera is moved up and down along the vertical axis without causing the position of the virtual camera to be displaced along a horizontal plane.

6. The method of claim 1, further comprising:
   receiving cursor motion upward relative to the first camera view at the first elevation of the three-dimensional model; and receiving cursor motion downward relative to the second camera view at the second elevation of the three-dimensional model,
wherein the cursor motion upward causes the elevation of the virtual camera to move up along the vertical axis, and the cursor motion downward causes the elevation of the virtual camera to move down along the vertical axis.

7. The method of claim 2, further comprising:
receiving cursor motion upward relative to the first camera view at the first elevation of the three-dimensional model; and
receiving cursor motion downward relative to the second camera view at the second elevation of the three-dimensional model,
wherein the cursor motion upward causes the position marker to move towards the first end of the up/down slider, and the cursor motion downward causes the position marker to move towards the second end of the up/down slider.

8. The method of claim 1, wherein the up/down slider and the position marker are initially displayed near a current cursor position.

9. The method of claim 8, wherein the up/down slider is displayed as a semi-transparent element.

10. One or more non-transitory computer-readable storage media including instructions that, when executed by a processing unit, cause the processing unit to navigate within a three-dimensional model, by performing the steps of:
displaying an up/down slider having a position marker, the position marker indicating a first elevation of a virtual camera along a vertical axis, wherein the virtual camera has a first camera view at the first elevation within the three-dimensional model;
displaying a rewind control;
moving, via a processing unit, the position marker on the up/down slider when a position of the virtual camera is moved along the vertical axis to a second elevation, wherein the virtual camera has a second camera view at the second elevation;
upon completion of moving the position marker, recording a first waypoint corresponding to the second elevation; and
moving the virtual camera to the second elevation corresponding to the first waypoint when the rewind control is selected.

11. The non-transitory computer-readable storage media of claim 10, further comprising:
moving, via the processor, the position marker on up/down the slider towards a first end of the up/down slider when the second elevation of the virtual camera is above the first elevation along the vertical axis, wherein the first end of the up/down slider corresponds to a high elevation of the virtual camera along the vertical axis; and
moving, via the processor, the position marker on the slider towards a second end of the up/down slider when the second elevation of the virtual camera is below the first elevation along the vertical axis, wherein the second end of the up/down slider corresponds to a low elevation of the virtual camera along the vertical axis.

12. The non-transitory computer-readable storage media of claim 11, wherein the high elevation of the virtual camera is associated with a top of a bounding box, and the low elevation of the virtual camera is associated with a bottom of the bounding box.

13. The non-transitory computer-readable storage media of claim 10, wherein:
the three-dimensional model comprises a building model, and
the position marker is moved along the up/down slider when the elevation of the virtual camera is moved along the vertical axis between floors of the building.

14. The non-transitory computer-readable storage media of claim 10, wherein the elevation position of the virtual camera is moved up and down along the vertical axis without causing the position of the virtual camera to be displaced along a horizontal plane.

15. The non-transitory computer-readable storage media of claim 10, further comprising:
receiving cursor motion upward relative to the first camera view at the first elevation of the three-dimensional model; and
receiving cursor motion downward relative to the second camera view at the second elevation of the three-dimensional model,
wherein the cursor motion upward causes the elevation of the virtual camera to move up along the vertical axis, and the cursor motion downward causes the elevation of the virtual camera to move down along the vertical axis.

16. The non-transitory computer-readable storage media of claim 11, further comprising:
receiving cursor motion upward relative to the first camera view at the first elevation of the three-dimensional model; and
receiving cursor motion downward relative to the second camera view at the second elevation of the three-dimensional model,
wherein the cursor motion upward causes the position marker to move towards the first end of the up/down slider, and the cursor motion downward causes the position marker to move towards the second end of the up/down slider.

17. The non-transitory computer-readable storage media of claim 10, wherein the up/down slider and the position marker are initially displayed near a current cursor position.

18. The non-transitory computer-readable storage media of claim 17, wherein the up/down slider is displayed as a semi-transparent element.

19. An apparatus, comprising:
a memory including instructions; and
a processing unit coupled to the memory and, when executing the instructions, is configured to:
display an up/down slider having a position marker, the position marker indicating a first elevation of a virtual camera along a vertical axis, wherein the virtual camera has a first camera view at the first elevation within the three-dimensional model;
display a rewind control;
move, via a processing unit, the position marker on the slider when a position of the virtual camera is moved along the vertical axis to a second elevation, wherein the virtual camera has a second camera view corresponding to the second elevation;
upon completion of moving the position marker, record a first waypoint at the second elevation; and
move the virtual camera to the second elevation corresponding to the first waypoint when the rewind control is selected.

20. The apparatus of claim 19, further comprising:
moving, via the processor, the position marker on the up/down slider towards a first end of the up/down slider when the second elevation of the virtual camera is above the first elevation along the vertical axis, wherein the first end of the up/down slider corresponds to a high elevation of the virtual camera along the vertical axis; and moving, via the processor, the position marker on the slider towards a second end of the up/down slider when the second elevation of the virtual camera is below the first elevation along the vertical axis, wherein the second end of the up/down slider corresponds to a low elevation of the virtual camera along the vertical axis.

21. The method of claim 1, wherein the first waypoint comprises:

the second elevation of the virtual camera, an orientation of the virtual camera, and a thumbnail image of the three-dimensional model corresponding to the second camera view at the second elevation and the orientation of the virtual camera.

* * * * *

UNITED STATES PATENT AND TRADEMARK OFFICE
CERTIFICATE OF CORRECTION

PATENT NO. : 10,564,798 B2
APPLICATION NO. : 12/200440
DATED : February 18, 2020
INVENTOR(S) : Fitzmaurice et al.

Page 1 of 1

It is certified that error appears in the above-identified patent and that said Letters Patent is hereby corrected as shown below:

In the Claims

Column 30, Claim 14, Line 9, please delete "position".

Signed and Sealed this
Twenty-eighth Day of April, 2020

Andrei Iancu
*Director of the United States Patent and Trademark Office*